United States Patent [19]

Fairman et al.

[11] 4,169,288
[45] Sep. 25, 1979

[54] REDUNDANT MEMORY FOR POINT OF SALE SYSTEM

[75] Inventors: Bruce A. Fairman, Scottsdale; G. Ray Durney; Robert G. Taylor, both of Mesa, all of Ariz.

[73] Assignee: International Telephone and Telegraph Corporation, New York, N.Y.

[21] Appl. No.: 791,139

[22] Filed: Apr. 26, 1977

[51] Int. Cl.² ............... G06F 11/00; G06F 11/04
[52] U.S. Cl. ................................................. 364/900
[58] Field of Search ............ 364/101, 119, 405, 500, 364/741, 200 MS File, 900 MS File

[56] References Cited

U.S. PATENT DOCUMENTS

| | | | |
|---|---|---|---|
| 3,377,623 | 4/1968 | Reut et al. | 364/200 |
| 3,636,331 | 1/1972 | Amrehn | 364/200 |
| 3,864,670 | 2/1975 | Inoue et al. | 364/200 |
| 3,866,182 | 2/1975 | Yamada et al. | 364/200 |
| 3,882,455 | 5/1975 | Heck et al. | 364/200 |
| 3,898,621 | 8/1975 | Zelinski et al. | 364/200 |
| 3,921,141 | 11/1975 | Wilber et al. | 364/200 |
| 3,946,220 | 3/1976 | Brobeck et al. | 364/200 |
| 4,032,899 | 6/1977 | Jenny et al. | 364/200 |

Primary Examiner—Gareth D. Shaw
Assistant Examiner—David Y. Eng
Attorney, Agent, or Firm—Thomas E. Kristofferson

[57] ABSTRACT

A point of sale system having an active and a spare data processing system, each including separate read/write memories, with only one of the systems being active at a given time, but with the active system being able to selectively acquire data from the read/write memory of the spare system upon start-up and including means for verifying which read/write memory of the active or the spare system contains valid, most current data which is then transferred to whichever system is the active system, the read/write memories of each of the two systems having a built-in generation number counter which is incremented by one whenever either the data of the inactive read/write memory is caused to be transferred to the active read/write memory or whenever the counts in the generation number counters of both read/write memories are equal, this change in the generation number counters taking place only at the start-up of the system.

7 Claims, 67 Drawing Figures

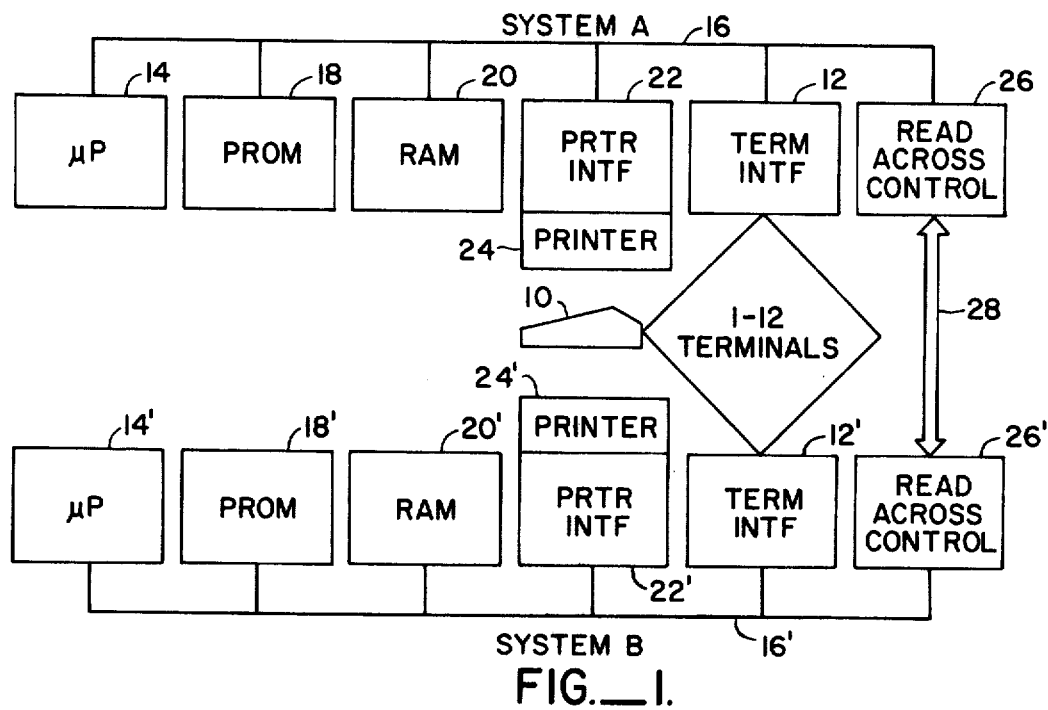
FIG._1.
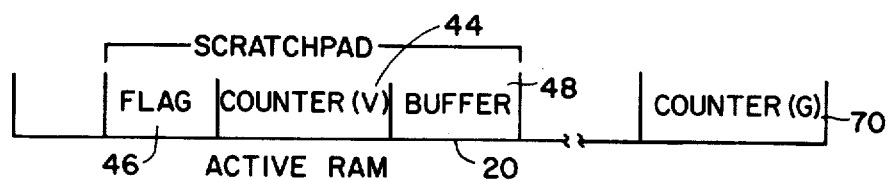
FIG._4.
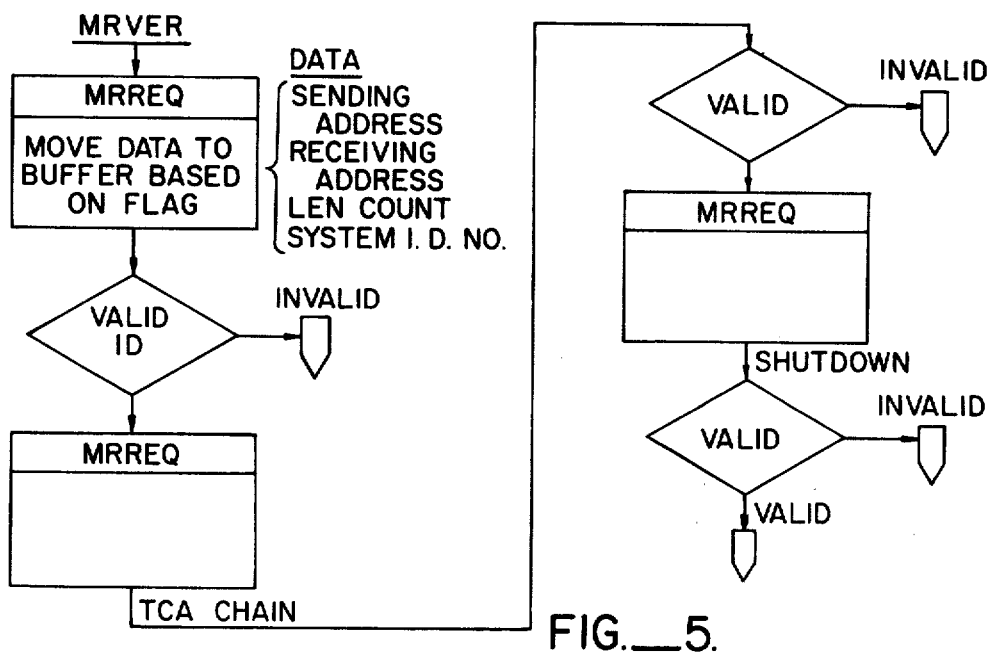
FIG._5.

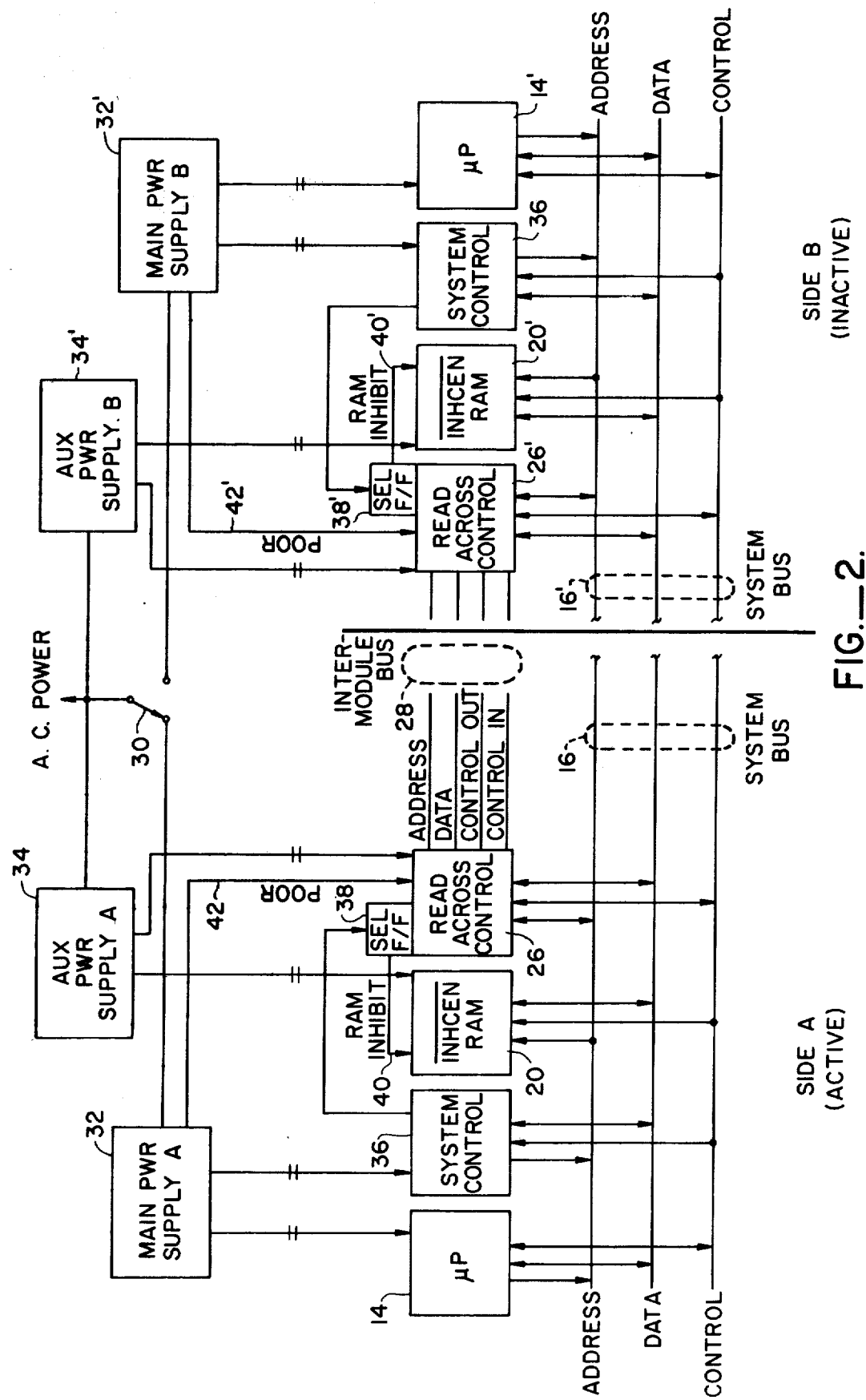
FIG._2.

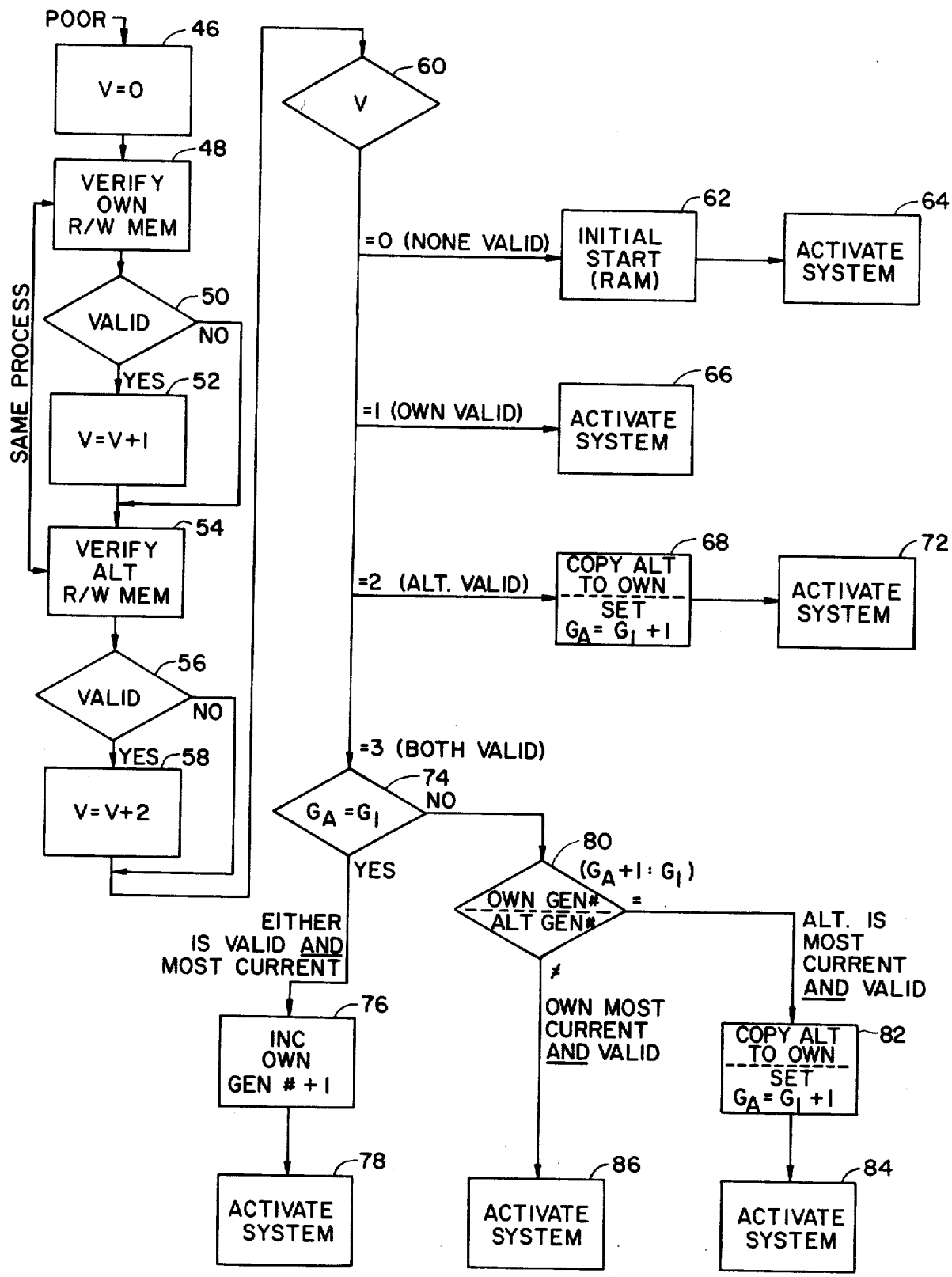
FIG._3.

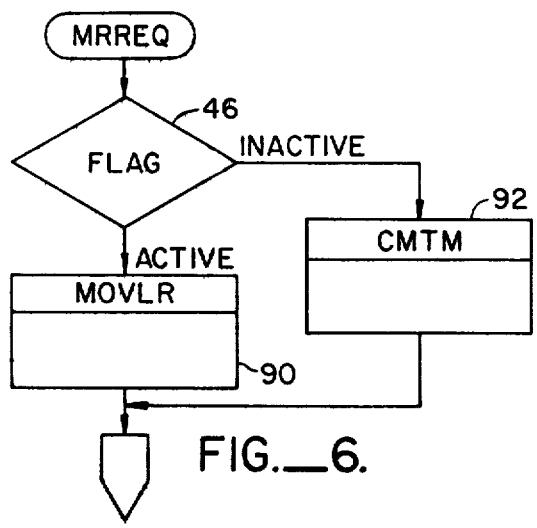
FIG._6.
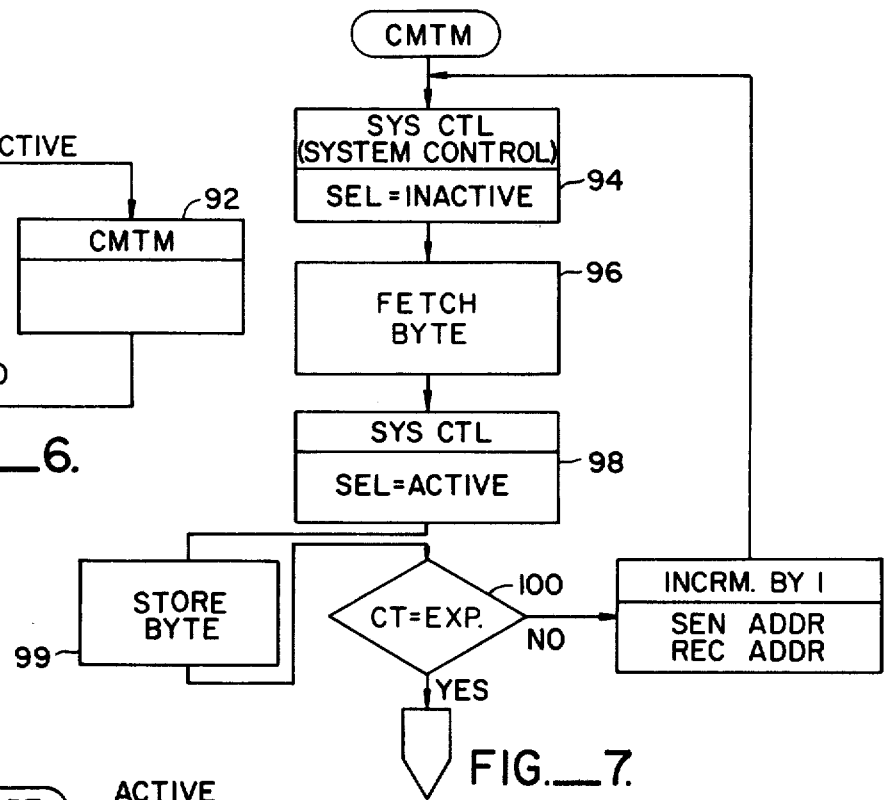
FIG._7.
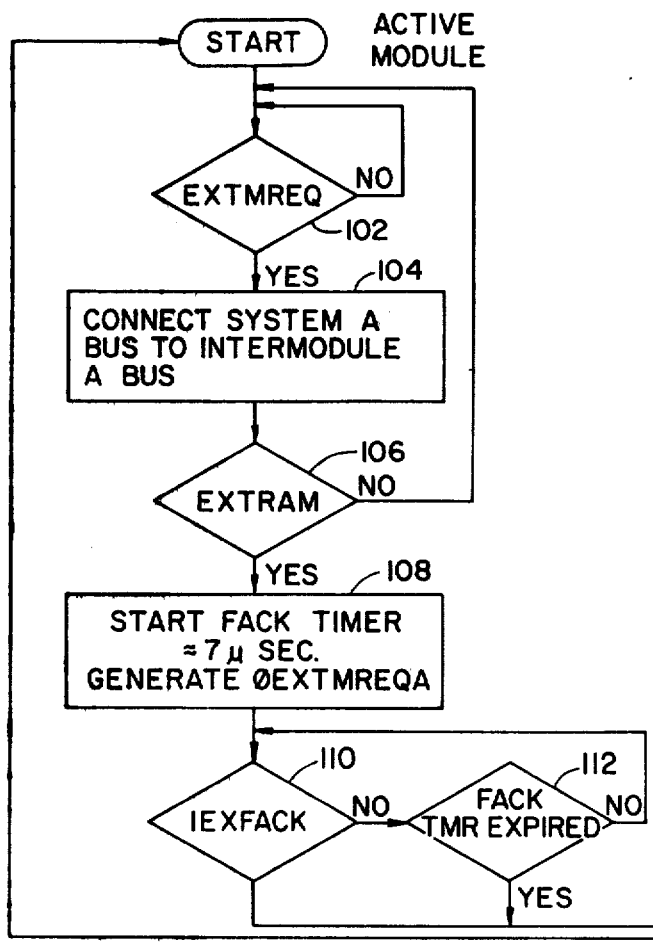
FIG._8.

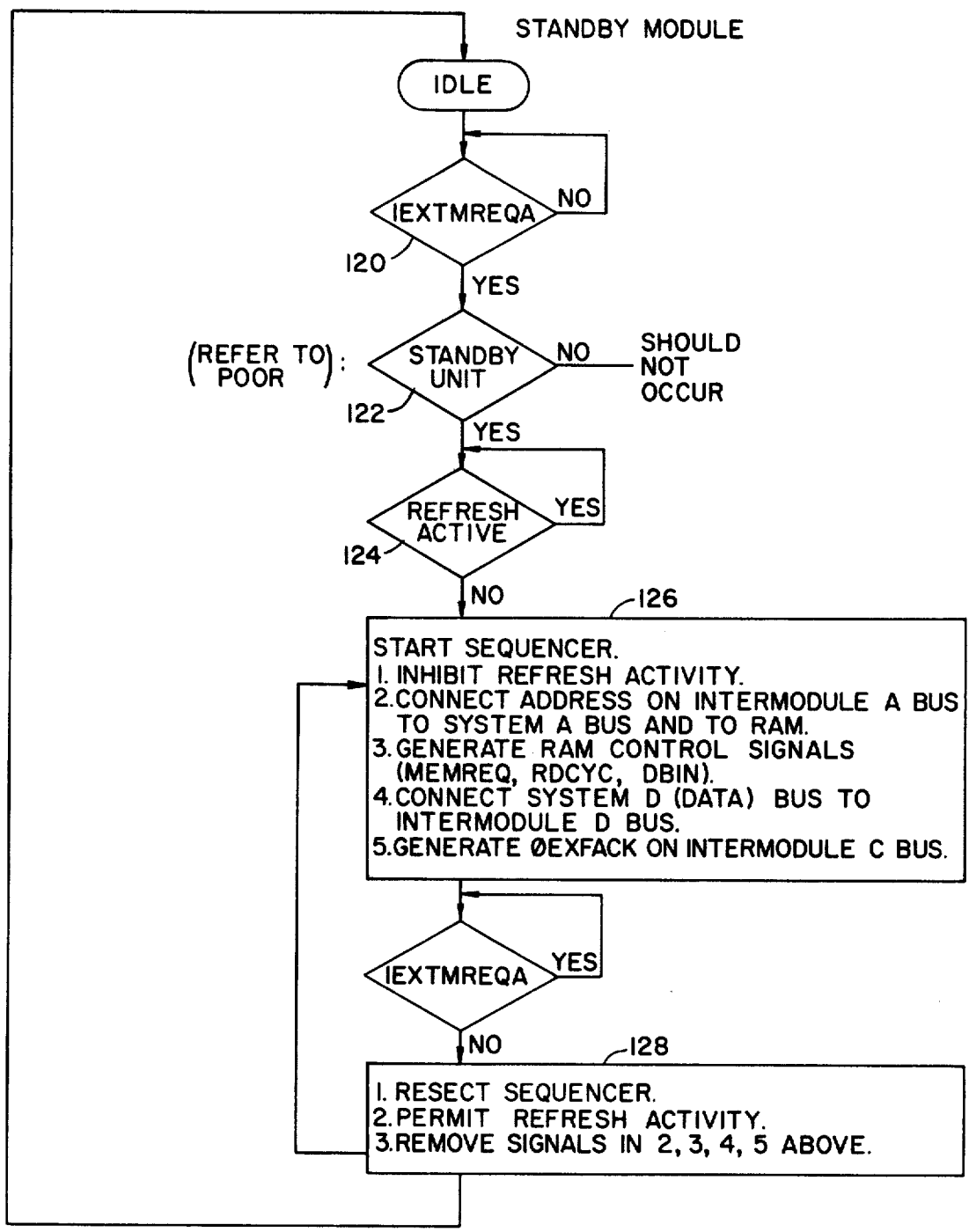
FIG._9.

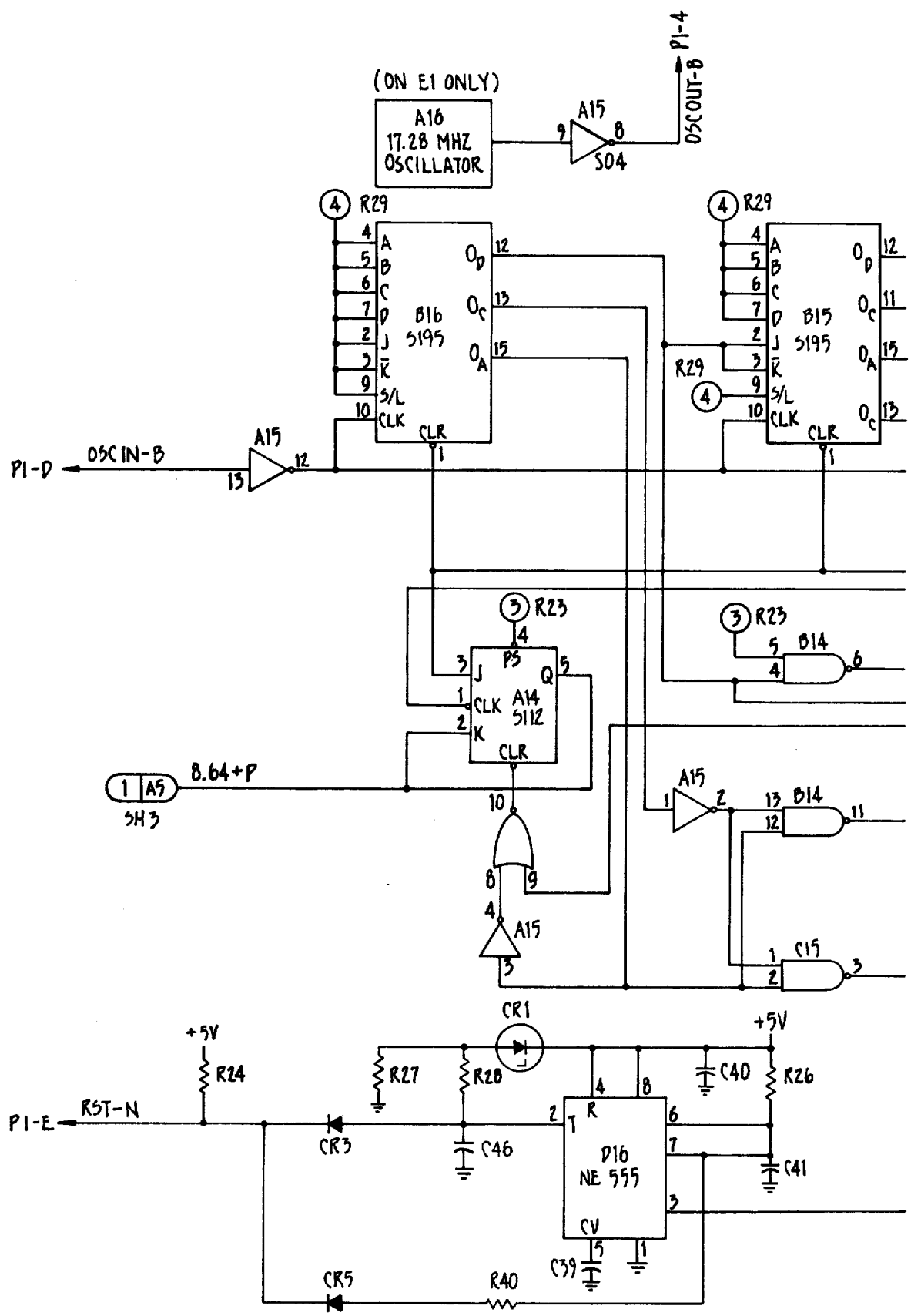
FIG. IOA.

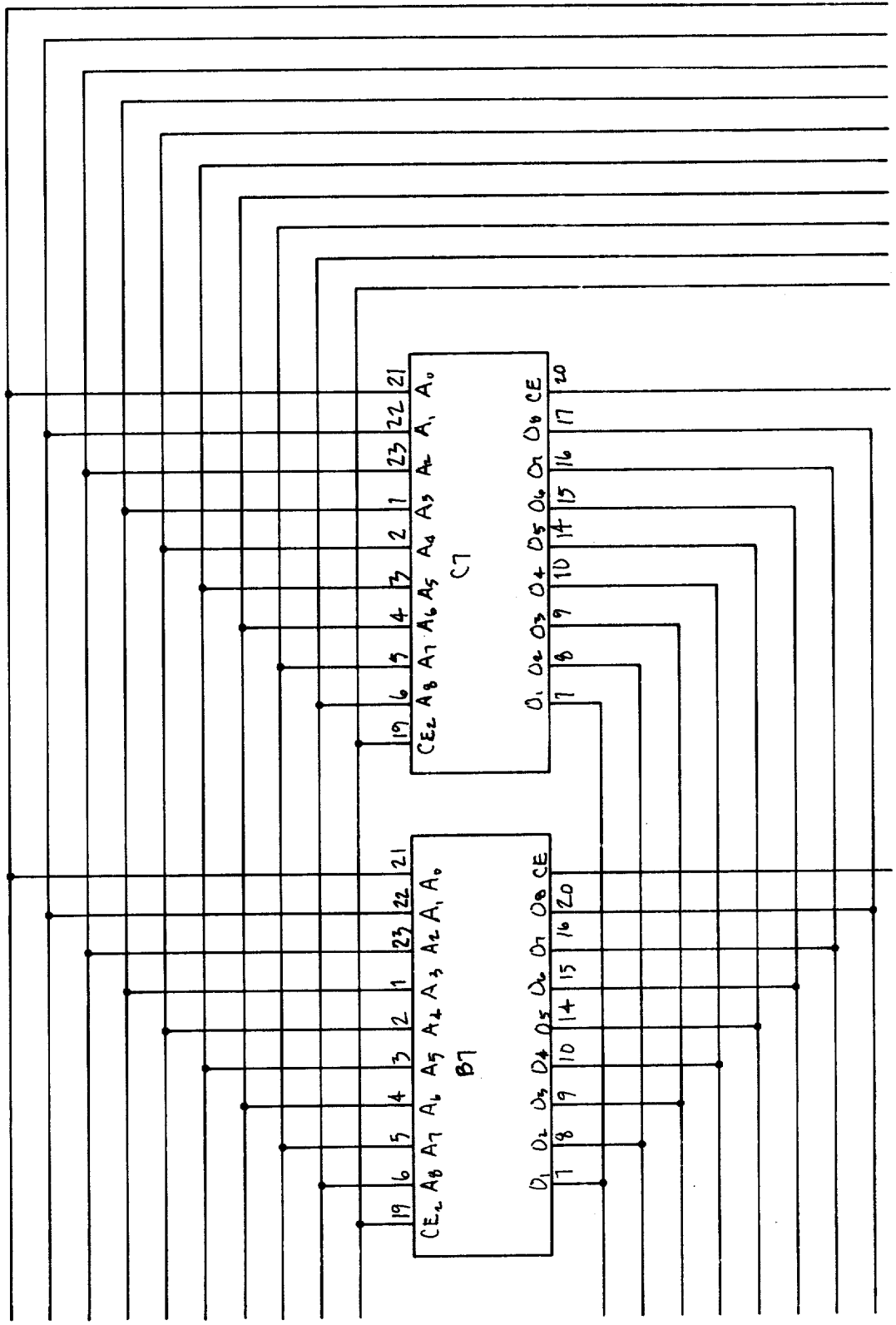
FIG. 10E".

FIG. 10E'''''.

| FIG. 10E. | FIG. 10E'. | FIG. 10E''. |
|---|---|---|
| FIG. 10E'''. | FIG. 10E''''. | FIG. 10E'''''. |

FIG. 10E''''.

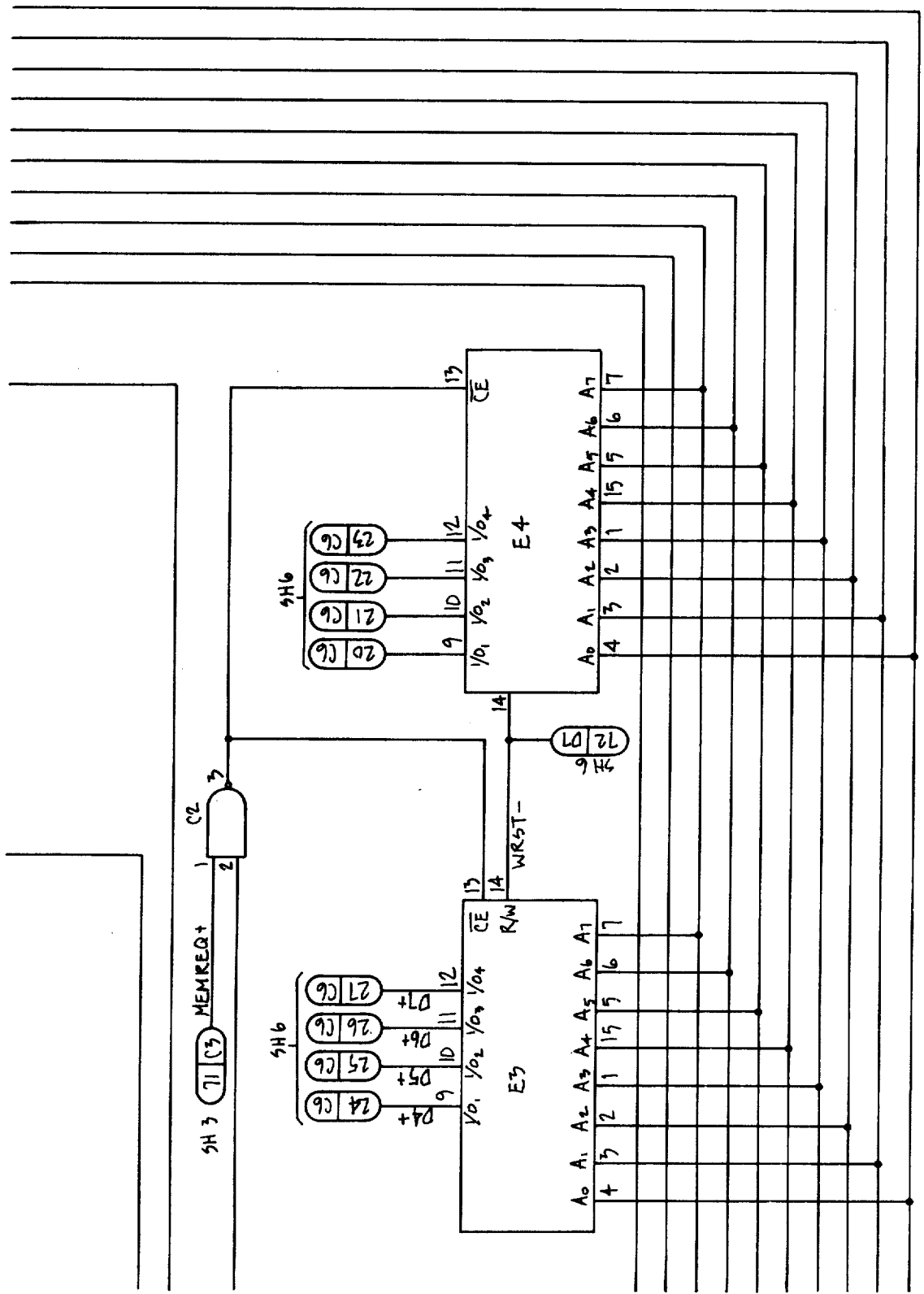
FIG. 10E'''''.

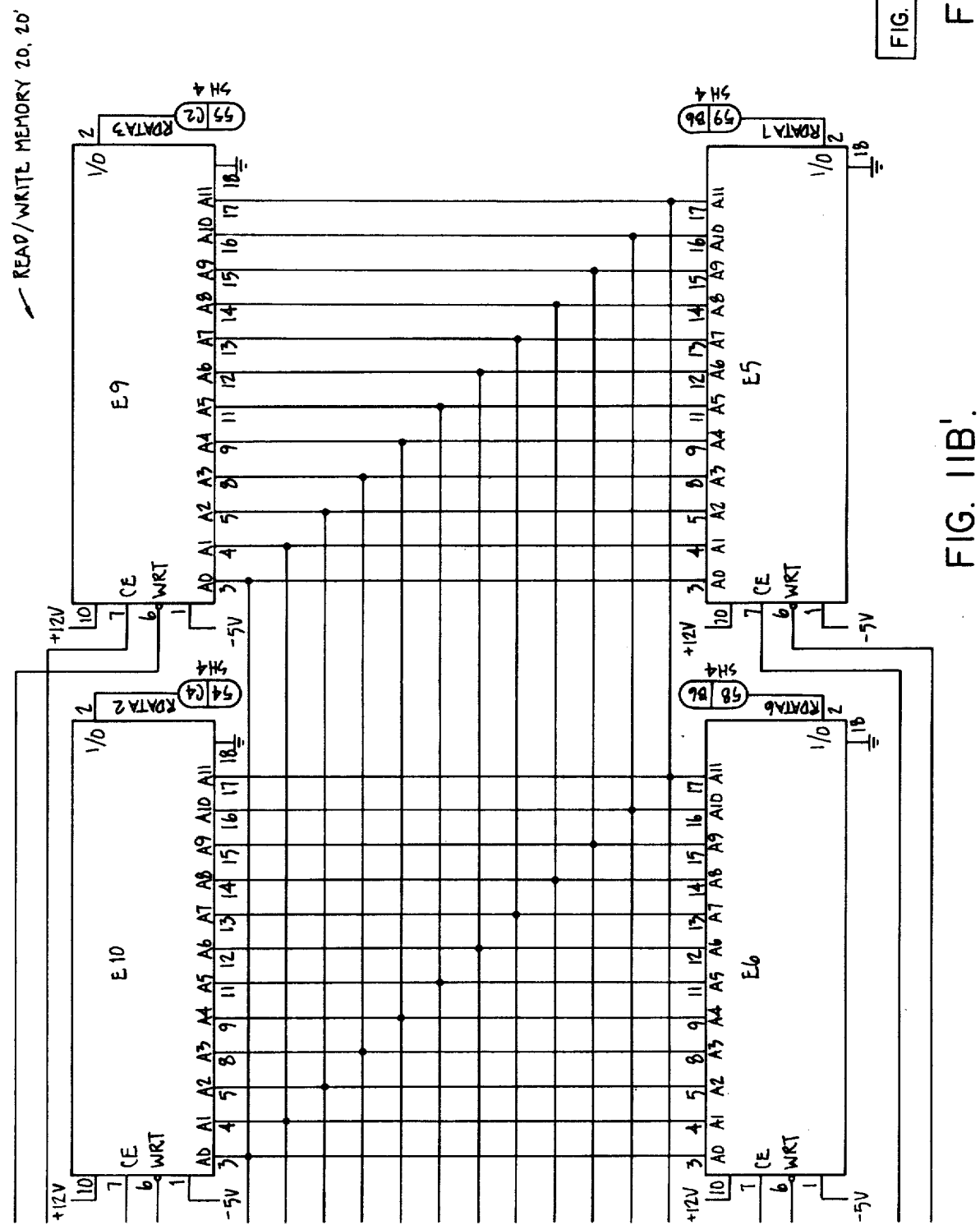
FIG. IIB'.

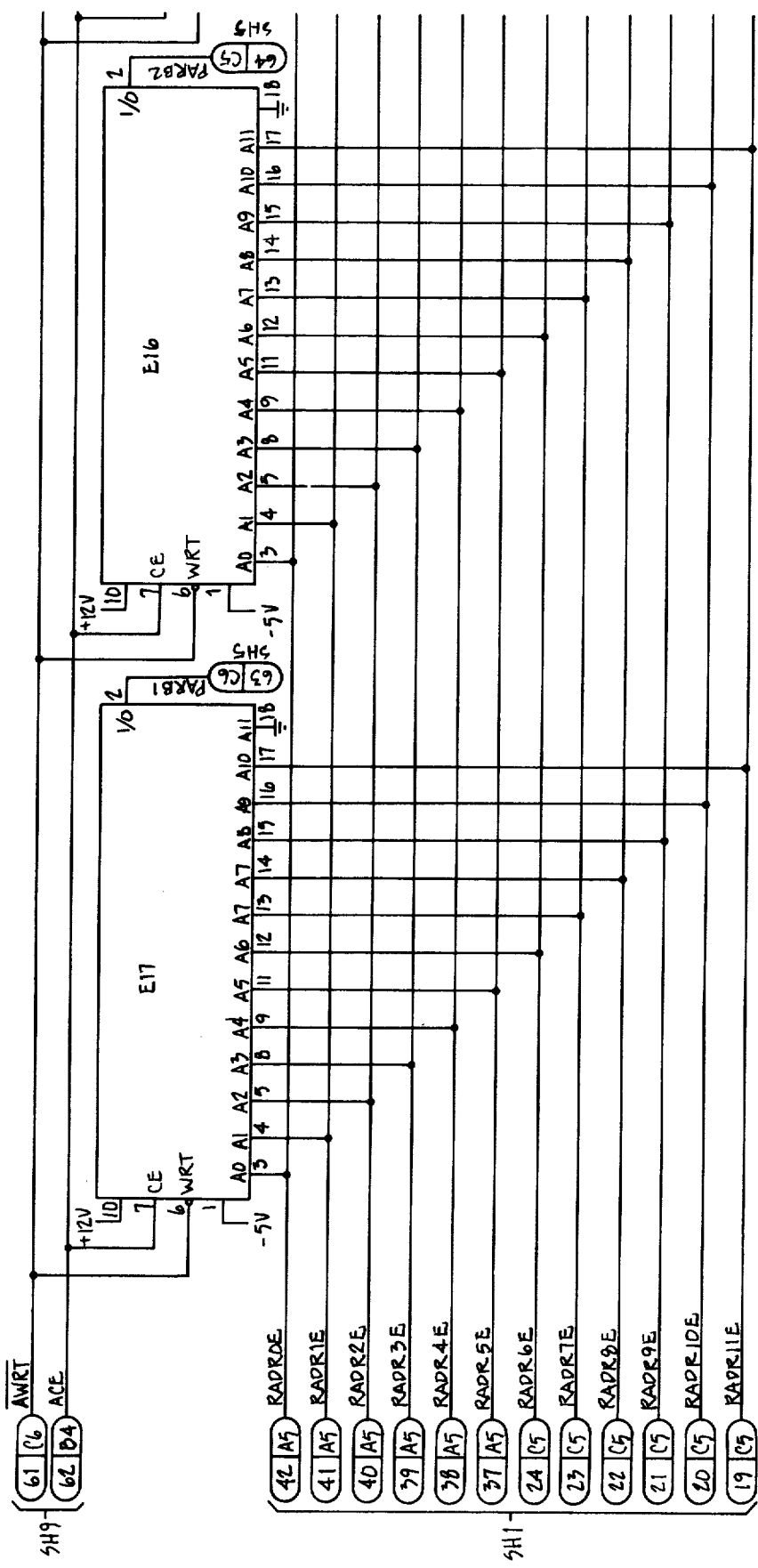
FIG. IIC.

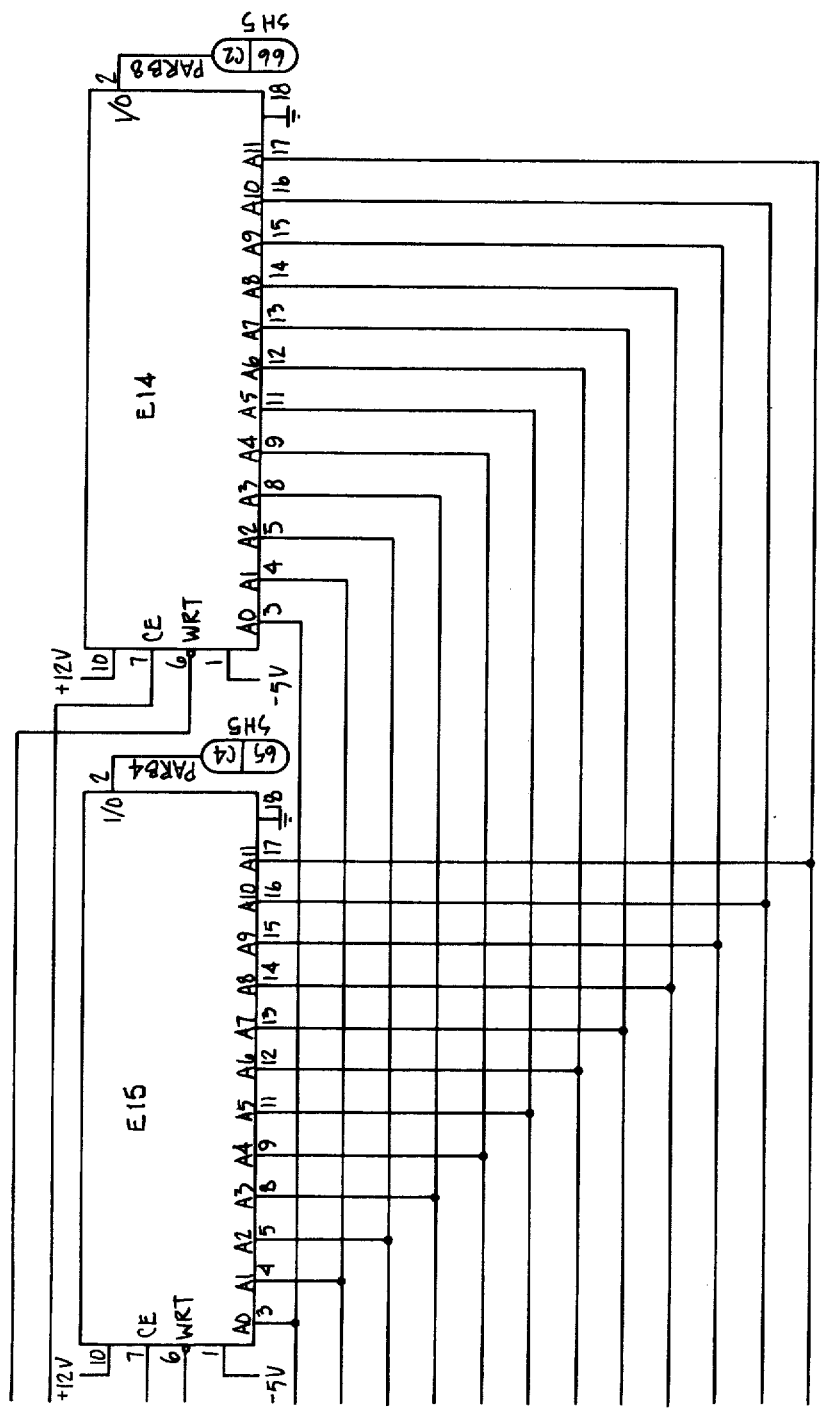
FIG. IIC'.

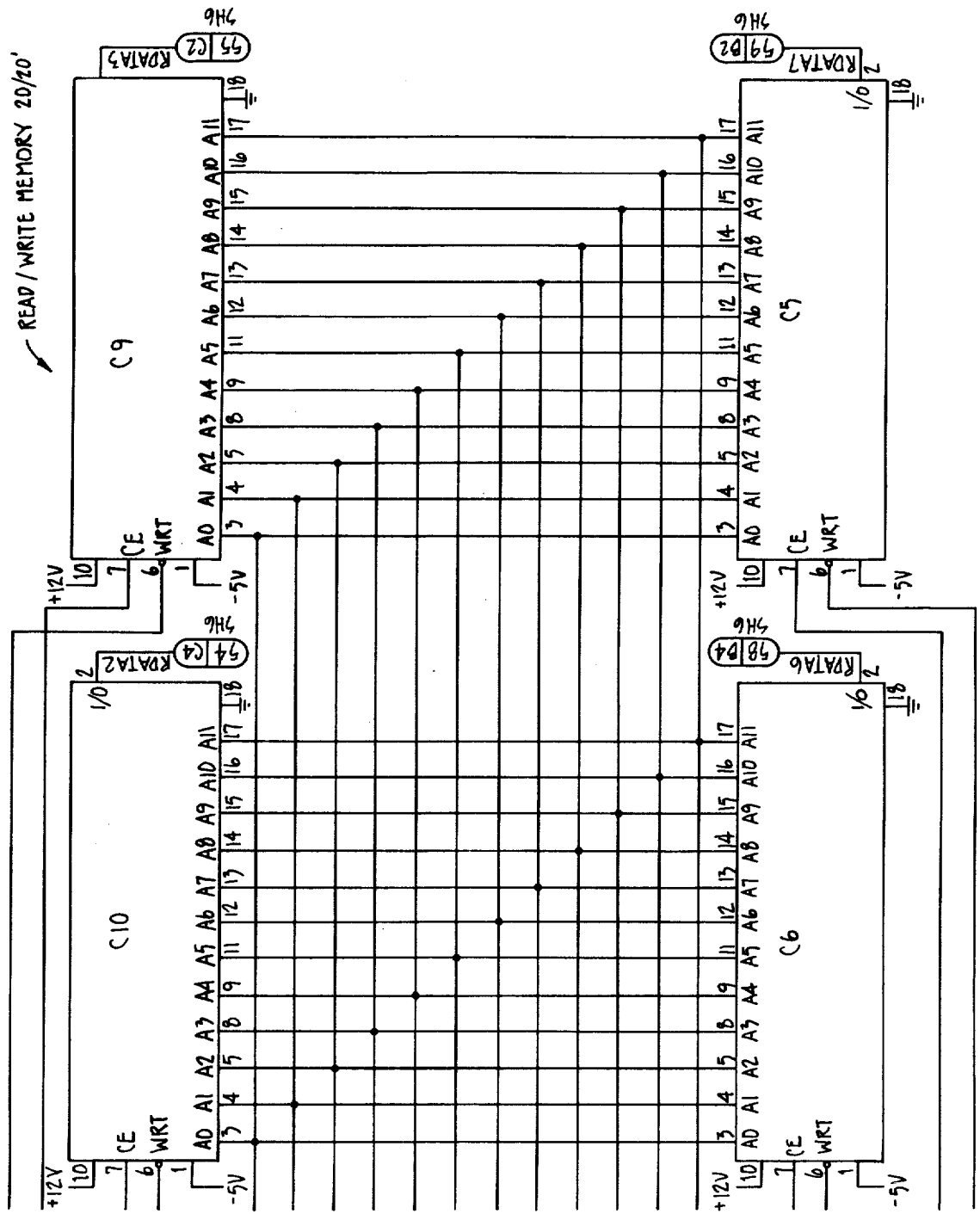
FIG. IID'.

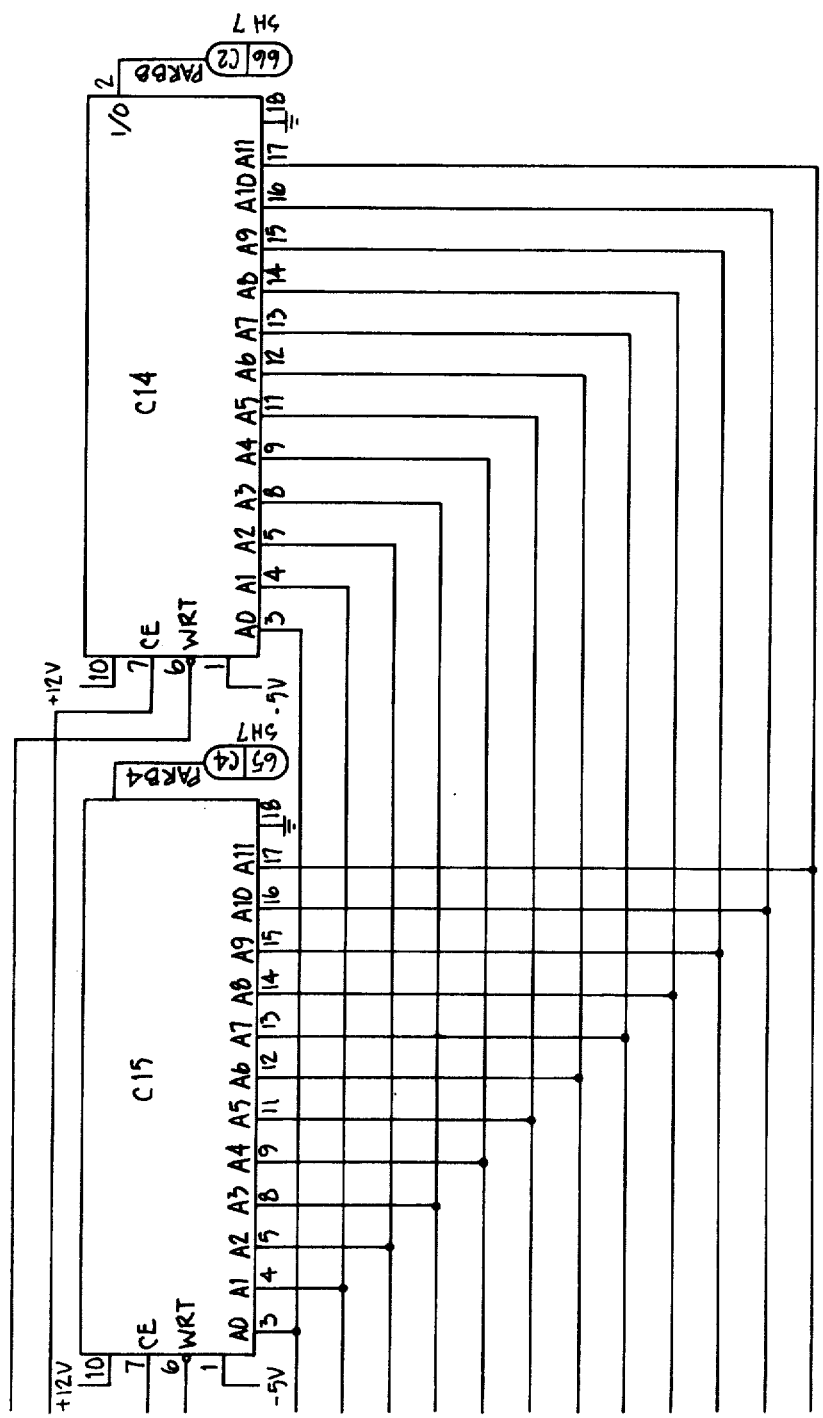
FIG. IIE'.

FIG. 11F".

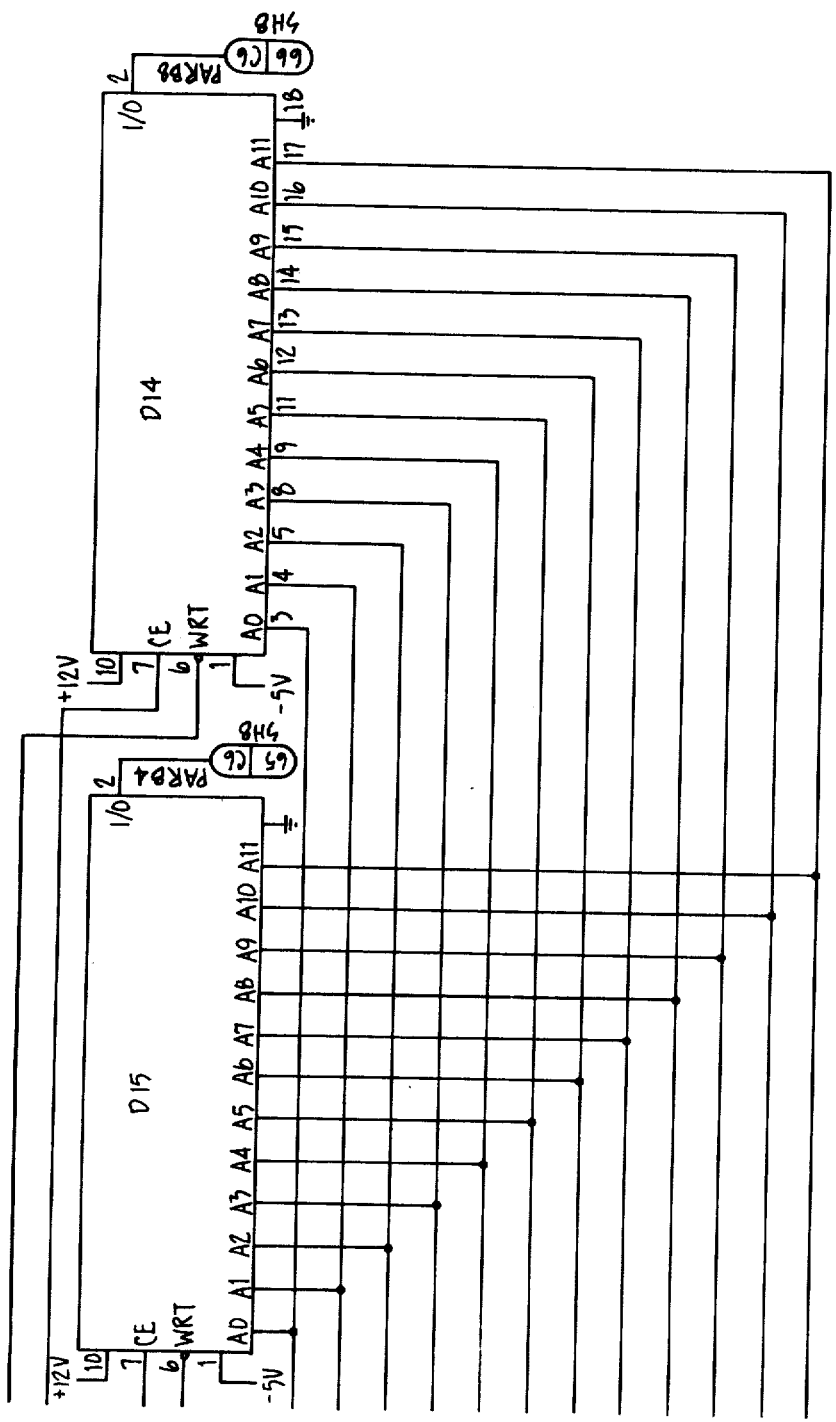
FIG. IIG'.

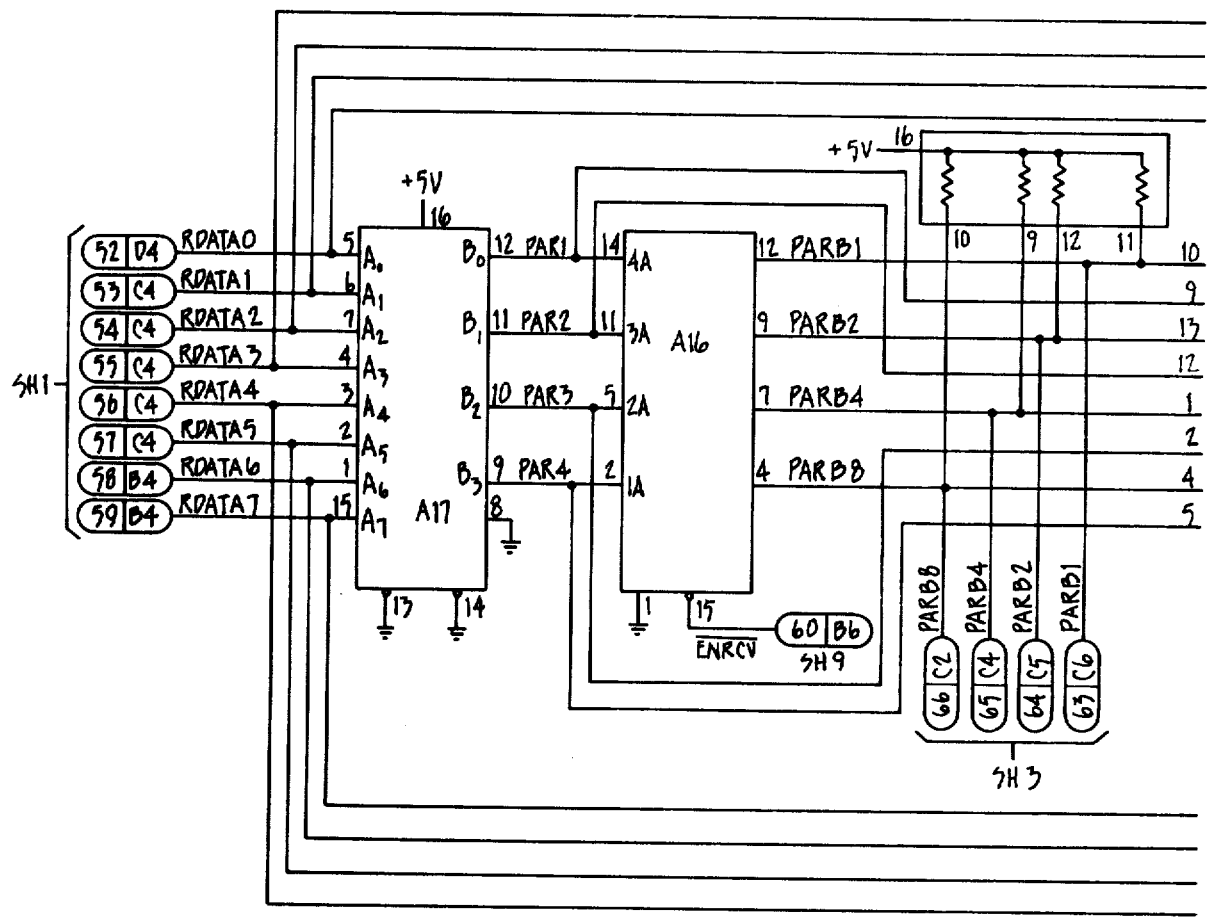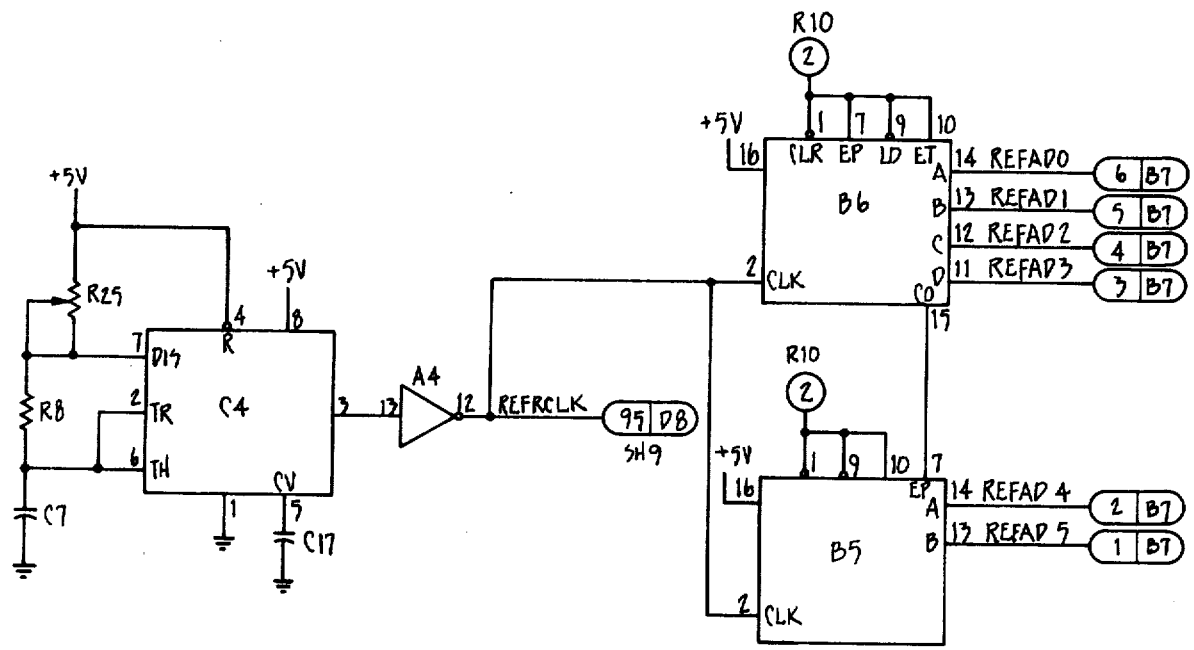
FIG. 11H.

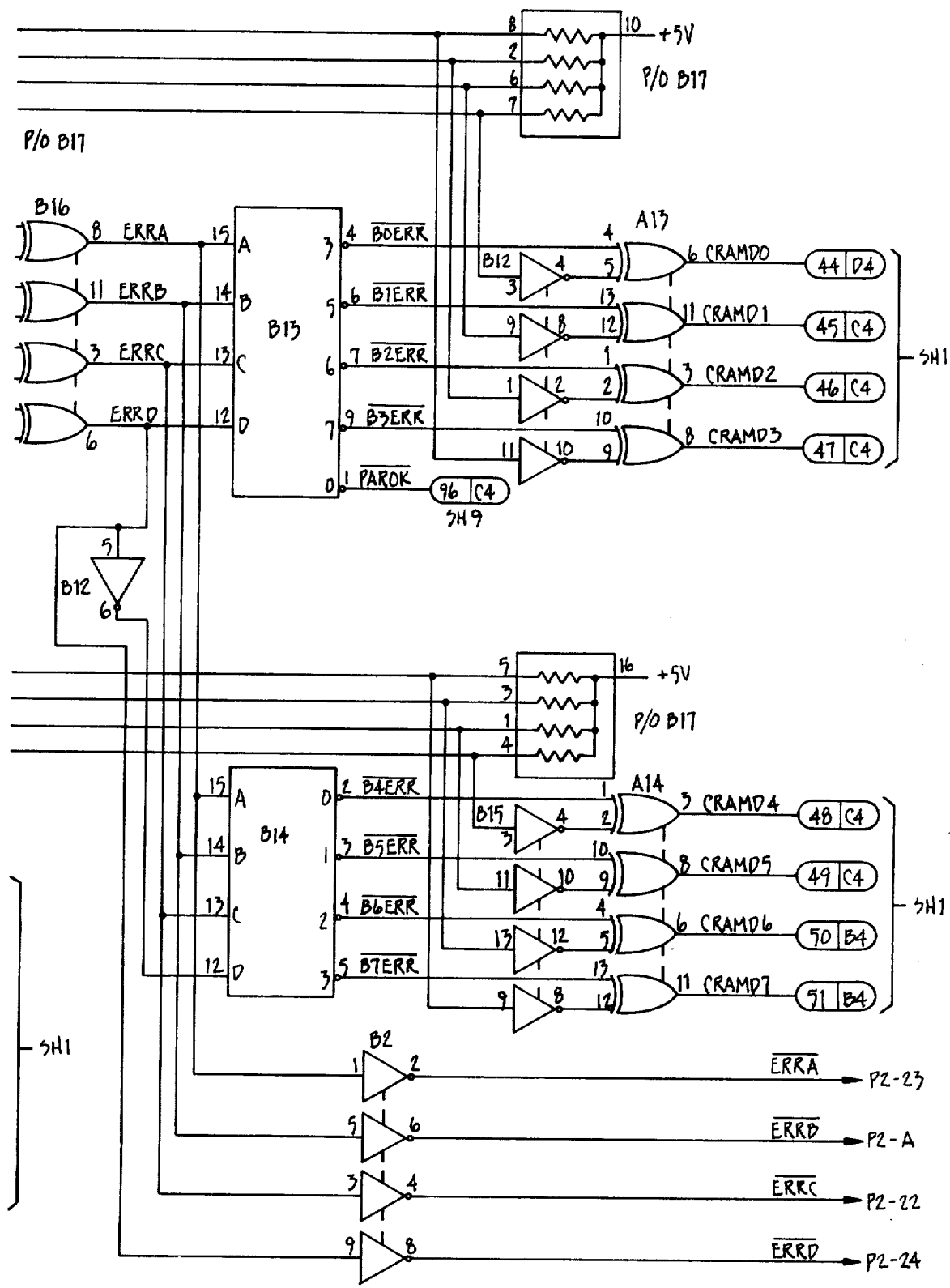
FIG. IIH'.  FIG. IIH".

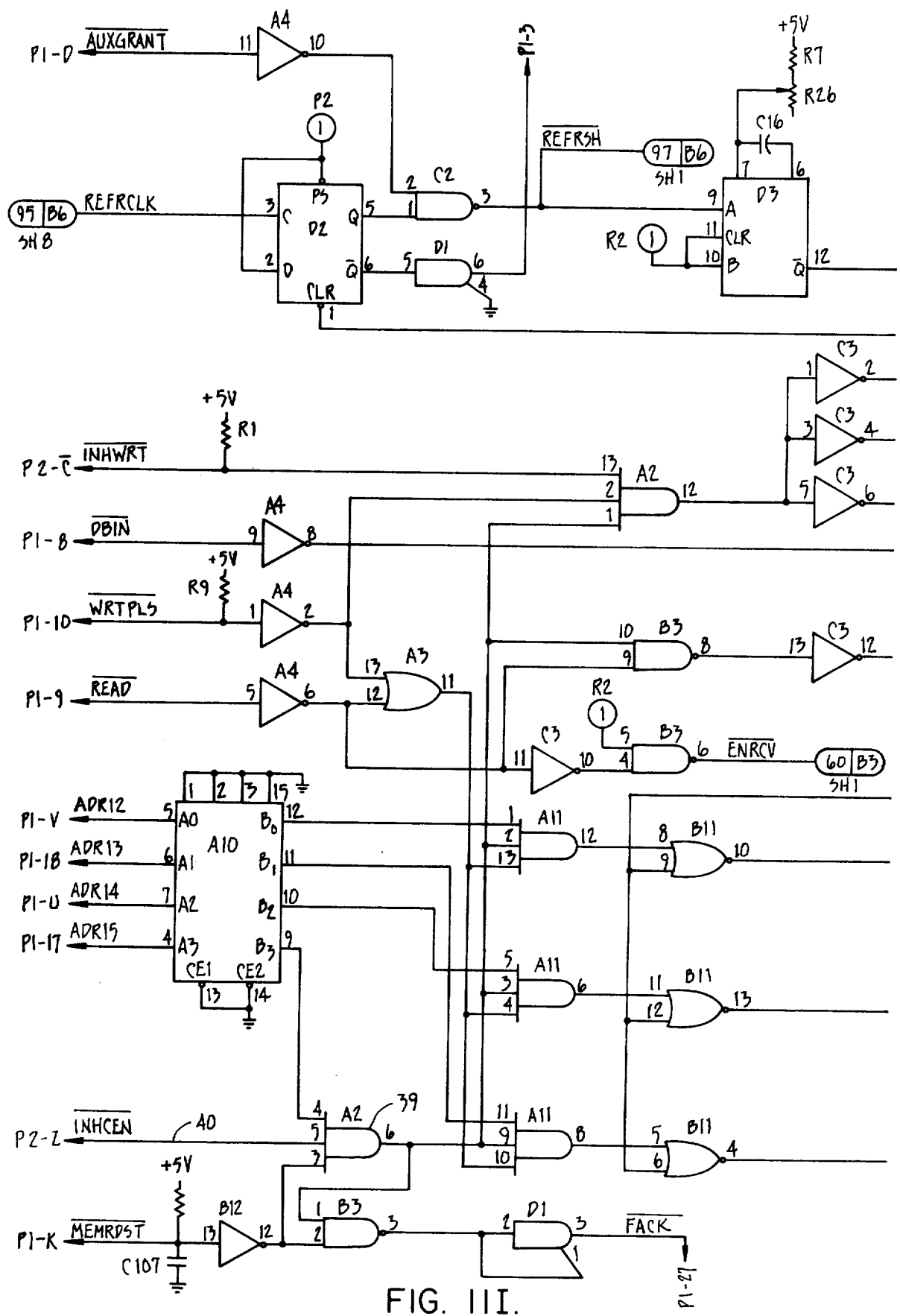
FIG. III.

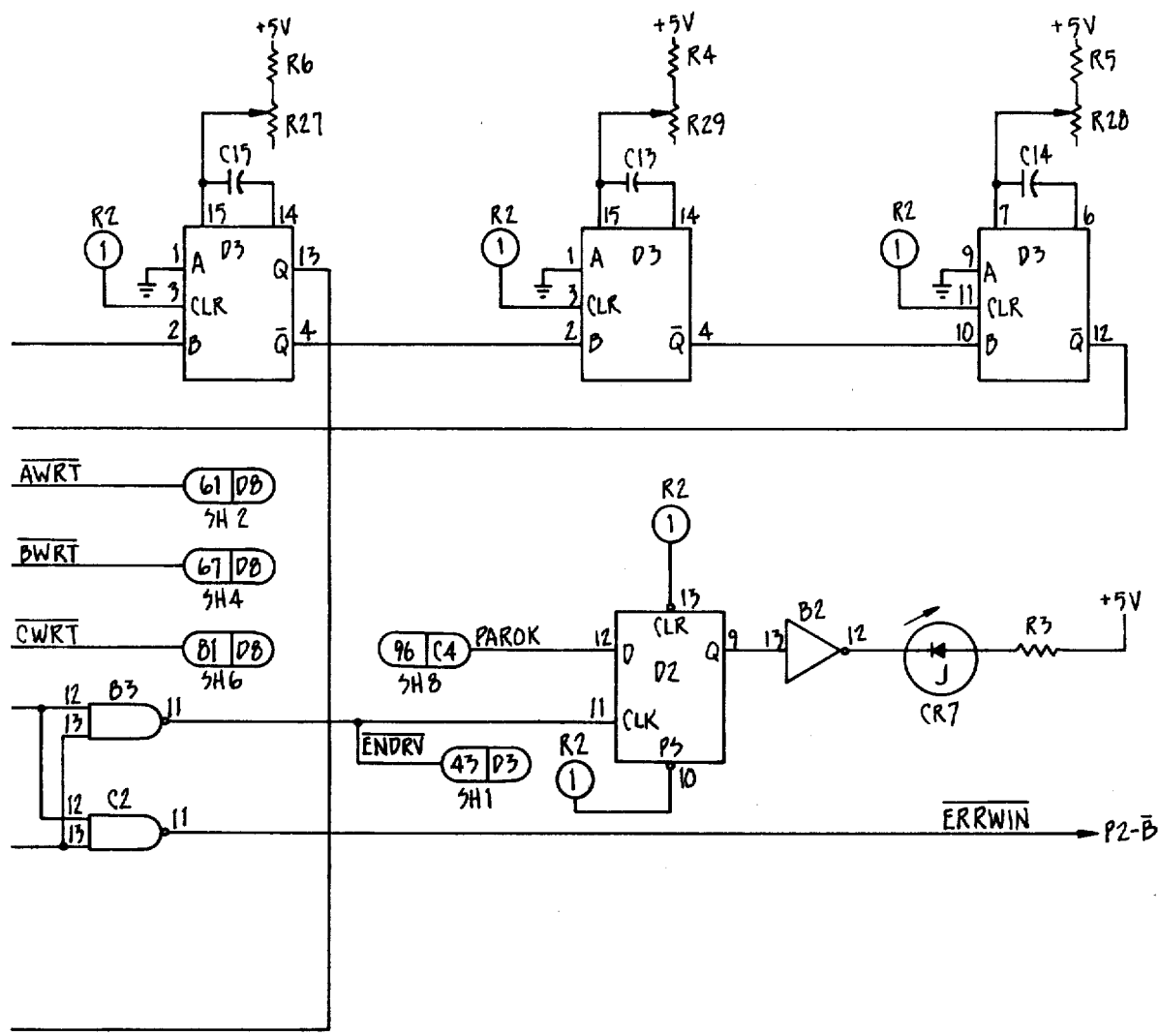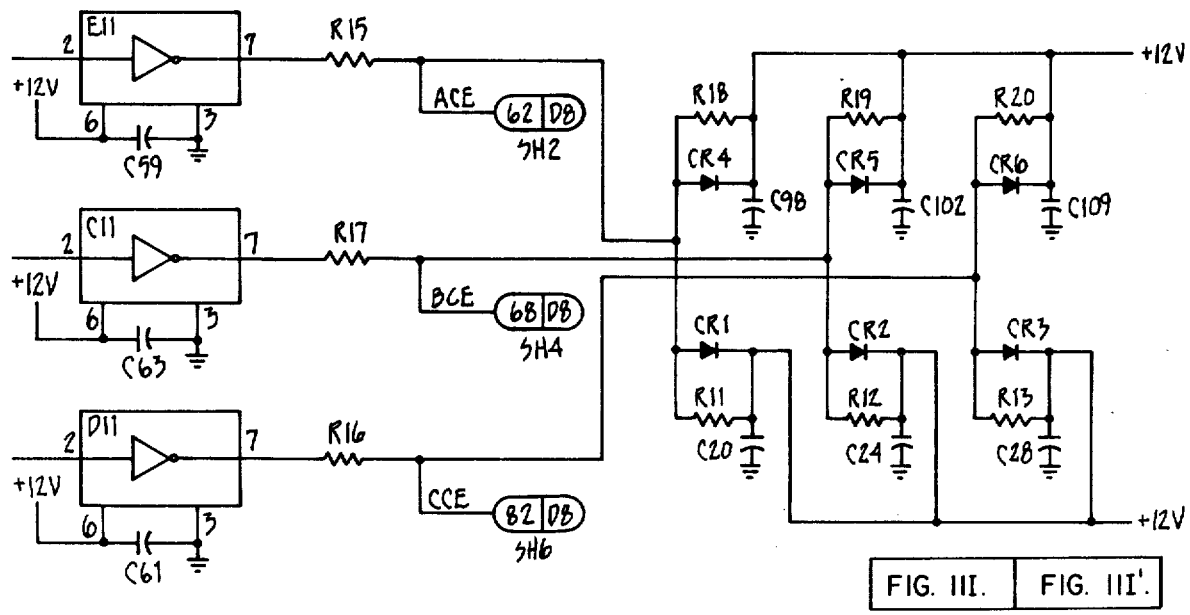
FIG. III'.  FIG. III".

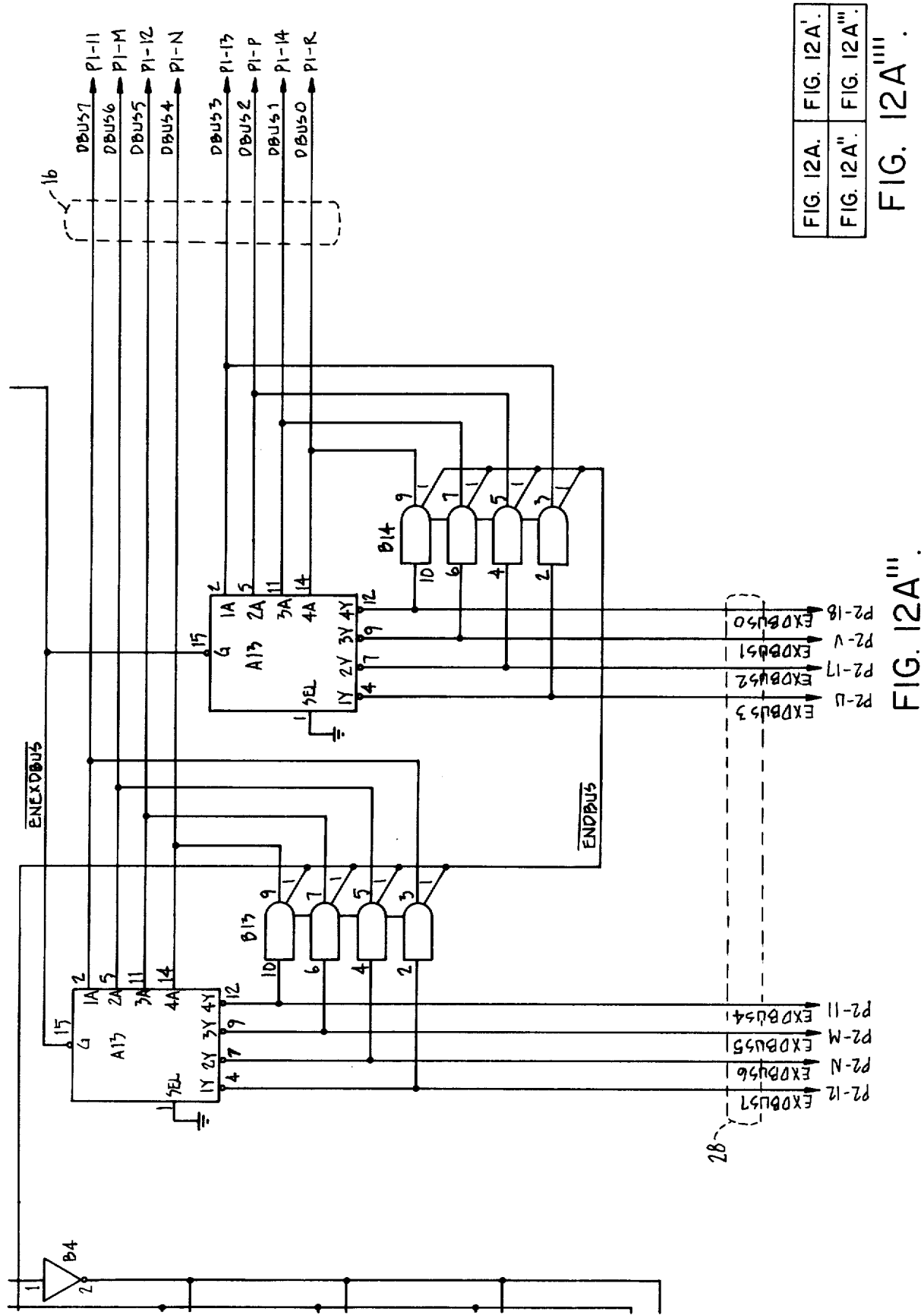

REDUNDANT MEMORY FOR POINT OF SALE SYSTEM

BACKGROUND OF THE INVENTION

This invention relates to point of sale systems and more particularly to point of sale systems having an active and an inactive redundant system with read/write memories in both systems.

In some types of point of sale systems, for example the system described in U.S. Pat. No. 3,946,220, a plurality of key terminals are connected to a central processing unit which processes data received from the key terminals utilizing stored memory routines in a read only memory and dynamic data which is maintained in a read/write memory. The central processing unit computes totals and sums and other routines as called for at the key terminal stations and outputs data to those key terminal stations for direct reading by the operator. The central processing unit also prints out the totals at a central control module. Since the particular point of sale system to which this invetion is directed is utilized in the world's largest chain of fast food outlets, it is extremely important that a back-up system be provided in the event that the primary system fails during operation. In one such system, two identical systems are provided. One system is run in an active mode to service the key terminal. The other system is inactive and is simply maintained as a spare. In the event that the primary system fails, the spare system may be activated to take over the control and operation of the key terminal stations which are interconnected to both the active and inactive systems.

Although the read only memories of both systems contain the same data, the read/write memory of the active system, prior to shut-down, contained the most current data in relation to the key terminal stations. Such data would be data involved in actual transactions which were taking place at the time of the shut-down. Since it is desirable that the spare system, once it is activated, should take over the computations formerly handled by the other system, it is necessary for the spare system, when it becomes active, to operate from the most current and valid data which is available to it. Unfortunately, the spare system when it becomes active has no way of knowing whether the data in the read/write memory of the formerly active system is either valid or more current than the data in the read/write memory of the now active system. Thus, means must be provided for first of all determining which of the two read/write memories contains valid data, next which of the two read/write memories containing valid data also contains the most current data and then for transferring, if necessary, the most current valid data to the read/write memory which is to be used in the now active system.

Previous data processing systems of which the inventors are aware were not addressed to this problem. Typically, redundancy by way of memory is supplied simply by having both the active memory and the back-up memory operate in tandem. A disadvantage of this arrangement is that in the event of a failure in the active system, the memory in the back-up system will be simultaneously affected and possibly invalidated. This can result from a defective component in the active system just prior to shut-down, for example. Some other systems do not involve tandem memories, but these systems do not provide means for checking the back-up memory both as to the validity of its contents and as to the currency of the contents versus the currency of the contents of the memory which is no longer active.

SUMMARY OF THE INVENTION

The above and other problems of prior art point of sale systems are overcome by the present invention of an improved point of sale system of the type having a plurality of key station terminals for entering and receiving sales data, a read/write memory for storing the sales data, a read only memory for storing instructions and constant data, a central processing unit for processing data from the key terminals and a terminal interface circuit for entering and extracting such data from the read/write memory and for displaying outputs based on such data at the selected key station terminals. The improvement of the invention comprises having a pair of such systems, one of which is active and one of which is inactive and which share a single set of the key station terminals. Means are provided for selecting which of such systems is to be the active system and which is to be the inactive system. The read/write memories of both systems normally contain both constant data as well as process data, that is data which changes during the course of operation of the system. The read/write memory of the active system would have constantly changing process data whereas the data of the inactive read/write memory would not change until its system became activated. The active read/write memory thus normally contains the most current process data. In the system of the invention, memory validation means are provided, which include the central processing unit and the read/write memory of the active system, for determining just prior to each start-up of the active system which of the read/write memories, that is the active or the inactive read/write memory, contains the most currently valid process data and, if the determination is that the inactive read/write memory contains the most currently valid process data, for transferring the process data contents of the inactive read/write memory to the now active read/write memory and for writing a signal into the active read/write memory representative of the fact that the active read/write memory now contains the most current and valid process data.

This signal is accomplished by providing a generation number counter in each read/write memory. The memory validation means, upon start-up of the active system, increments the generation number counter of the active read/write memory by one whenever either the process data of the inactive read/write memory is caused to be transferred to the active read/write memory or whenever the counts in the generation number counters of the read/write memories are equal.

Prior to incrementing the generation number counters, however, the system includes means for serially comparing certain constant data from each of the read/write memories with corresponding constant data from the active read only memory to determine the validity of the contents of each of the read/write memories. Thus, if a complete malfunction occurs in one of the systems which wipes out the contents of the read/write memory, the system of the invention will determine that none of the contents of that memory are valid. The system will then operate from the contents of the other read/write memory assuming that its contents are valid. In the event that the contents of neither read/write memory are valid, then the system of the invention will undertake to write into the read/write memory of the active system a certain portion of the constant data which is stored in the read only memory. This constant data includes such data as the system I.D. number, chains of addresses of data from the key terminal stations in the read/write memory, and a shut-down code. The shut-down code data tells the system whether the system was shut down or whether it is undergoing a malfunction.

It is therefore an object of the present invention to provide a redundant point of sale system in which the system is capable of determining whether the active memory or the inactive memory contains the most current and valid contents.

It is another object of the invention to provide a redundant point of sale system which is capable of operating from the most current, valid data available to it from either the active or the spare point of sale system.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a block diagram of the point of sale system according to the invention;

FIG. 2 is a more detailed block diagram of the redundant memory feature of the point of sale system according to the invention;

FIG. 3 is a word diagram illustrating the steps in the system of the invention which are taken to determine which of the two read/write memories contains the most current and valid data;

FIG. 4 is a diagrammatic illustration for use in explaining the steps depicted in FIG. 3;

FIG. 5 is a word diagram illustrating, in greater detail, a portion of the steps taken in FIG. 3;

FIG. 6 is a word diagram illustrating in further detail some of the steps taken in the diagram depicted in FIG. 5;

FIG. 7 is a word diagram illustrating in still further detail some of the steps taken in the diagram depicted in FIG. 6;

FIGS. 8 and 9 are two related word diagrams illustrating the steps taken in operating the read across control unit depicted in FIG. 2;

FIGS. 11A—11I are schematic diagrams of the read/write memories of both systems according to the invention.

DETAILED DESCRIPTION OF THE PREFERRED EMBODIMENT OF THE INVENTION

Figure 10A:
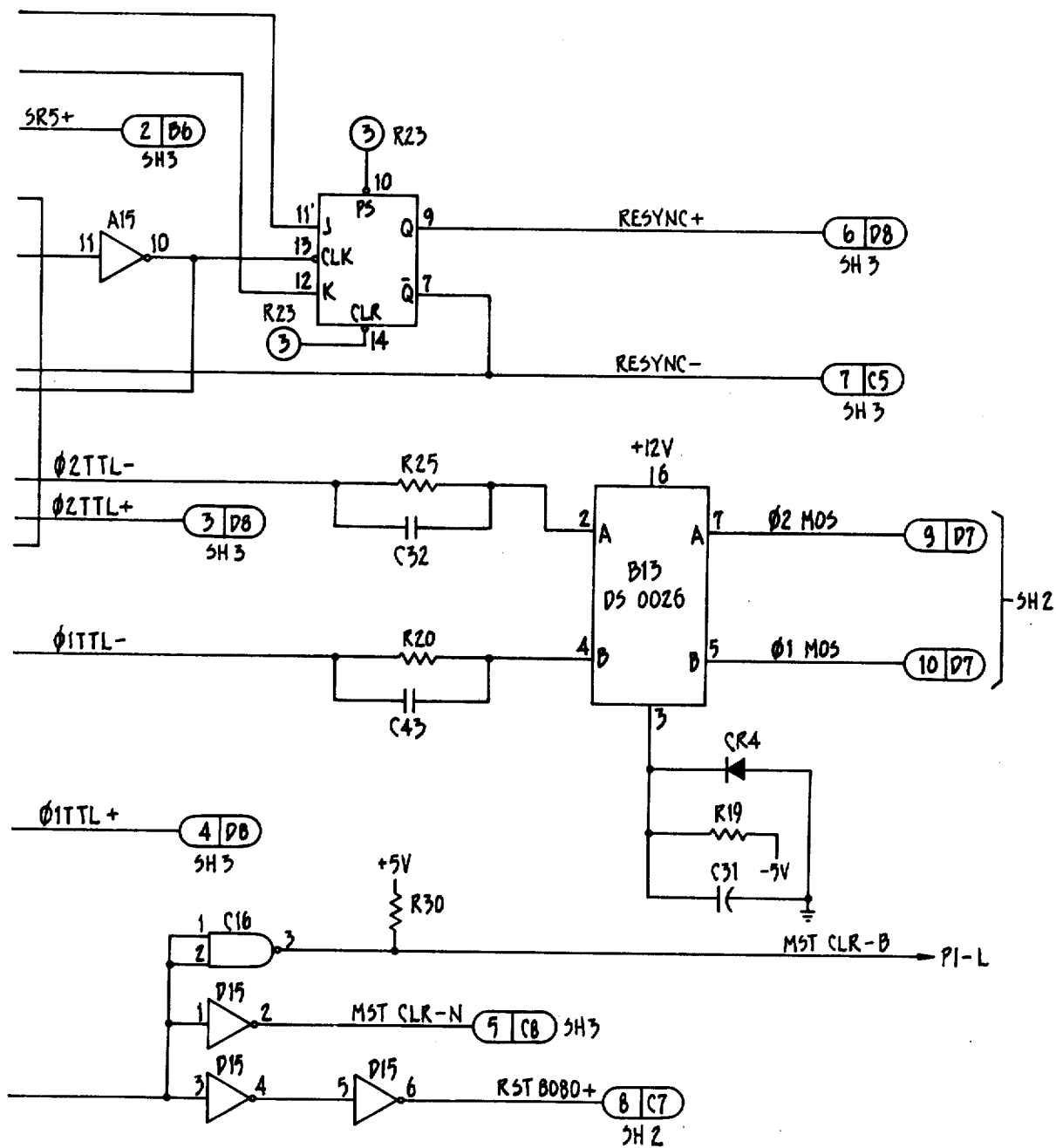
FIGS. 10A—10F are schematic diagrams of the micro process units according to the invention.

Referring now more particularly to FIG. 1, a block diagram of the point of sale system according to the invention is illustrated. An operator enters data such as the quantity of hamburgers to be ordered, etc., at a key terminal station 10 of which there are a plurality; up to as many as twelve in the present system. Such data would include the computation of the price of the item as well as tax and would display a total at the station.

The data to enable these operations to take place is fed from each terminal to a terminal interface unit 12. The terminals are connected to two entirely separate data processing systems. The first system, denoted system A in FIG. 1 will, for the purposes of describing the system of the invention, hereinafter be referred to as the active system. By active, it is meant that this system will be the system which will actively process the data received from the key terminal stations. The other system, system B, is maintained as a spare system. While operating as a spare system it does not receive data from the terminal stations and it does not undertake any data processing functions. Each of the two systems contains identical components. The components of system A will now be described, it being understood that corresponding reference numerals primed will be applied to the same elements of system B without further description.

The terminal interface unit 12 is connected to a microprocessor 14 through a bi-directional data bus and address bus shown conceptually as a single bus 16 in FIG. 1. Also connected to the microprocessor 14 through the system bus 16 is a programmed read only memory 18 and a random access memory 20, which will hereinafter be referred to as a read/write memory. Also connected to the microprocessor is a printer interface unit 22 which drives a printer 24.

As will be explained in greater detail hereinafter, it is an important feature of the invention to allow the microprocessor 14 of the active system to be able to address the read/write memory 20' of the inactive system under certain conditions. In order for this to take place it is necessary that the system bus 16 of system A be selectively interconnected with the system bus 16' of system B. This is accomplished through a read across control circuit 26 which is connected through an intermodule bus 28 to a read across control circuit 26' in the system B.

Each programmed read only memory 18 and 18' of both systems contains program operator messages which tell the operators at the key terminals 12 what operations are taking place and what keys must be punched. The PROM 18 also contains the software program for the microprocessor 14. The read/write memory 20 contains dynamic, processing data which, in the active system, changes during the course of operation. The data which is present in the read/write memory 20' of the inactive system is static during its inactive period but is maintained fresh in the memory. The data contained in the inactive read/write memory 20' would be not only the sums and totals for the operations which took place previous to its being put on inactive status but would also contain certain other data which is constant and which is common to both read/write memories 20 and 20' as will be explained in greater detail hereinafter.

It is possible for the system of the invention to be manually switched from one system to the other. Thus, for example, if the system A breaks down the system is switched manually to system B so that system A will be taken out of operation and system B will become the active system. As will be explained in greater detail hereinafter it is sometimes feasible for a switch-over to take place at the end of a day's operation, for example.

In still another situation, a power failure, the system will also shut itself down and write a coded message in the active read/write memory that shut down was successfully accomplished. This routine is carried out by the microprocessor.

Because at start-up after a shut down, for whatever reason, it is desirable to operate the active system with data which is most current and valid, it is necessary for the system to have the capability of determining which of the two read/write memories 20 and 20' contains the most current and valid data. The read/write memory of the system which was last active would theoretically contain the most current and valid data. However, this is not necessarily true in practice. If the shut-down occurred because of a malfunction in the active system, the data in the read/write memory of that system may be completely scrambled and invalid altogether.

Referring now more particularly to FIG. 2, alternating current power is supplied through a switch 30 to either a main power supply 32 for system A or a main power supply 32' for system B. Alternating current power is also supplied to an auxiliary power supply 34 for system A and an auxiliary power supply 34' for system B. The alternating current power to the power supplies 34 and 34' is not a function of the setting of the switch 30 but is present at all times as long as AC power is supplied to the system as a whole. The auxiliary power supplies 34 and 34' also contain batteries to supply power in the event of an overall failure of utility power to the system. The main power supply 32 is connected to the microprocessor 14 as well as to a system control unit 36. Similarly, the power supply 32' is connected to the microprocessor 14' and the system control 36' of system B. The power supply 34 is connected to the read/write memory 20 and read across control unit 26 of system A whereas the power supply 34' is connected to the read/write memory 20' and the read across control 26' of system B. Thus, the read/write memories 20 and 20' and the read across control circuits 26 and 26' receive power at all times. The system buses 16 and 16' are comprised of separate bi-directional address, data and control buses which are labeled in the figures. The operation of such buses in conjunction with the microprocessor is well known to those skilled in the art and therefore will not be described in greater detail. Specific reference is made in this patent application to the book *Microprocessors and Microcomputers*, by Branko Soucek, published by John Wiley and Sons, copyright 1976, and in particular to pages 251-298.

The microprocessor utilized in the present invention is of a type known as the 8080 made by various manufacturers such as Intel Corp. of Santa Clara, California. The random access memory 20 is comprised of a group of 4K bit dynamic memory chips. Three sets of eight of such chips are stacked side by side to give a memory which is eight bits wide by 4K bits deep per set, that is, 12K bytes. Such memory chips may be of a type known in the trade as type TMS4050-2, for example. The read only memory has sixteen K bytes and may be a standard type 82S115 manufactured by Signetics.

As was earlier described, the microprocessor 14 of the active system can selectively address the read/write memory 20 of its own system or the read/write memory 20' of the inactive system under certain conditions. The mechanism by which this is made possible will now be described in reference to FIG. 2. Since it is not feasible to have a single system bus 16 which interconnects both systems because of noise problems as well as other problems related to complete isolation of the two systems, it is necessary to utilize the intermodule bus 28 for interconnecting the two read/write memories. The read across control 26 and the read/write memory 20 are normally mutually exclusive in operation. Thus, when the microprocessor is addressing the read/write memory 20, the read across control 26 is disabled. When the microprocessor is addressing the read/write memory 20' of the inactive side through the read across control 26, the read/write memory 20 is disabled. The mechanism by which this is undertaken will now be explained.

A system control unit 36 is connected to the system bus 16. The functions of the system controller 36 are many. However, most of them do not apply to the present invention and therefore will not be described. Suffice it to say, that when the system controller 36 receives a certain address from the microprocessor 14 over the address bus 16, it supplies a signal to a select flip flop 38 which is part of the read across control unit 36. The supplying of the signal to the select flip flop 38 either sets it or resets it depending upon the information contained on the data bus 16, supplied by the microprocessor 14.

Depending on which way the selected flip flop 38 is set, it will provide a RAM ingibit signal (INHCEN) over a line 40 to the read/write memory 20 to disable a gate 39, shown in FIG. III, which prevents the read/write memory 20 from responding to any addresses over the address bus 16 from the microprocessor 14. Simultaneously, the read across control 26 is enabled by an EXTRAM signal from the select flip flop 38 to receive the same set of addresses from the microprocessor 14 and to place the addresses on the address lines of the intermodule bus 28.

The read across control 26 also receives a signal 42, labeled POOR in the figure, from the main power supply 32 to indicate that the read across control 26 is operating in the active system. The addresses received by the read across control 26 on the address line of the system bus 16 are propagated across the address line of the intermodule bus 28 to the read across control 26' of the inactive side. Similarly, in the inactive side the read across control 26', because it is not receiving the POOR signal 42' is thereby set to only respond to addresses on the intermodule address bus.

When the address is received by the inactive system on the address bus 16' through the read across control 26', that address will then be trasmitted to the read/write memory 20' on the address lines of the system bus 16'. The data called for by that address will then be placed on the data lines of the system bus 16' and will be propagated through the read across control 26', the data lines of the intermodule bus 28' and the read across control 26 to the data lines of the system bus 16 where that data will be processed by the microprocessor 14. The mechanism by which this activity is carried out is somewhat complex and will be described in greater detail hereinafter.

Thus, the microprocessor has been able to ignore its own read/write memory 20 and to access the read/write memory 20' of the inactive system through the read across controls 26 and 26' and the intermodule bus 28. FIG. 2 thus depicts the hardware by which the microprocessor of the active system has access to both of the read/write memories 20 and 20' under certain conditions. The control signal sequence which is necessary to operate this hardware will now be described with reference to FIGS. 3 and 4 which are together a word diagram of the operation of the hardware depicted in FIG. 3 during the redundant memory scheme.

As was previously mentioned, the microprocessor upon start-up of the active system must first determine which of the two read/write memories contains information which is valid at all. If it verifies that both memories contain valid information it then must also determine which of those two valid memories contains the most current information. The validation step is carried out with the aid of a temporary counter 44 whose count will hereinafter be symbolized by the letter V. The counter 44 is contained within a portion of the read/write memory 20 which is referred to as the scratch pad area. The scratch pad area also includes a flag 46 and a buffer portion 48. It will be understood by those skilled in the art that the flag, counter and buffer portions actually represent dedicated bit portions of the read/write memory which are addressable by the microprocessor 14. (See FIG. 4).

The word diagram or flow chart of FIG. 3 represents the sequence of operations undertaken by the combination of the microprocessor, the program read only memory the system control, the read across control and the two read/write memories. The flow chart of FIG. 3 is only the conceptual representation of what actually is taking place. The more detailed routines and hardware necessary to accomplish these results are depicted in greater detail in FIGS. 5, 6, 7 and 8 taken together with the schematic diagrams 10–12. Upon start-up of the point of sale system, the microprocessor causes the temporary counter 44 in the active read/write memory 20 to be set to zero at step 46 of FIG. 3. This step takes place when the power on reset (POOR) signal 42 appears. The microprocessor 14 is then instructed through the program instructions in the program read only memory 18 to verify the contents of the read/write memory 20 at step 48. It undertakes this verification process by comparing constant data stored in the read/write memory 20 with data which is held within the programmed read only memory 18. Such data would include the system I.D., chains of data addresses for the terminals within the read/write memory 20, and a shutdown code which tells the microprocessor whether the system has validly shut down prior to start-up. Assuming that the contents of the read/write memory 20 are invalid at step 50, the system then verifies the contents of the alternate read/write memory 20' at step 54. If the contents of the read/write memory 20 had been valid, the system would have incremented the count V in the counter 44 by one at step 52 before proceeding to step 54. If the contents of the alternate read/write memory 20' are determined to be valid at step 56, the count V in the counter 44 is incremented by two at step 58. Step 58 is skipped over if the contents of the read/write memory 20' are not valid.

Having verified the validity of the contents of the memories 20 and 20', the system then undertakes an analysis of the count in the counter 44 at step 60. If the count in the counter equals zero, then the system known that neither of the read/write memories 20 or 20' contains valid data. The microprocessor 14 under instructions from the programmed read only memory 18 then must initialize its own read/write memory 20 by writing certain constant data stored in the read only memory 18 into the read/write memory 20. This step is known as the initial start step 62. After step 62 is completed, the microprocessor 14 activates (starts up) the system at step 64.

If the microprocessor 14 determines that the count V in the counter 44 is equal to one, then it knows that the contents of its own read/write memory are valid and that the contents of the read/write memory 20' are invalid. It then activates the system at step 66.

If the microprocessor 14 determines that the count V in the counter 44 is equal to two, it knows that its own read/write memory 20 contains invalid contents but that the read/write memory 20' of the inactive or spare system does contain valid contents. The microprocessor is then instructed from instructions in the programmed read only memory 18 to copy the contents of the memory 20' into the read/write memory 20 at step 68. The microprocessor also must leave some trace of this copying in order to know in subsequent start-up operations how current the contents of its own memory are. It does this by incrementing a counter, hereinafter referred to as the generation number counter, represented diagrammatically as element 70 in FIG. 4 of the read/write memory 20. The count G within the generation number counter is incremented by one at step 68 and the system is then started up or activated at step 72. It must be understood that each read/write memory 20 and 20' contains its own, individual generation number counter 70 and 70', respectively, which are separate from each other and contain separate generation count numbers $G_A$ and $G_I$, respectively. It is only the counter in the active read/write memory which is incremented at any given time. At step 68 the entire contents of the read/write memory 20' are copied into the read/write memory 20. This includes the count $G_I$ in the generation counter 70'. By thereafter incrementing the counter $G_A$ in the generation number counter 70 by one, a heirarchy is thereby maintained between the read/write memories 20 and 20' based on the relative currency of their data contents.

Continuing with the flow diagram of FIG. 3, if the microprocessor 14 determines that the count V within the counter 44 equals three, it knows that both read/write memories 20 and 20' contain valid contents; however, it does not know which of the read/write memories contains the most current data. For example, at start-up the operator of the store in which the point of sale system is installed may have turned the power selection switch 30 from system B to system A. The microprocessor 14 would then know that its own read/write memory 20 may contain valid contents but it does not know whether or not the contents of the read/write memory 20 are the most current contents. Assuming that there had been no malfunction in the system B during its operation on the previous day, the contents of its read/write memory 20' would, in all probability, be the most current contents with which the system A should operate.

Again, assuming that system A is the active system and system B is the inactive system, and that microprocessor 14 at step 74 has determined that the count V within the counter 44 equals three, the microprocessor 14 thus knows that the contents of both read/write memories 20 and 20' are valid. It then must compare the count $G_A$ in the generation number counter 70 of the read/write memory 20 with the count $G_I$ in the generation number counter 70' of the read/write memory 20'. Assuming that the count $G_A$ equals the count $G_I$, the microprocessor knows that the contents of either of the memories 20 or 20' is not only valid but most current. It could operate with the contents of either memory. The microprocessor 14 then increments the generation number $G_A$ in the counter 70 of the read/write memory 20 by one at step 76 and proceeds to start up the system at step 78.

If, at step 74, the microprocessor 14 has determined that the counts $G_A$ and $G_I$ are not equal, the microprocessor then proceeds to step 80. At step 80, the microprocessor 14 compares the sum of $G_A$ plus one to $G_I$. If an equality results, then the microprocessor knows that the contents of the read/write memory 20' are not only valid but the most current. It then proceeds at step 82 to copy the contents of the read/write memory 20', including the count $G_I$, into its own read/write memory 20 and to increment the new generation number $G_A$ (formerly $G_I$) in the counter 70 of the read/write memory 20 by one to maintain memory heirarchy. Having done this, it then starts up or activates the system at step 84.

If, at step 80, an inequality resulted, then the microprocessor 14 knows that the read/write memory 20 contains not only valid contents but has the most current contents and proceeds to activate or start up the system directly at step 86.

It will be appreciated that the various steps depicted in the flow paths of FIG. 3 represent not only a sequence of instructions under which the microprocessor 14 or 14' operates but also are symbolic of the various logic components depicted in the schematic diagrams 10, 11 and 12. Thus, for example, a decision as to whether or not the generation number $G_A$ equals $G_I$ in step 74 is simply a comparison which is an AND logic function. The incrementing of counters is done simply by writing the appropriate incrementing data at the address in the read/write memory which represents the counter. Since such details are well known to those skilled in the data processing art, their complete recitation will be omitted since they do not aid in an overall understanding of the invention.

Referring now more particularly to FIG. 5, the verification steps 48 and 56 depicted in FIG. 3 will now be explained in greater detail. It is to be understood that certain sub-routines are within the program for the type 8080 microprocessor. One of these routines is MOVLR which calls for the microprocessor to copy the contents of the portion of the active read/write memory 20 whose addresses are designated by a register pair HL within the microprocessor into the scratch pad buffer region 48 of the read/write memory 20 whose address is specified by the contents of a register pair BC within the microprocessor, while leaving the content of the remaining portion of the read/write memory 20 unchanged. It will be understood by those skilled in the art that the B, D, H and L registers are built into the type 8080 microprocessors and the addresses are programmed into the register by instructions from the read only memory 18.

In order to undertake the steps 48 and 54, the microprocessor 14 utilizes a sub-routine which is referred to as MRVER. This memory verify routine in turn utilizes a sub-routine which is called memory request (MRREQ). The memory request sub-routine is depicted in FIG. 6 and will be described in greater detail. At this point it is sufficient to say that during memory request, data is removed from one of the read/write memories 20 or 20' to the scratch pad buffer region 48 of the active read/write memory 20. Whether the data is moved from the read/write memory 20 or 20' depends on the setting of a flag 46 which is within a part of the read/write memory 20 that is not relevant to the verification of that read/write memory. The setting of the flag indicates whether the read/write memory to be addressed is in the active or whether it is in the inactive system. The flag is actually set by an instruction executed by the microprocessor 14.

Once the MRREQ routine has moved the appropriate data from the read/write memory into the buffer portion 48 of the active read/write memory 20, it then compares this data with corresponding data stored in the programmed read only memory 18. The specific method by which the data is moved will be described in reference to FIG. 6. The type of data which is verified is constant data and symbolizes, for example, the system I.D., chains of addresses representing data which is stored in the read/write memory for the terminal stations 10, the code which signifies whether or not the system is successfully shut-down and any other type of constant data which could not be expected to change during ordinary operation. This data can be selected as part of the microprocessor's sub-routine. For the present example, the memory verification routine only compares the system I.D., the TCA chain address data, which is done for each one of the key terminal stations, and the shut-down code. With each validity step, the system has the opportunity to declare the contents of the memory invalid or, if valid, to proceed on to the next step in the flow chart depicted in FIG. 3. This same routine is used for both the steps 48 and 54.

Referring now more particularly to FIGS. 6 and 7, the flow chart for the sequence of instructions which are carried out during the memory request (MRREQ) sub-routine are depicted. As mentioned above, when the microprocessor calls for the memory request routine, the first thing that the microprocessor checks is the flag 46 within the read/write memory which is being verified. Assuming that the memory whose contents are being verified is the read/write memory 20, the flag will tell the microprocessor to proceed directly to the MOVLR sub-routine at step 90. As mentioned above, during MOVLR the constant data within the read/write memory 20 are copied into the buffer region 48. This is done by specifying the low address of the data and the number of bytes of data to be copied, which number is entered into a counter within the microprocessor. The data is then transferred a byte at a time into the buffer 48 until the counter indicates that all of the data has been copied.

Assuming that the microprocessor had determined that the flag 46 was set to indicate that the read/write memory 20' was to be verified, the sub-routine calls for cross memory transfer module (CMTM) 92. During the CMTM routine, the select flip flop 38 is set to "inactive" at step 94. This setting is undertaken under the control of the microprocessor 14. It will be remembered that once the select flip flop 38 is set to inactive it generates a RAM inhibit signal ($\overline{INHCEN}$) 40 to the read/write memory 20 blocking that read/write memory from responding to any addresses from the microprocessor 14. Correspondingly, the read across control circuit 26 will respond to those addresses, propagating them across the intermodule bus 28 to the read across control 26' of system B which forwards those addresses on the system B bus 16' to the read/write memory 20'. The microprocessor then proceeds to fetch a byte of data at step 96. During "fetch byte", one byte of data is brought from the read/write memory 20' through the system B bus 16', the read across controls 26 and 26' and the intermodule bus 28 to the system A bus 16 and ultimately to a built-in register E of the microprocessor 14. The microprocessor through the system control circuit 36 then sets the flip flop 38 to be in the active state at step 98. It is necessary to make this resetting in order for the microprocessor to store the contents of its E register into the buffer section 48 of the active read/write memory 20 at step 99. This routine is carried on until a counter within the microprocessor has determined that the requisite number of bytes of data have been moved. As in the MOVLR routine, in order to move data the low address of the data to be moved is specified and the count of the number of bytes of data to be moved are further specified by a counter within the microprocessor. The question is then asked at step 100 by the microprocessor, "Has the count reached zero?". That is, have the requisite number of bytes of data been transferred and received? Assuming that the answer is no, the sending address and the receiving address are incremented by one, that is one byte of data, the count in the counter is decremented by one, and the process is repeated.

Referring now more particularly to FIGS. 8 and 9, the series of steps undertaken by the read across control circuits 26 and 26' will now be described in greater detail. In FIG. 8 the sequence of control steps undertaken by the read across control 26 are depicted whereas in FIG. 9, the corresponding steps undertaken by the read across control 26' are shown. It should be understood that either of these units is capable of undertaking the opposite set of steps depending on whether or not it is in the active or the inactive system as determined by the POOR signal 42. Again, the basis of this discussion is that the side A system is active whereas the side B system is inactive.

Initially, the read across control unit 26 is dormant until it gets a read externally memory request (EXTMREQ) from the microprocessor 14 on a control line of the system bus 16. This enquiry is represented by the step 102 in FIG. 8. Assuming that the EXTMREQ signal is present, the read across control unit 26 proceeds to the next step 104 which is to connect the system A bus 16 to the intermodule bus 28. The read across control unit 26 then asks whether or not an EXTRAM signal is present at step 106. The EXTRAM signal is generated by the select flip flop 38 when it is set to block access to the active read/write memory 20. If the select flip flop 38 is not set so as to generate a RAM inhibit signal 40, then the EXTRAM signal will not be present and the read across control 26 will return to the start of its procedure.

If the EXTRAM signal is present at step 106, the read across control unit 26 then initiates a FACK timer 109 at step 108. The FACK timer 109 is simply an RC timer having an RC timer constant of seven microseconds. The term FACK stands for fast acknowledge and is a signal which is sent to the microprocessor to tell it that memory information will be available to be strobed into the microprocessor on the next cycle. The read across control circuit also generates its own version of the EXTMREQ signal which is designated φEXTMREQA on the control out line of the intermodule bus 28. This same signal as it is received at the read across unit 26' is designated IEXTMREQA.

After the generation of this φEXTMREQA signal, the read across control unit 26 proceeds to step 110 which is to wait for the appearance of an IEXFACK signal from the system B side. The generation of the IEXFACK signal indicates that the system B has placed its read/write memory 20' in contact with the system B bus 16' and that the read across control unit 26' has connected the system B bus 16' to the intermodule bus 28. In the event that the IEXFACK signal is not present, the read across control 26 goes to step 112 which asks "Has the original FACK timer set at step 108 expired?". If it has not, the read across control 26 returns to step 110 which is to look to see if IEXFACK has appeared. If the FACK timer has expired or if the IEXFACK signal has appeared, the read across control 26 then goes to the next step which is step 114. At step 114, the read across control unit 26 connects the intermodule data bus 28 to the data line of the system bus 16 and generates a FACK signal to the microprocessor 14 indicating that the microprocessor should proceed with whatever data is on the system data bus 16. The read across control 26 goes on to step 116 which is to ask whether or not the EXTMREQ signal is still present. If it is, the read across control unit 26 simply stays in a loop. If it is not, it goes on to step 118 during which it removes the φEXTMREQA signal, disconnects the intermodule data bus 28 from the data line of the system bus 16, removes the FACK signal, and resets the FACK timer after which it returns to the starting point of this routine. At step 116, the EXTMREQ signal will be dropped as soon as the microprocessor 14 is aware of the FACK signal generated in 114 and the data has been accepted by it.

Referring now more particularly to FIG. 9, the routine followed by the read across control 26' simultaneously with the routine of FIG. 8 which is followed by the read across control unit 26 will be described in greater detail. Initially, the read across control unit 26' is in an idle state until the IEXTMREQA signal is received at step 120. It will be remembered that the IEXTMREQA signal corresponds to the φEXTMREQA signal generated at step 108 in FIG. 8. If the signal is not present, the read across control unit 26' simply loops in an idle state. If it is present, it asks whether or not the POOR signal 42' is not present indicating that, in fact, the read across control unit 26' is the stand-by unit. Assuming that the answer to this question in step 122 is yes, the stand-by unit then asks the next question at step 124, which is "Is refresh activity in the read/write memory 20' being undertaken?". If the answer is yes, the read across control unit 26' waits until the refresh activity is stopped. Once it is stopped it proceeds to the next sequence of steps at block 126.

During the sequence of steps carried out at block 126, the read across control unit 26' initiates a sequencer contained within its circuitry. The sequencer, in a sequence of steps numbered 1-5, inhibits the refresh activity of the read/write memory 20', connects the address lines of the intermodule bus 28 to the address lines of the system B bus 16' and thus to the read/write memory 20'. The read across control sequencer then generates a series of RAM control signals known as MEMREQ, RDCYC, and DBIN. The sequencer of the read across control unit 26' also connects the data lines of the system bus 16' to the data lines of the intermodule bus 28 and generates the φEXFACK signal on the control line of the intermodule bus 28. It will be remembered that the φEXFACK signal propagated on the control out line of the intermodule bus 28 appears as the IEXFACK signal referred to in step 110 in FIG. 8 and signifies that the data called for in the read/write memory 20' is now available to the microprocessor 14 for reading.

Having completed step 126, the read across control unit 26' now looks again at the IEXTMREQA signal, which corresponds to the φEXTMREQA signal generated at step 108. This signal will be present until the microprocessor has acquired the data transmitted at step 126 at which time the microprocessor will remove the signal. The stand-by unit will then proceed to step 128 in which the sequencer of the read across control unit 26' is reset, refresh activity of the read/write memory 20' is permitted and the signals for the substeps 2, 3, 4 and 5 of step 126 are removed. The read across control unit 26' then returns to its idle state.

Figure 10B:
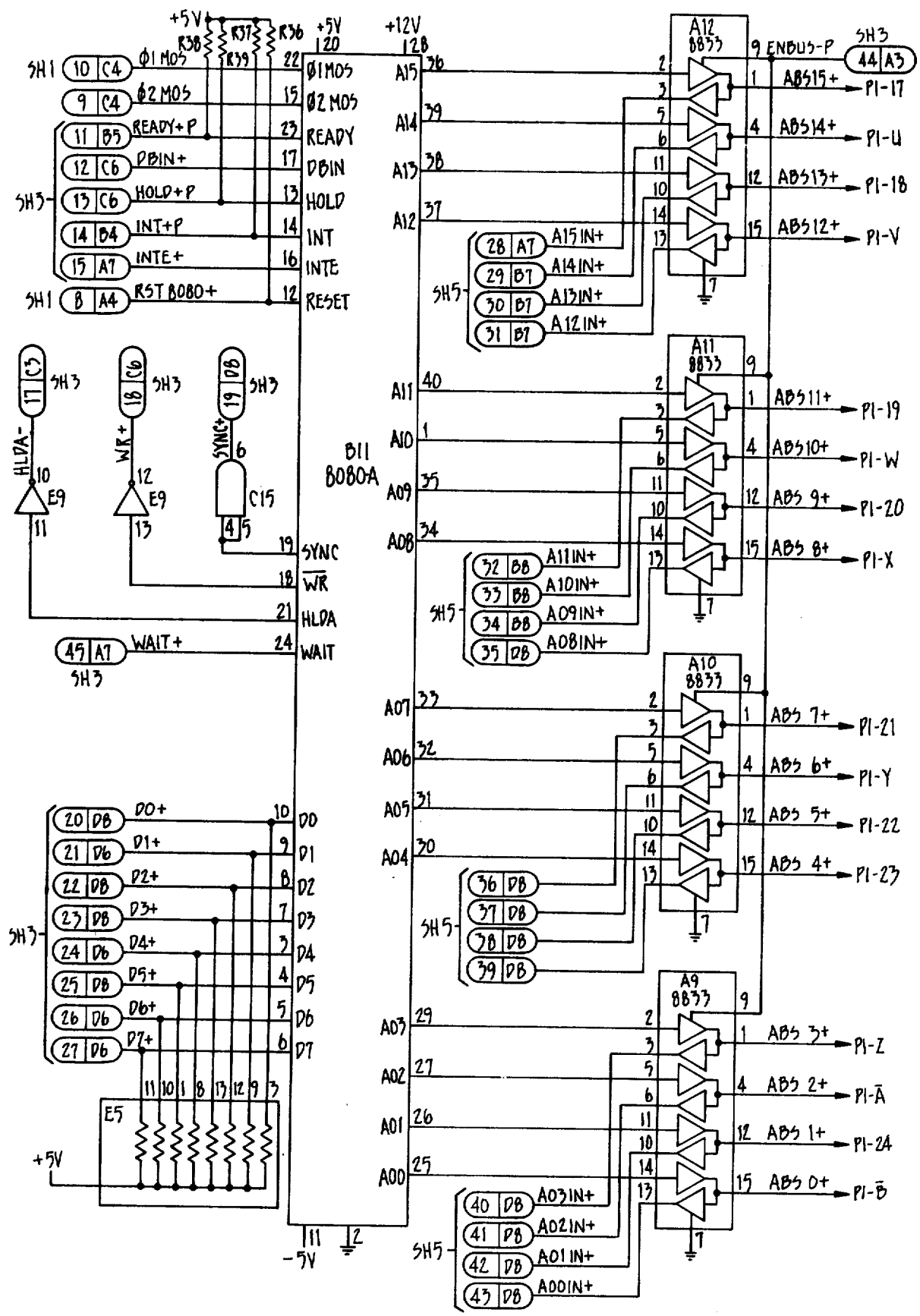
Figure 10C:
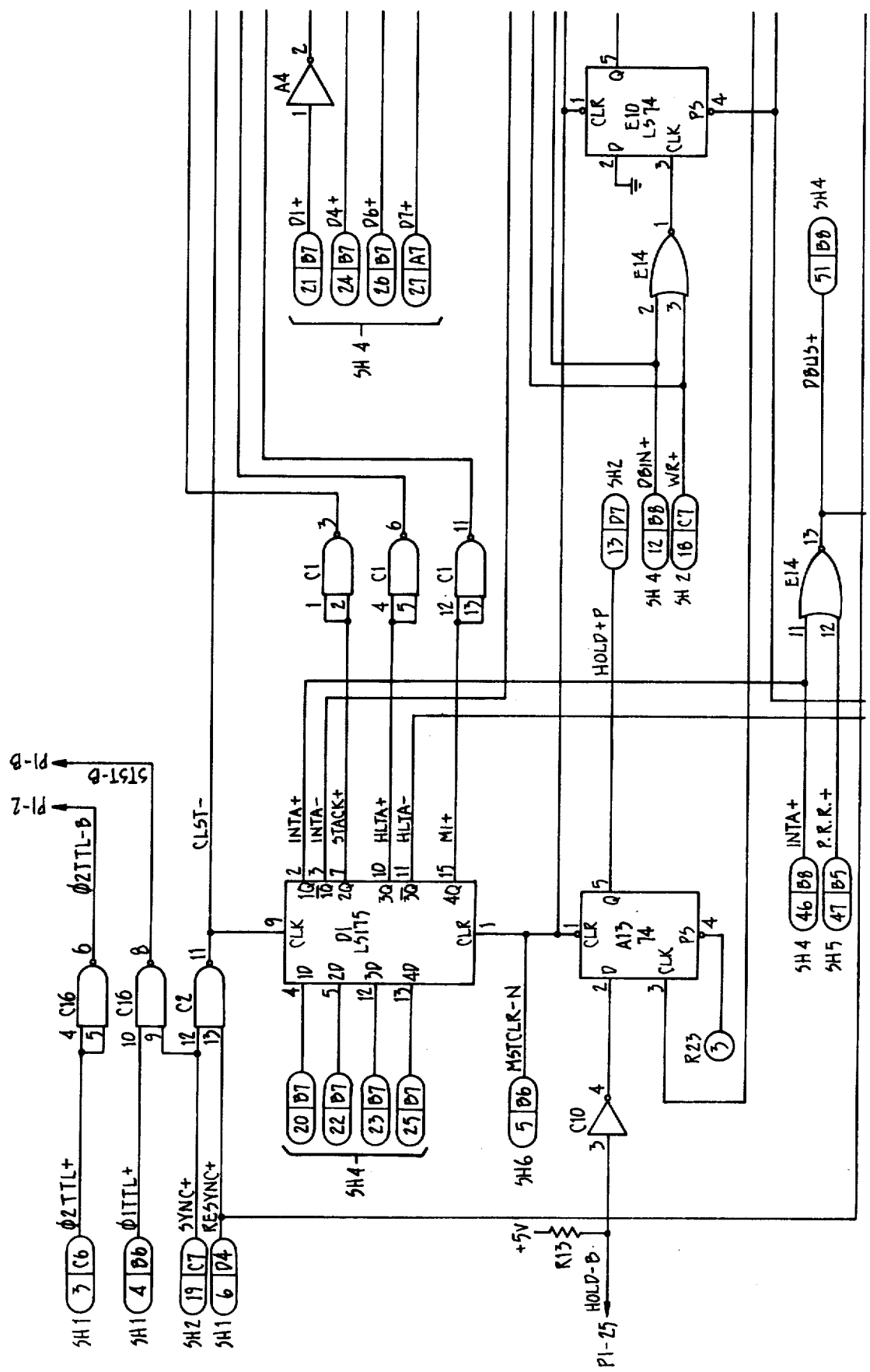
Figure 10C:
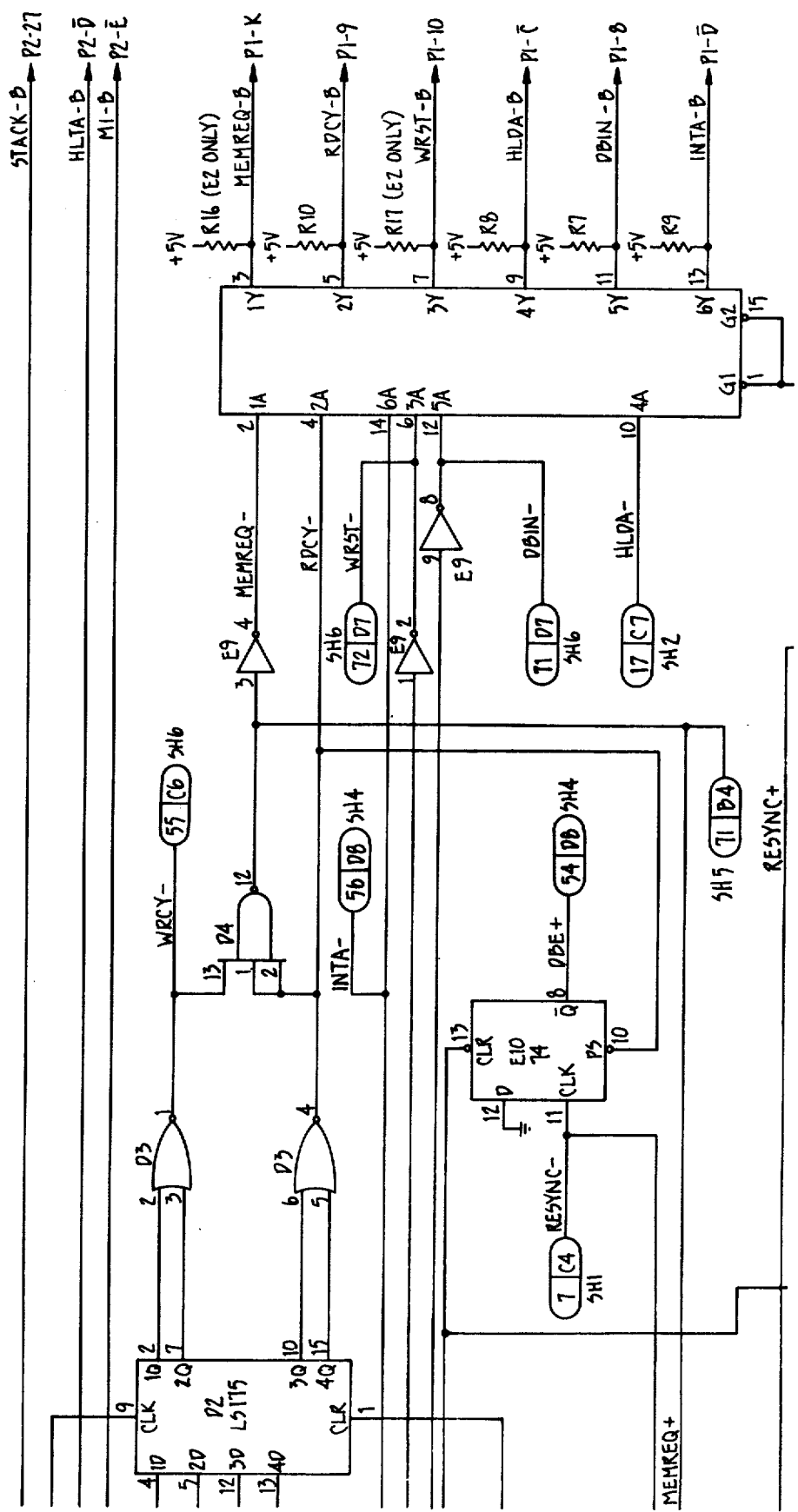
Figure 10C:
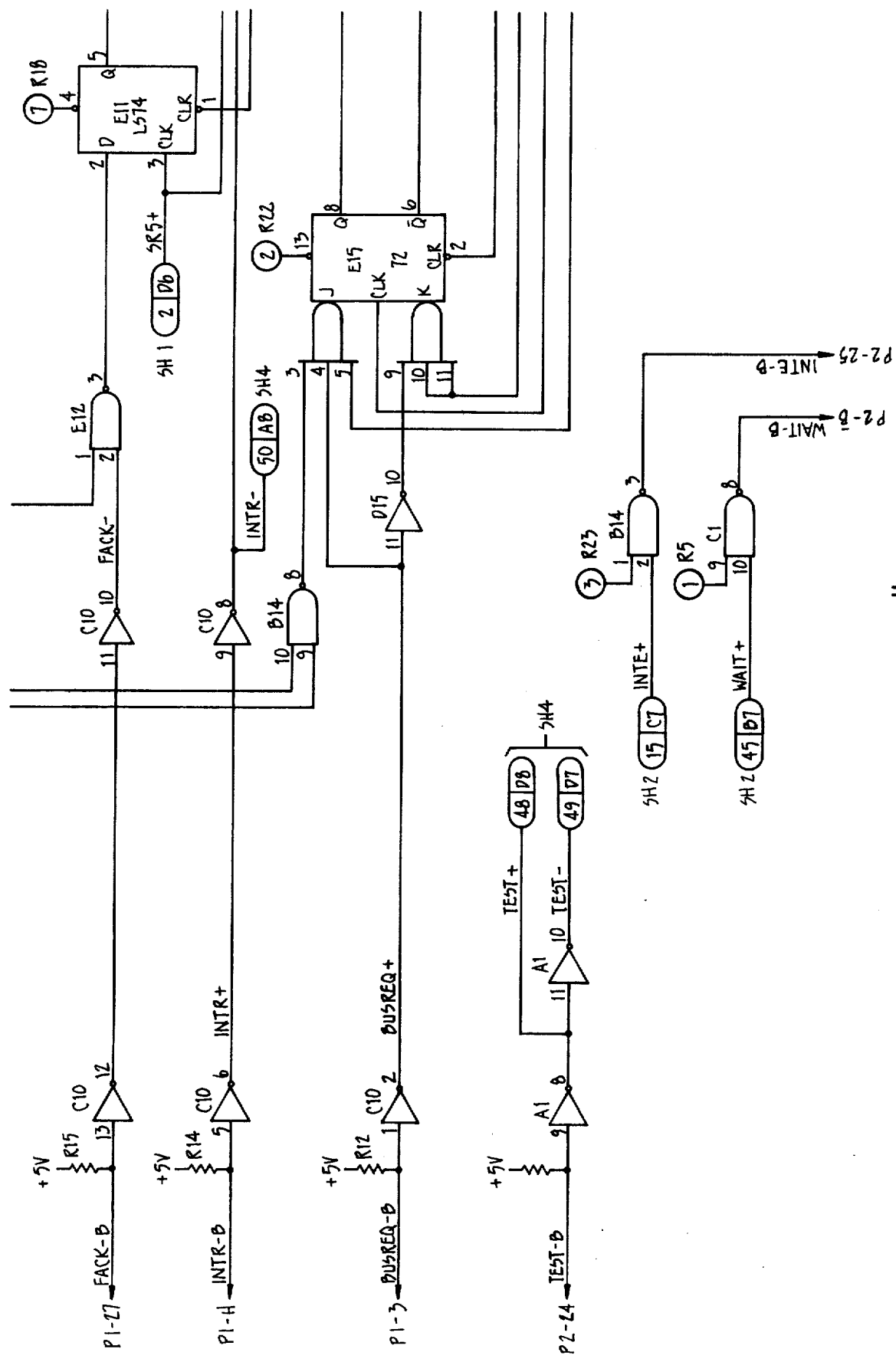
Figure 10C:
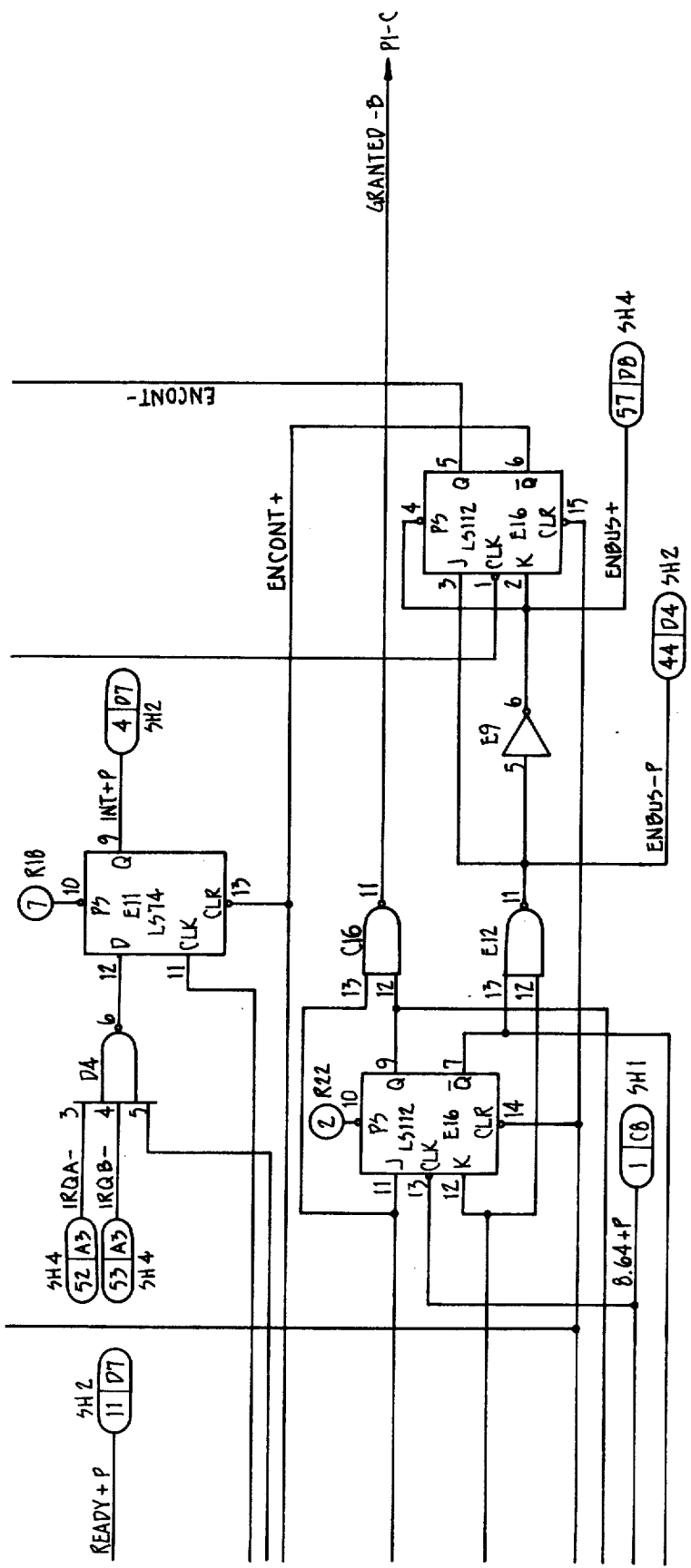
Figure 10D:
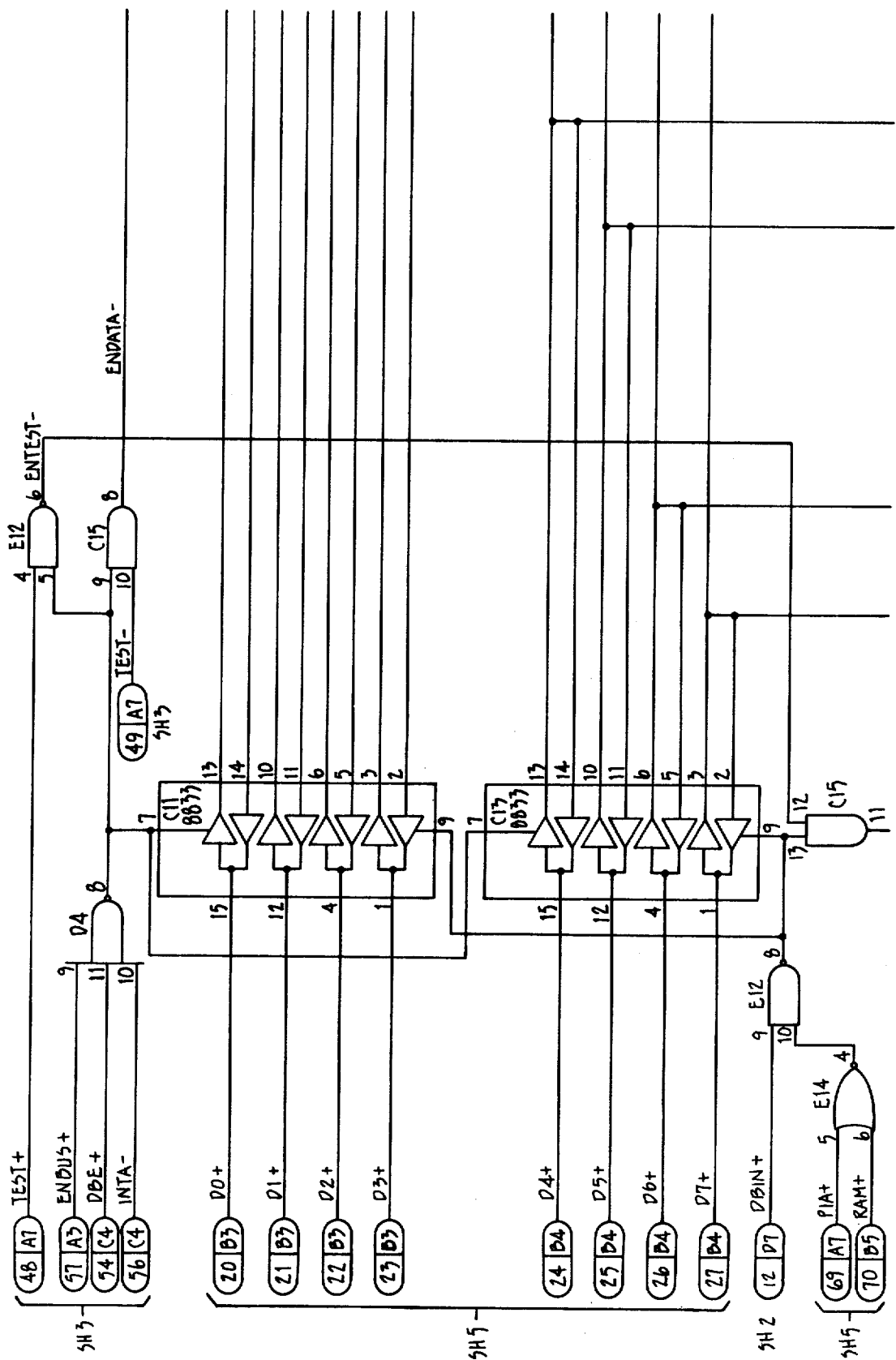
Figure 10D:
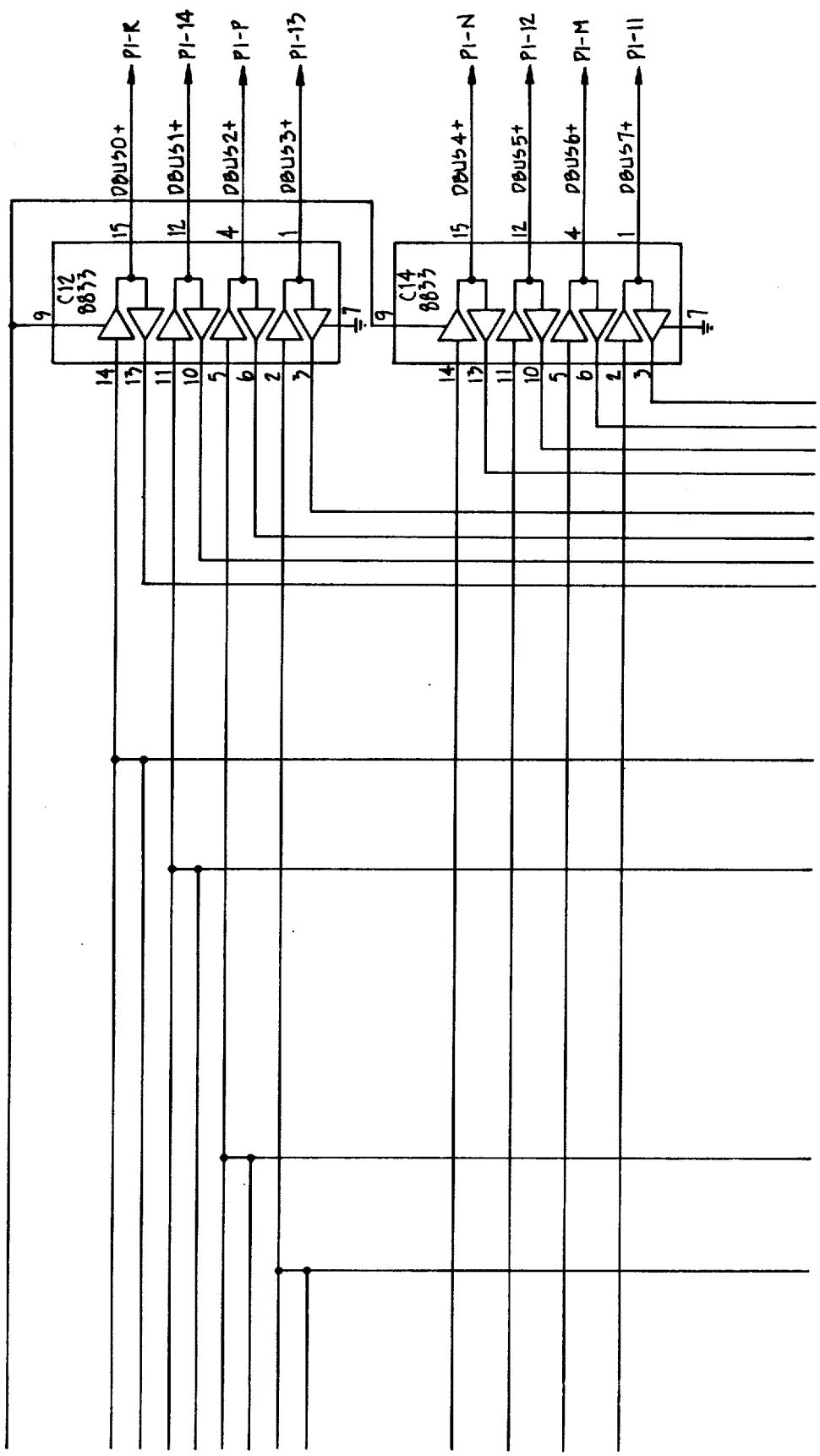
Figure 10D:
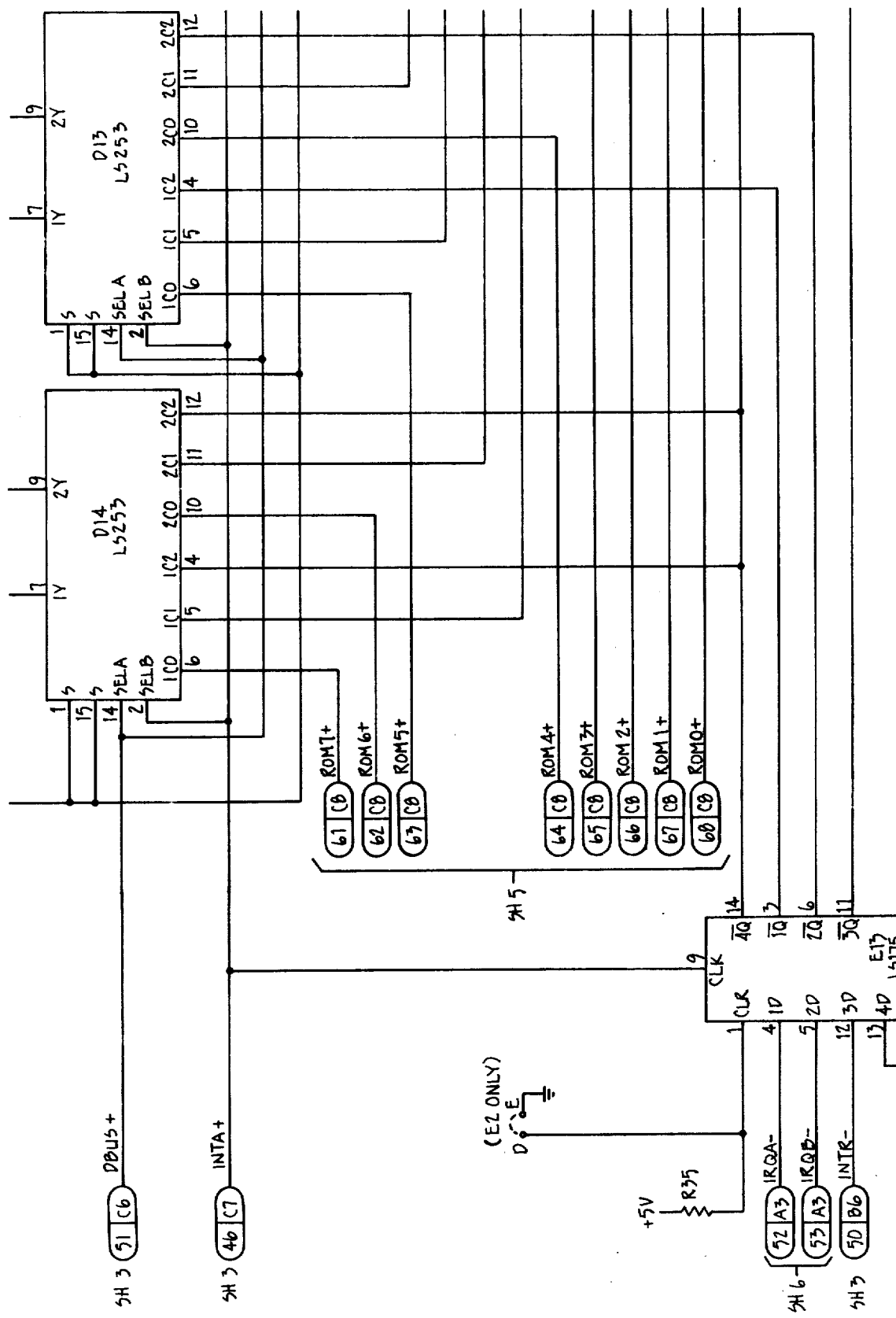
Figure 10D:
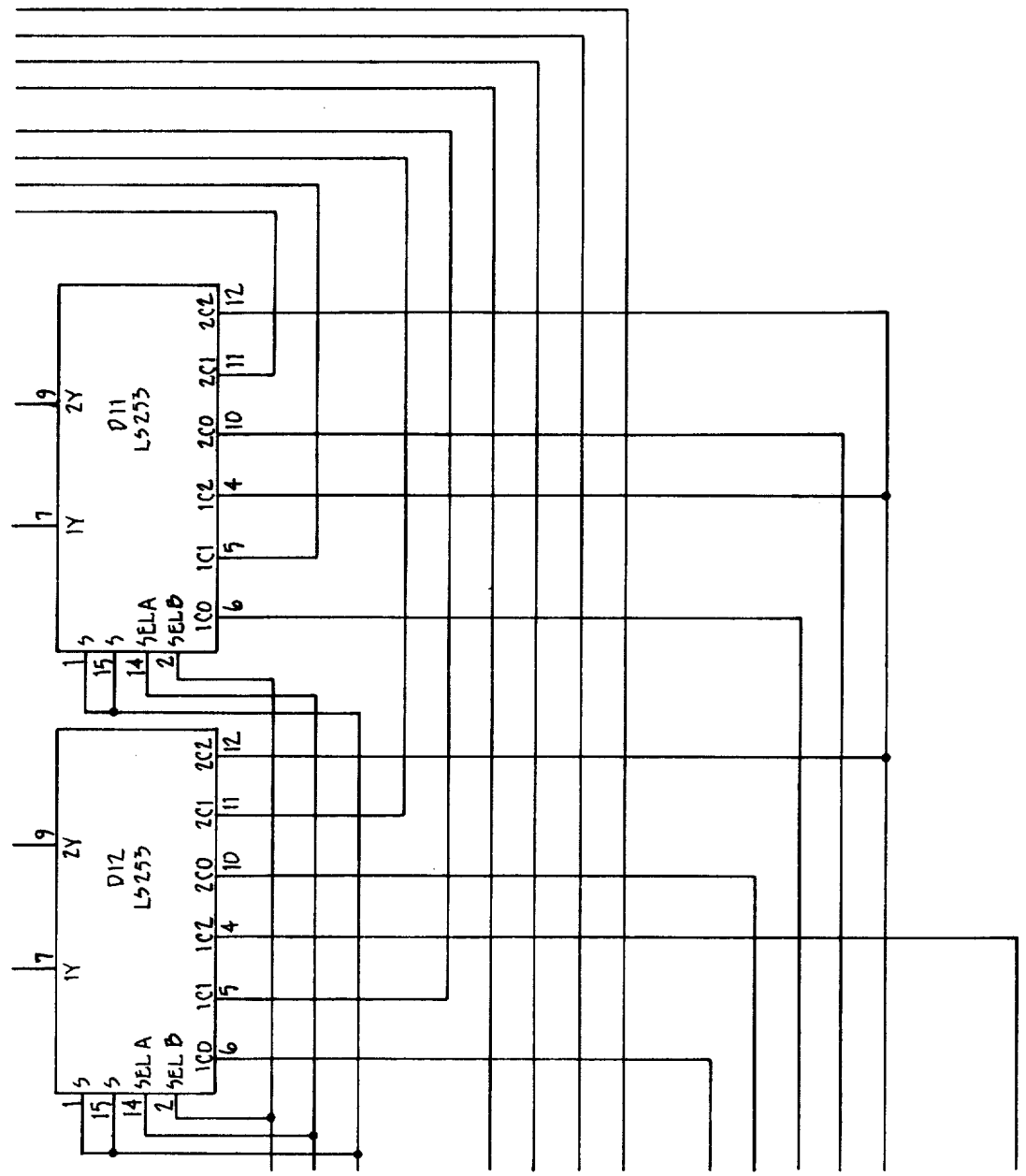
Figure 10E:
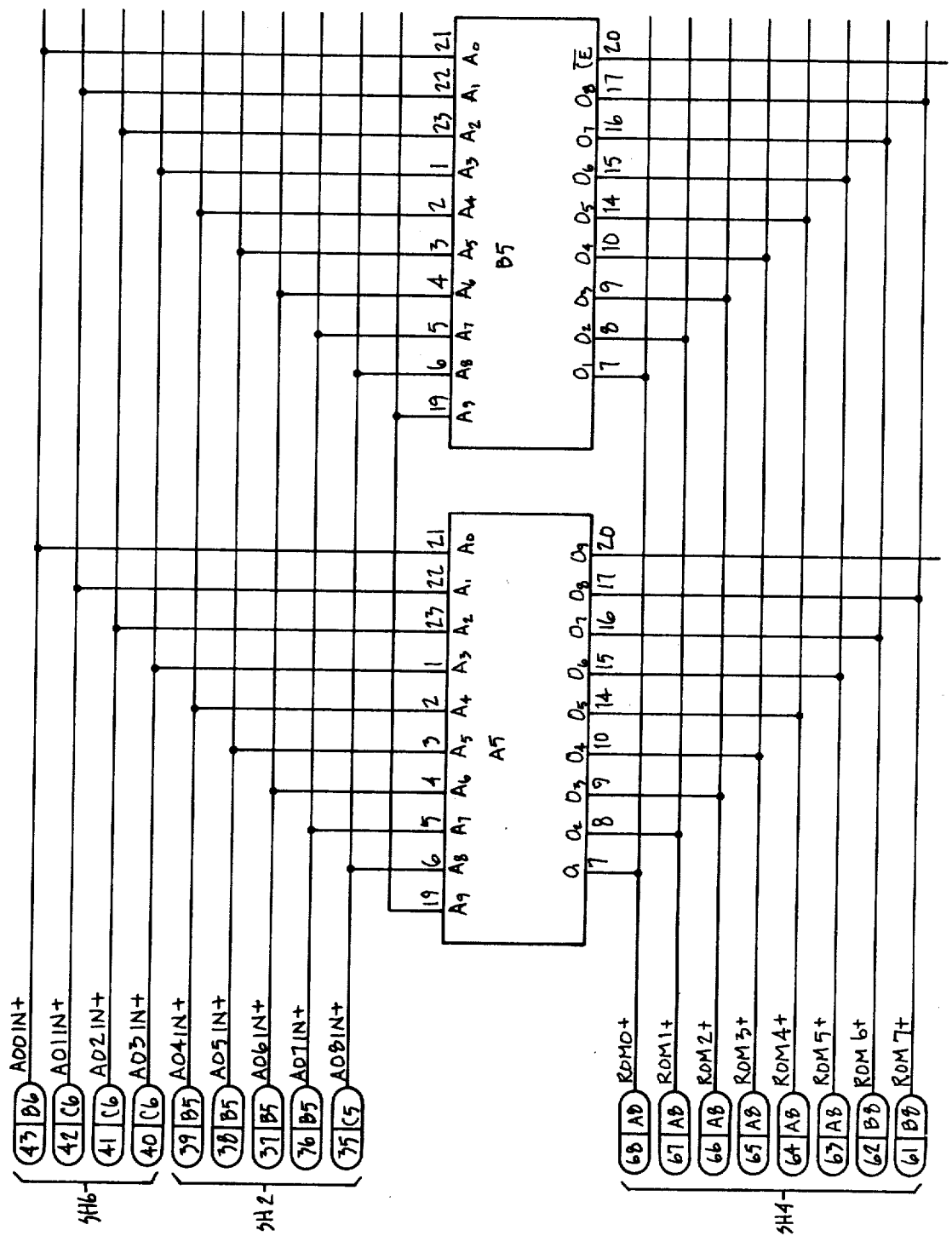
Figure 10E:
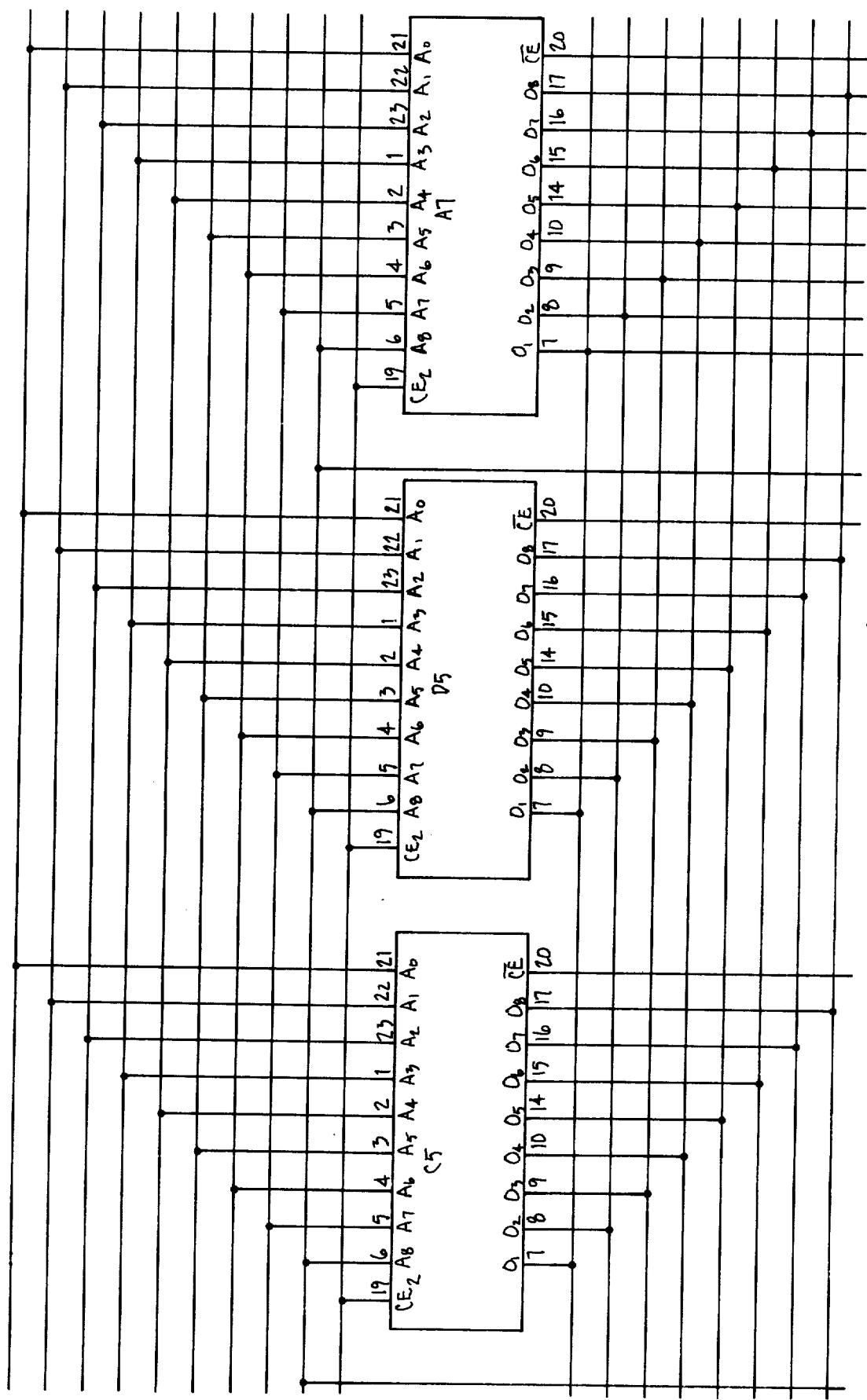
Figure 10E:
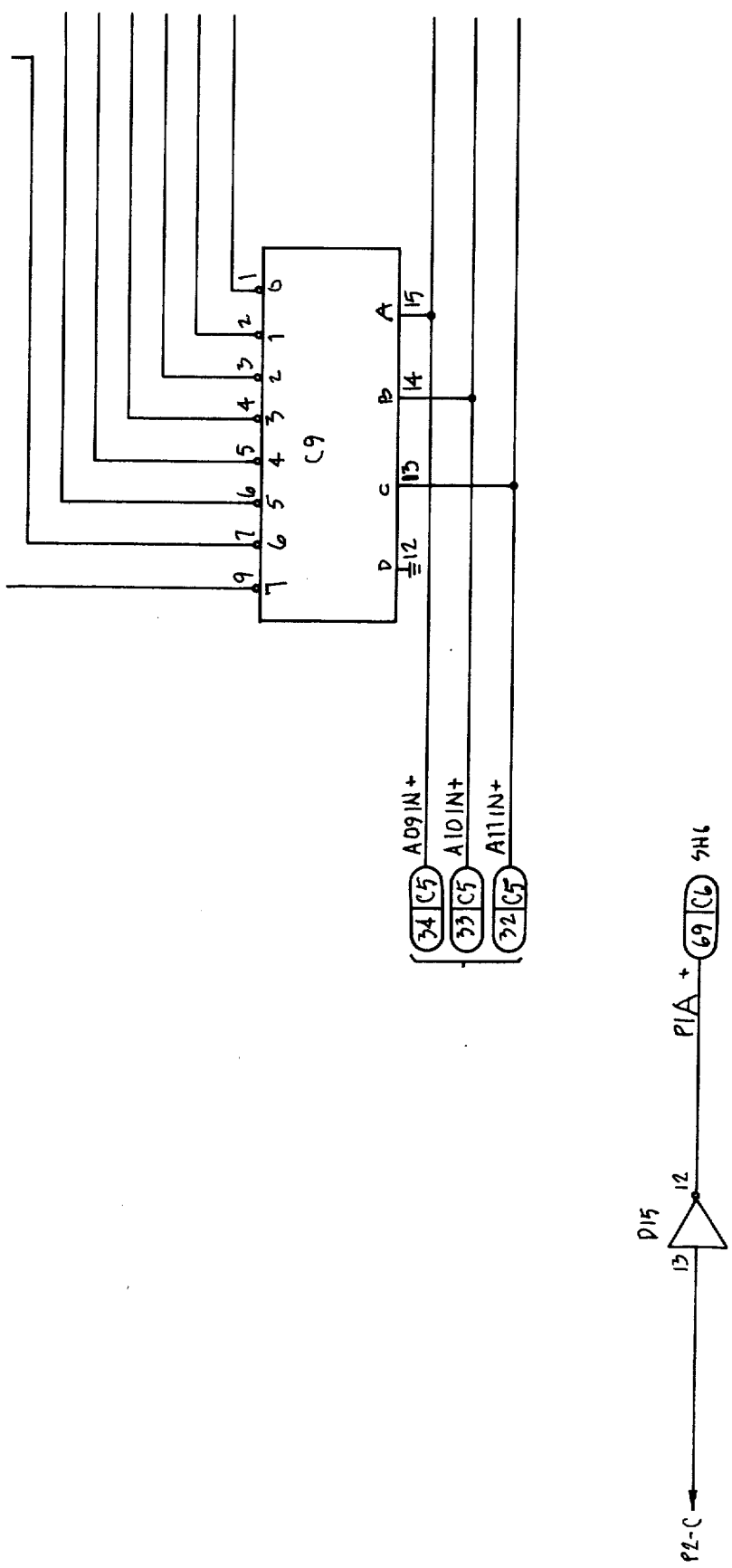
Figure 10E:
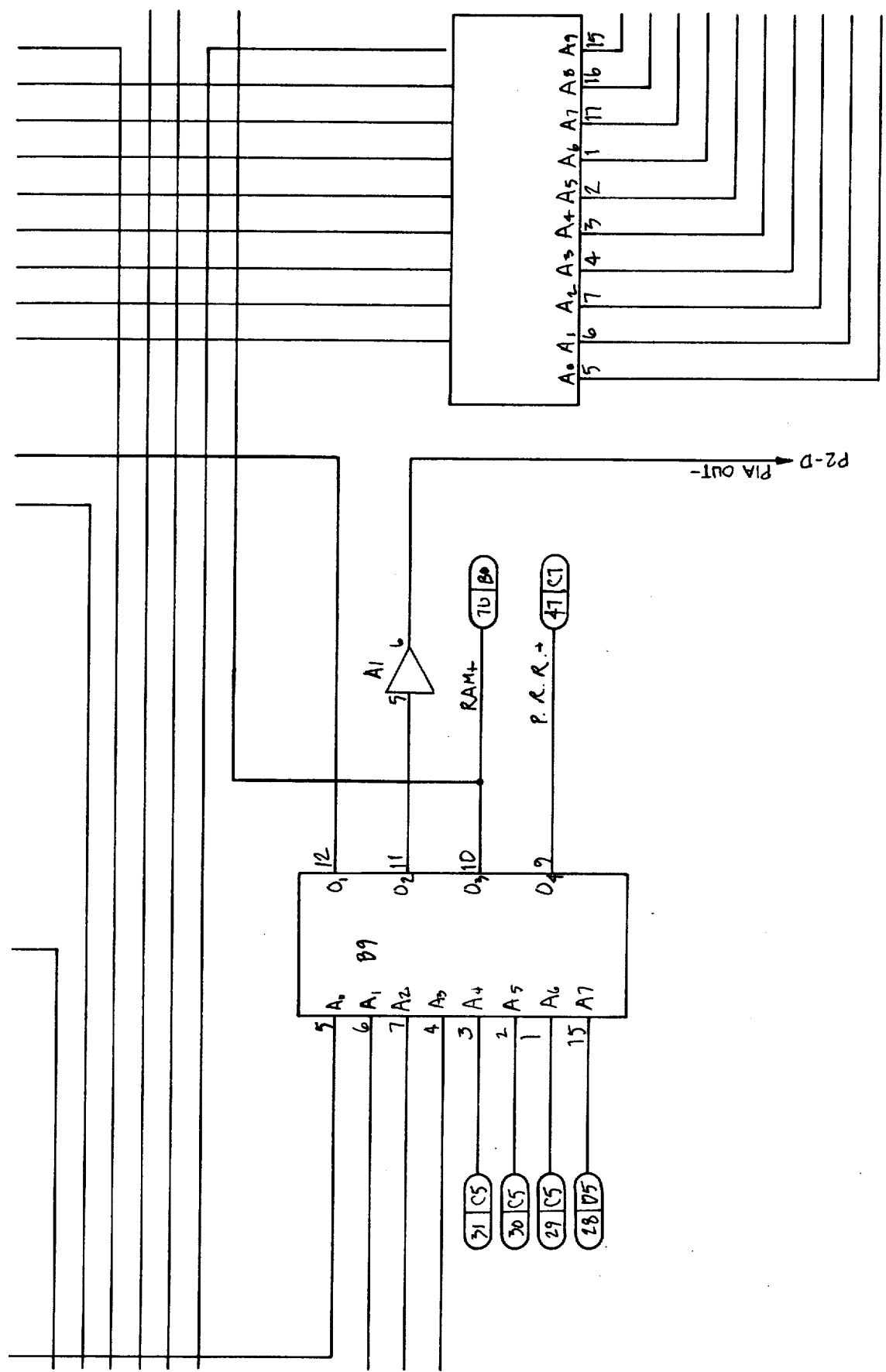
Figure 10F:
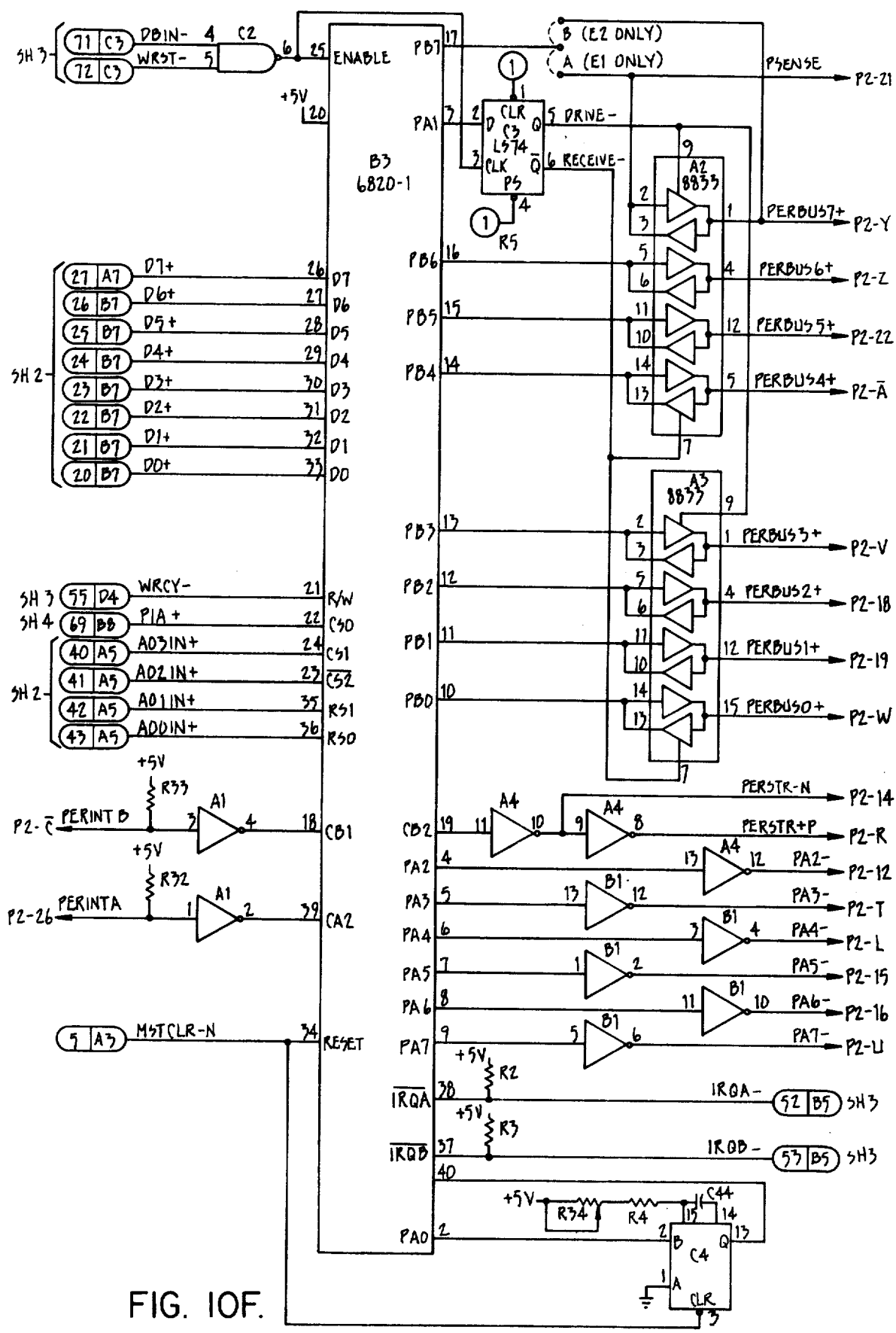
Figure 11A:
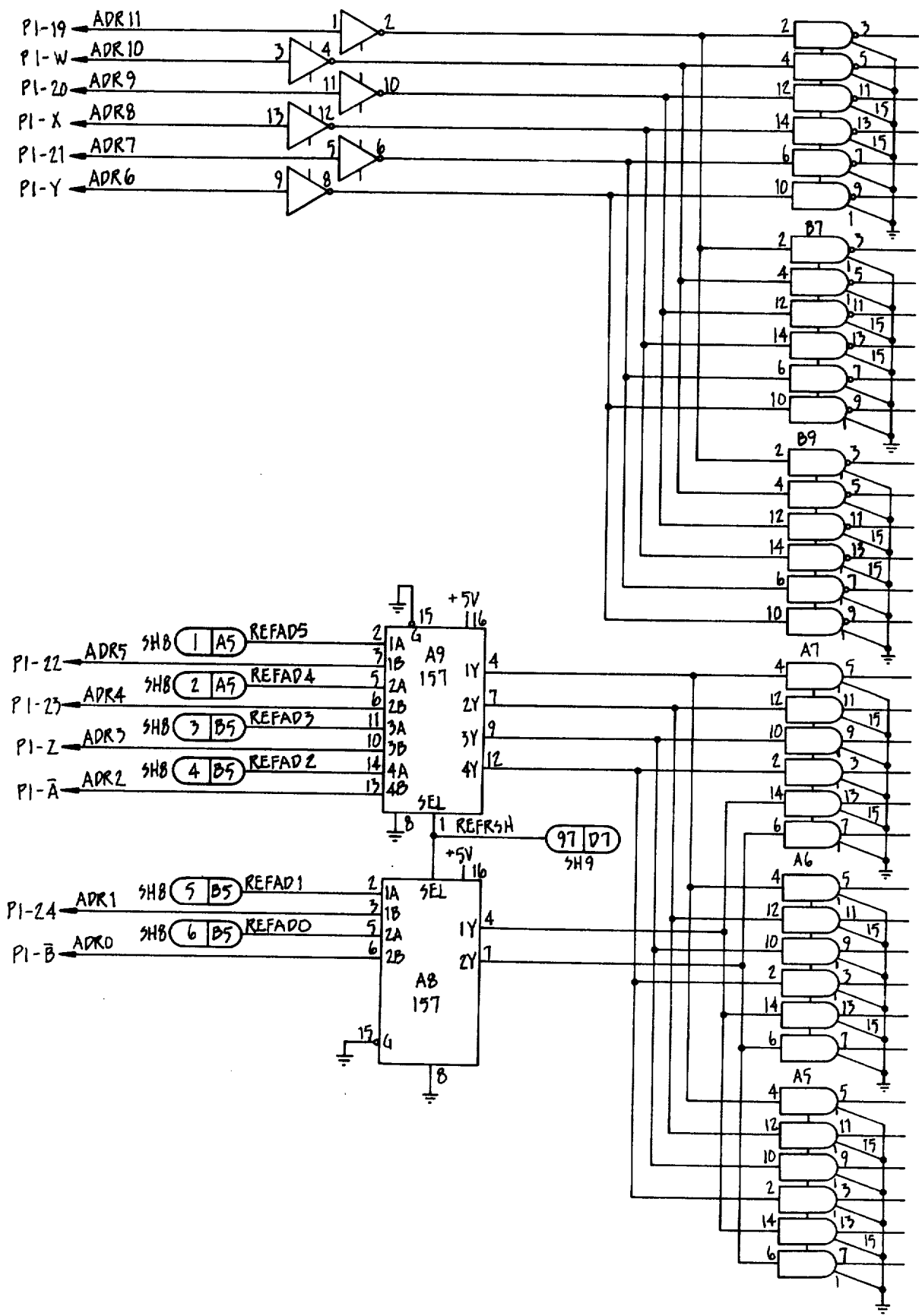
Figure 11A:
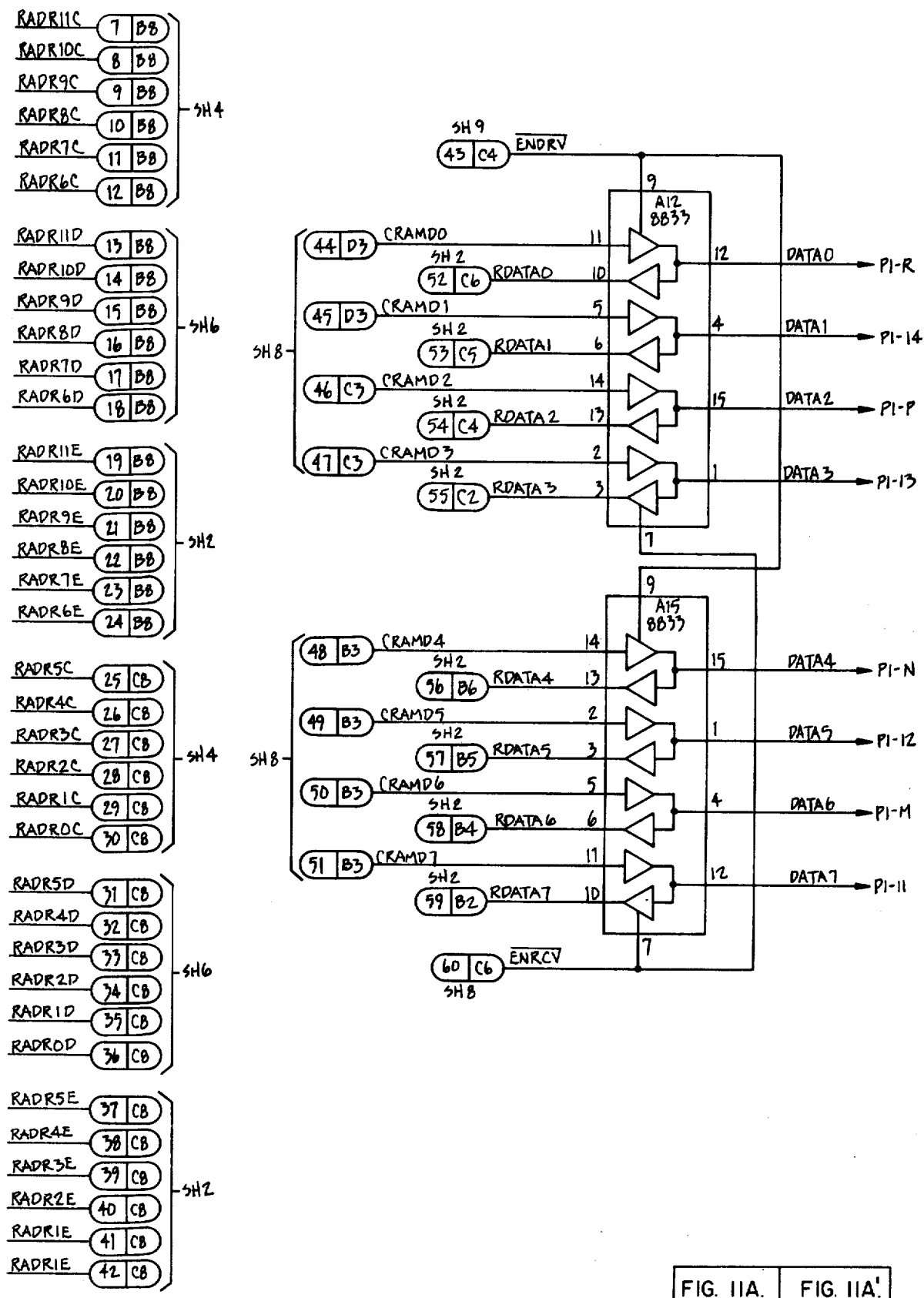
Figure 11B:
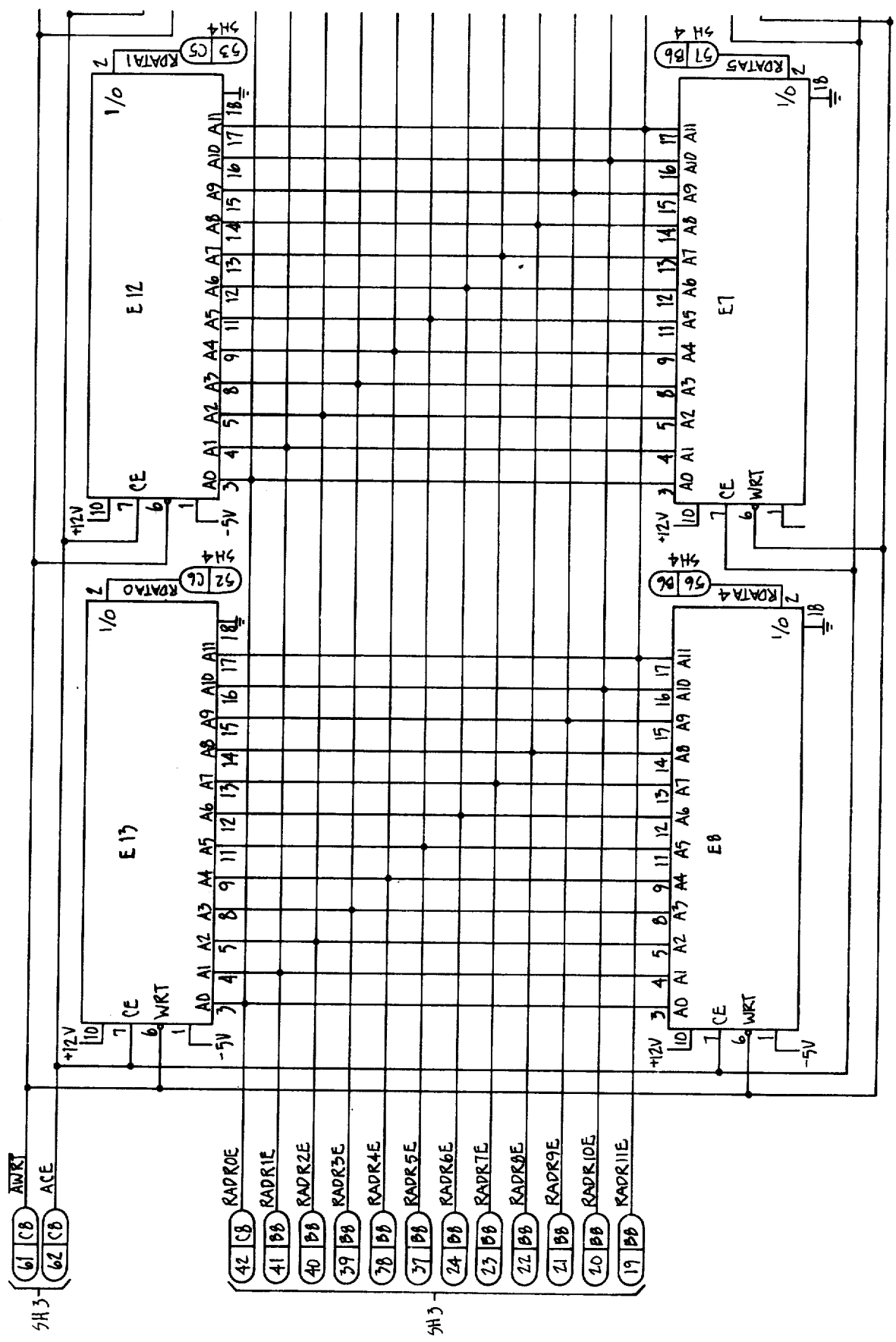
Figure 11D:
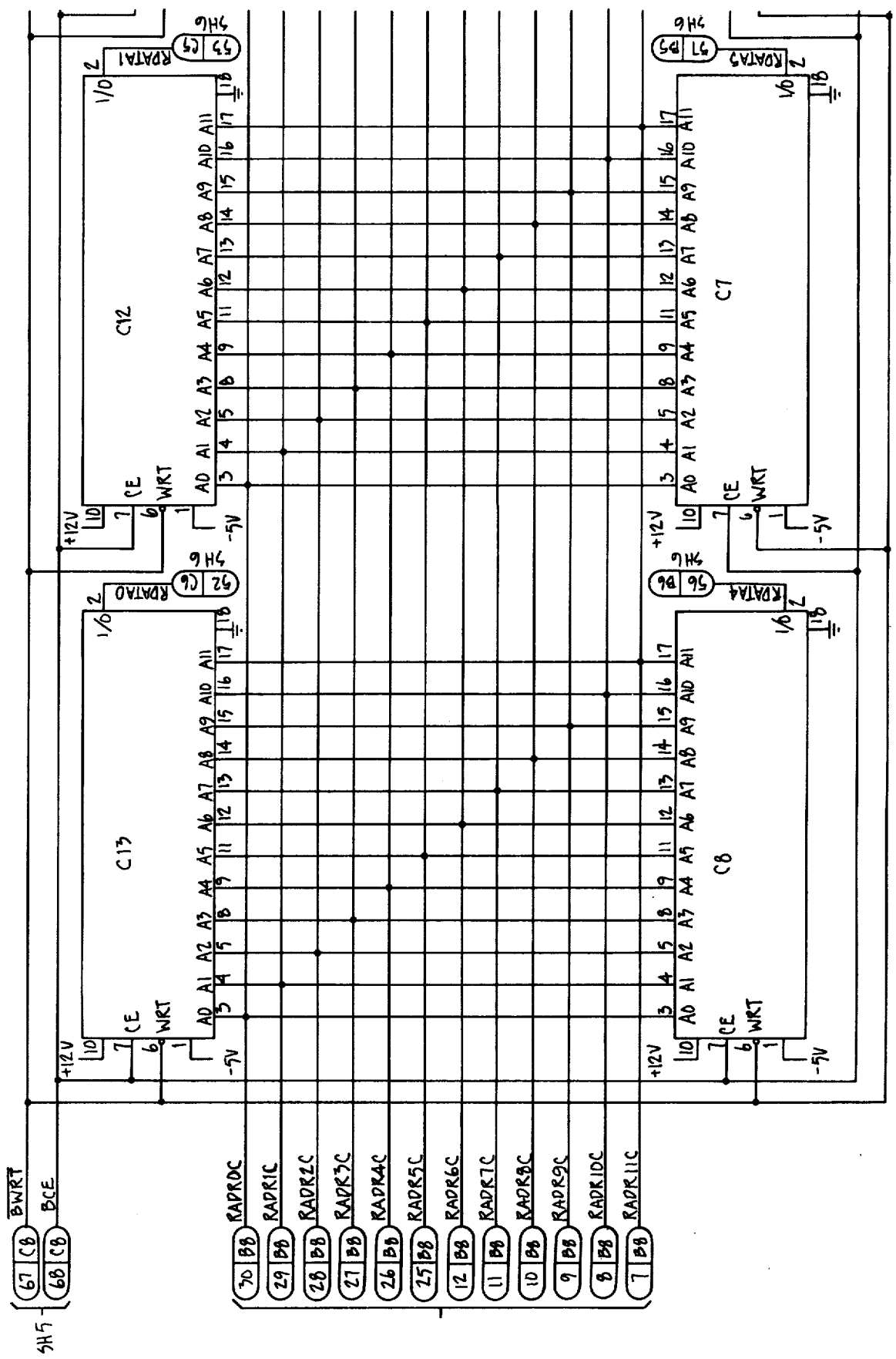
Figure 11E:
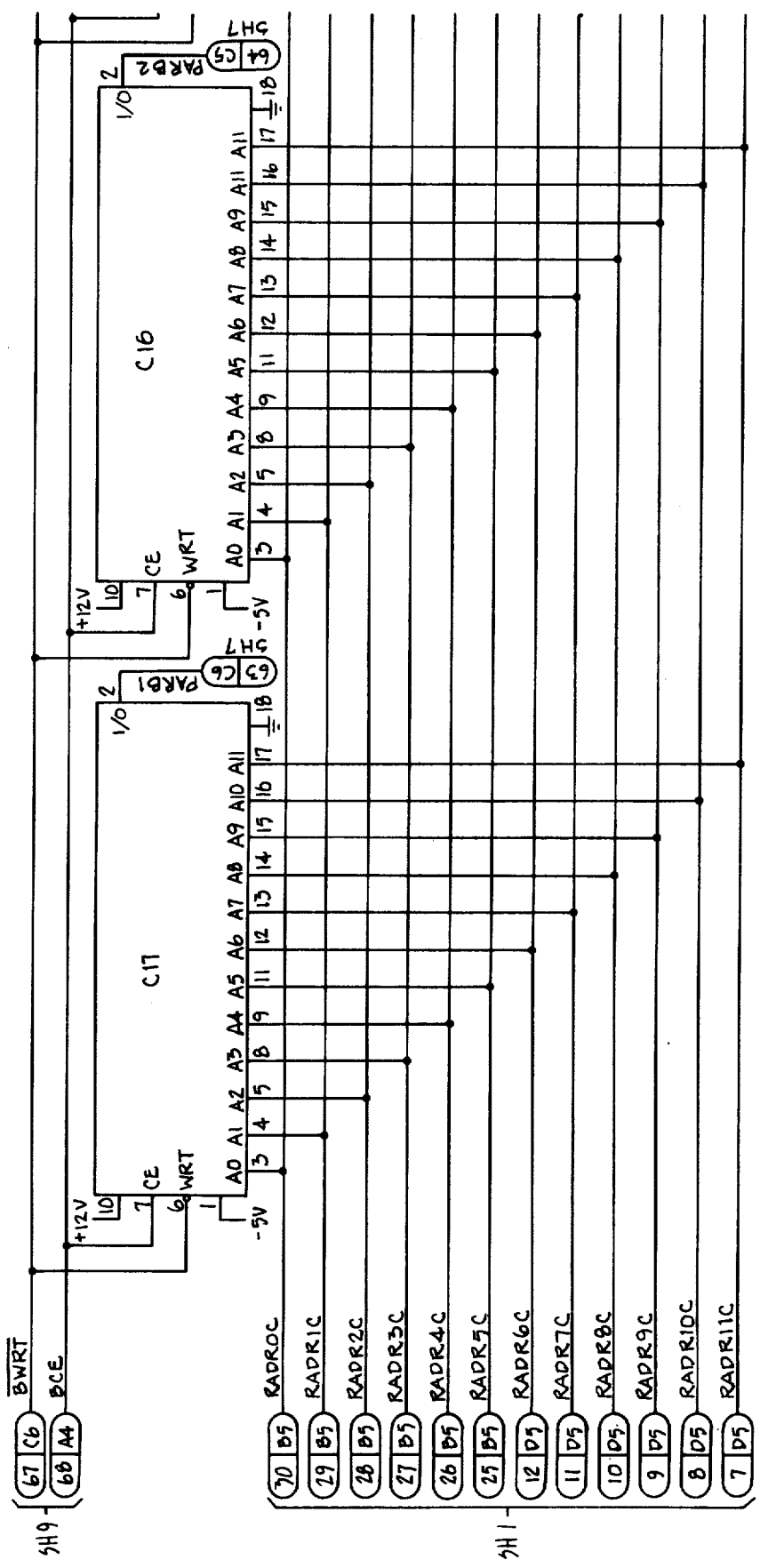
Figure 11F:
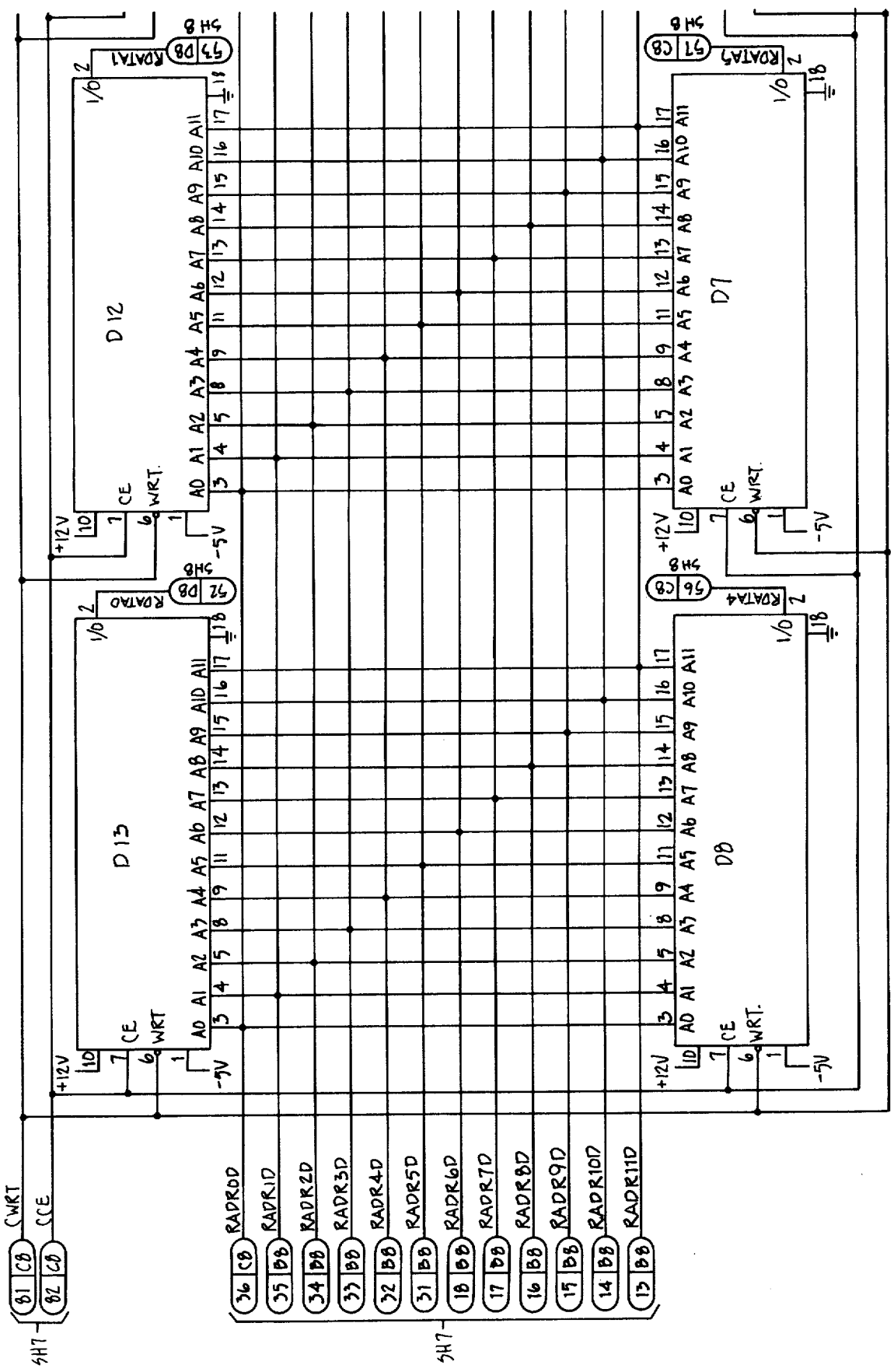
Figure 11F:
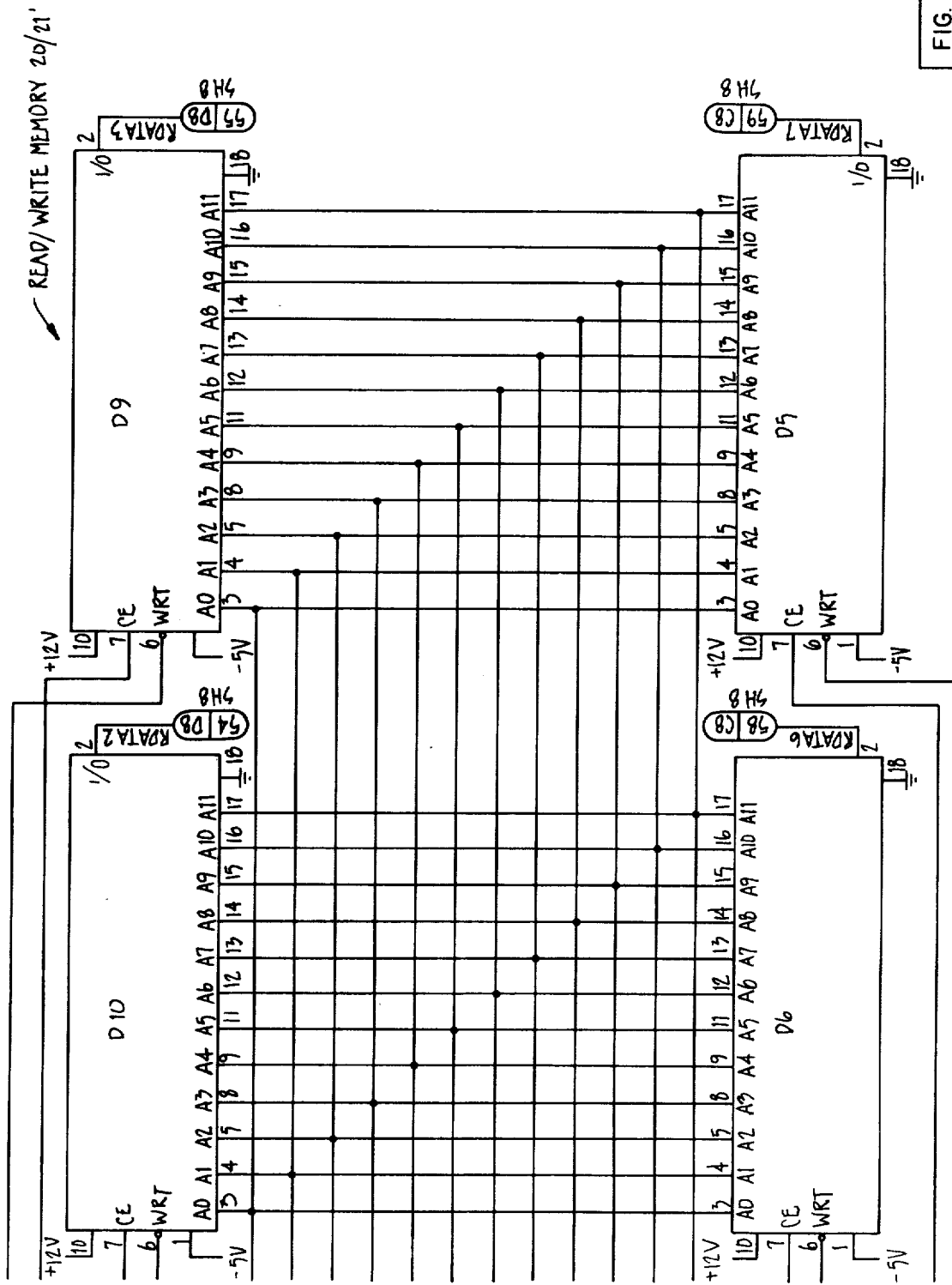
Figure 11G:
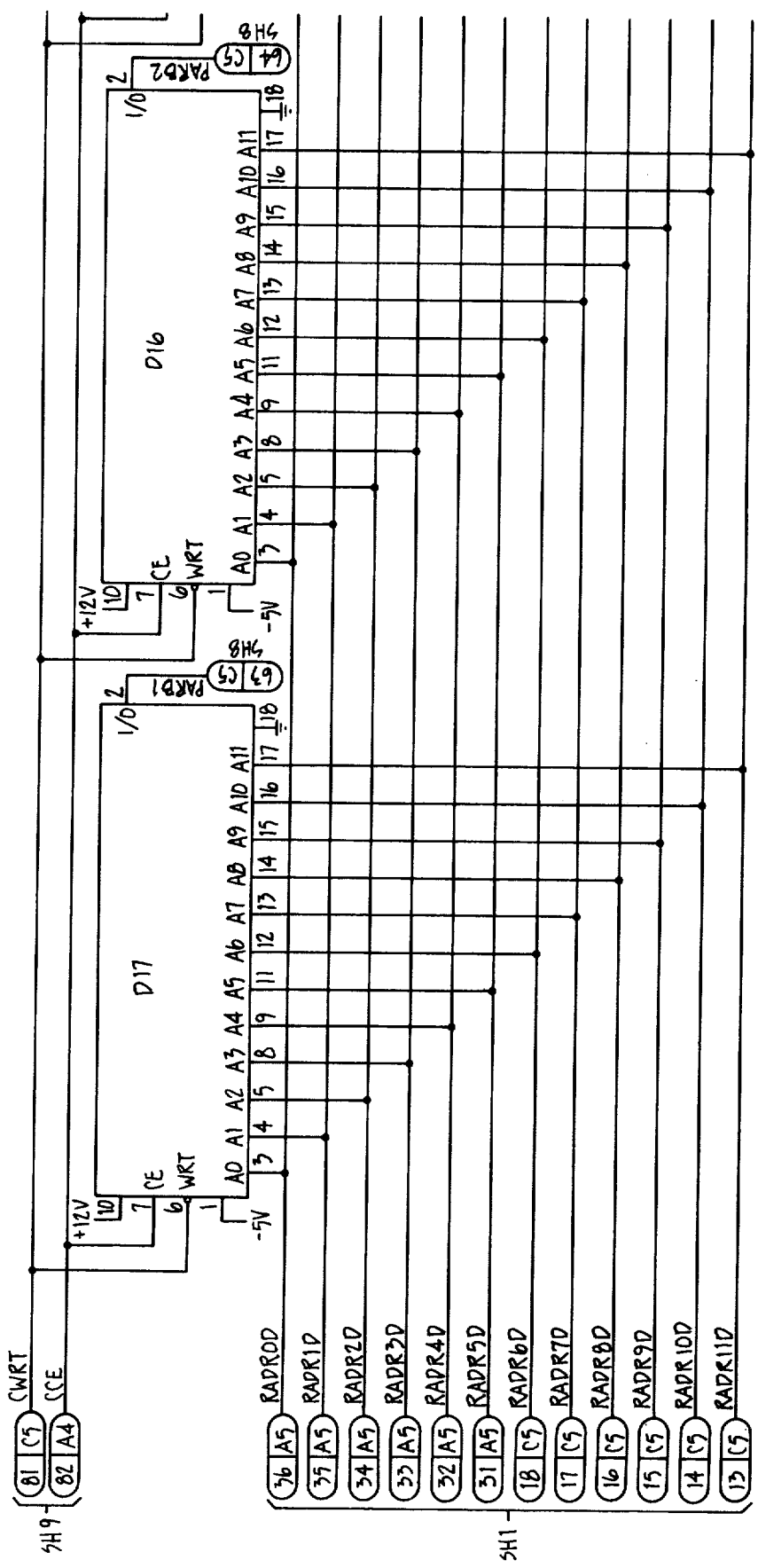
Figure 12A:
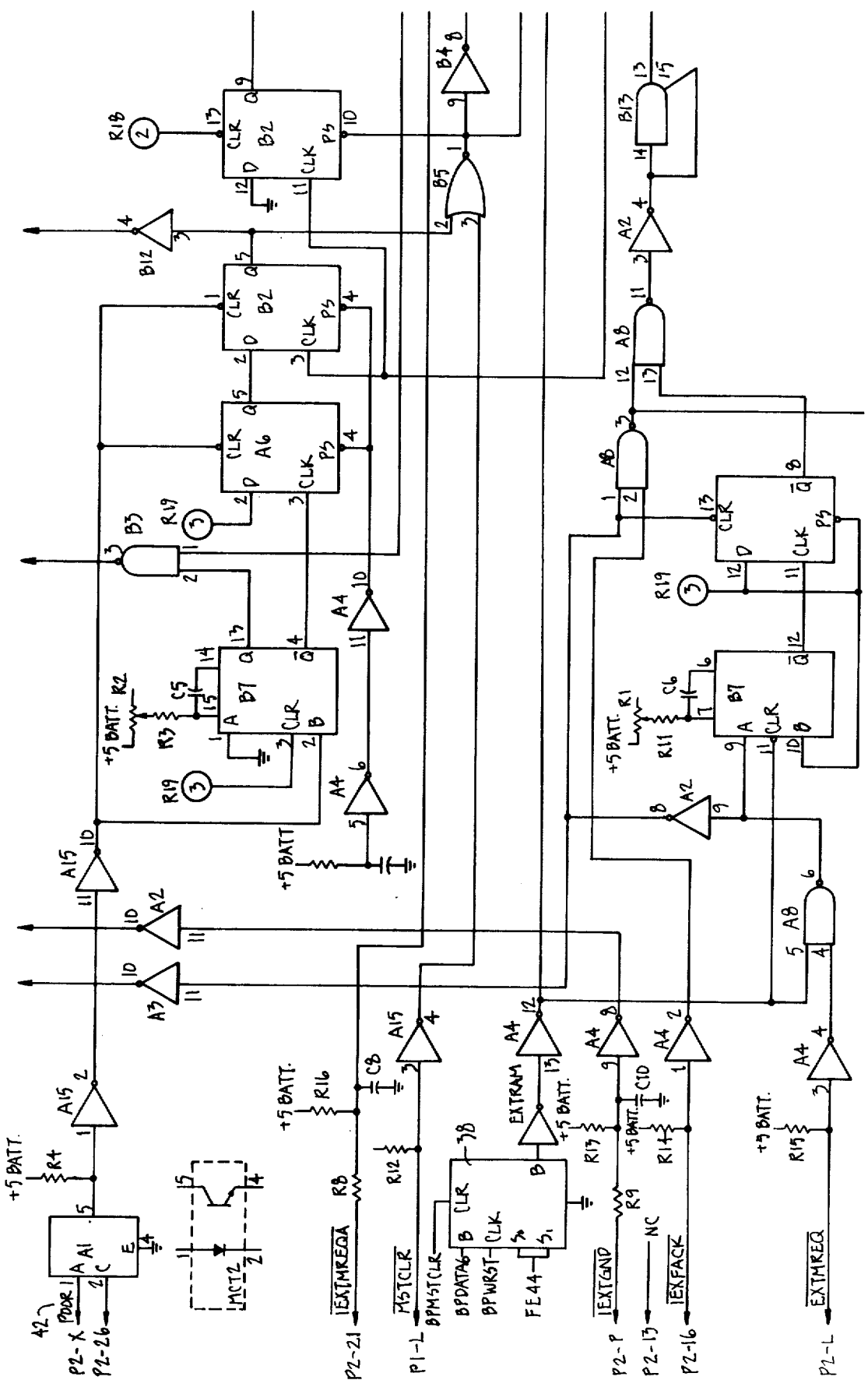
FIGS. 12A—12C are schematic diagrams of portions of the read/write memories and portions of the read across control units of the system of the invention.
Figure 12A:
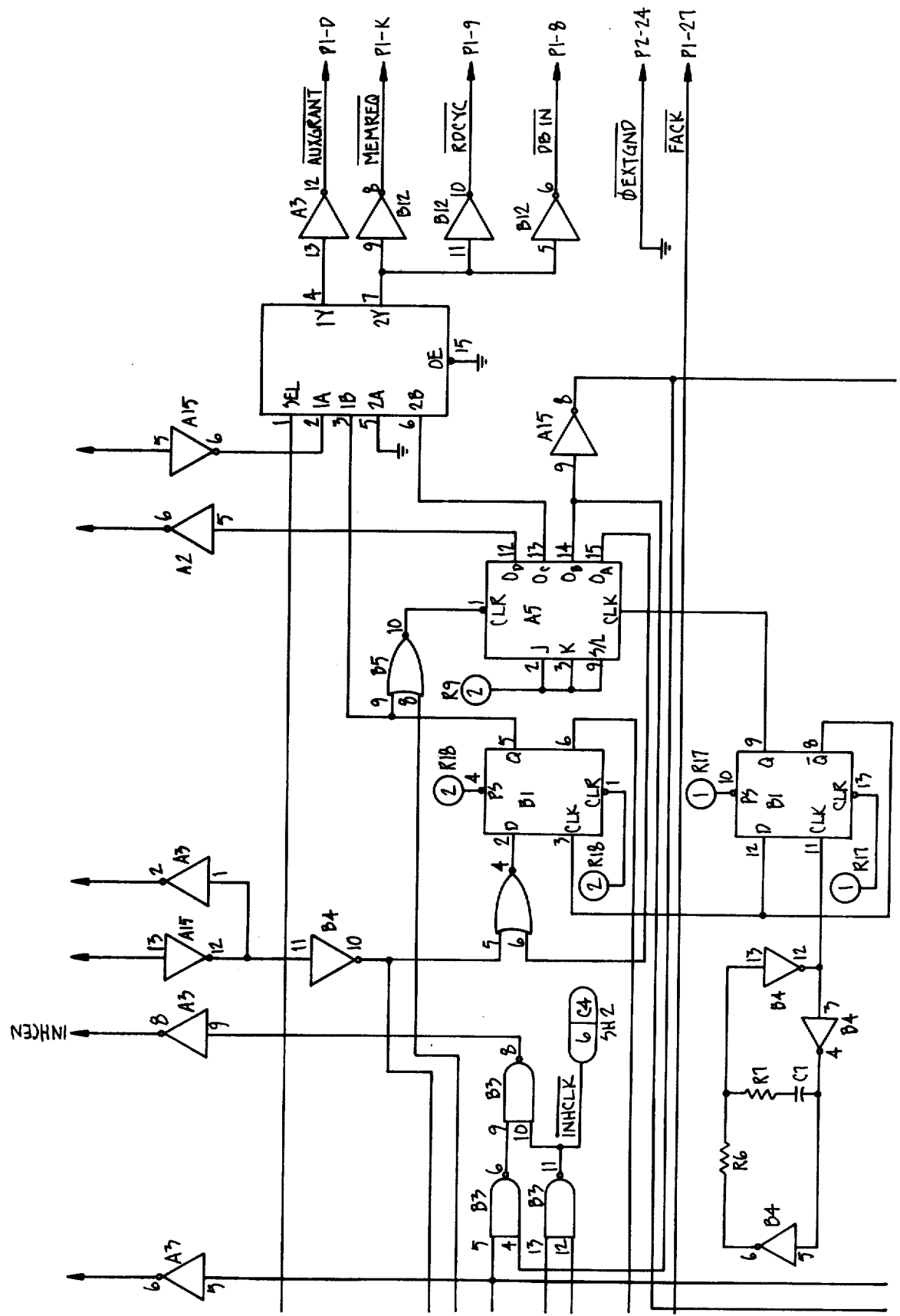
Figure 12A:
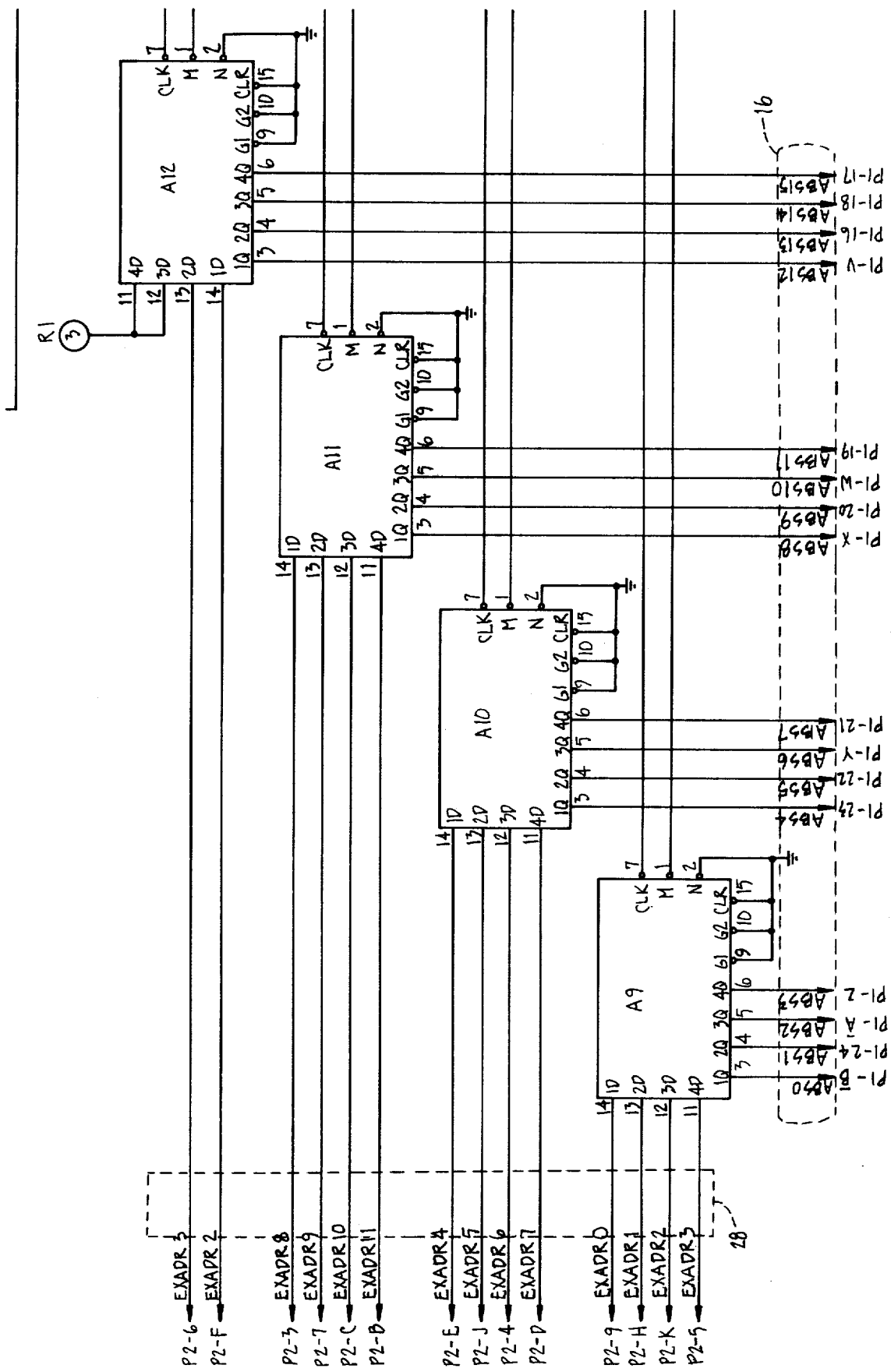
Figure 12B:
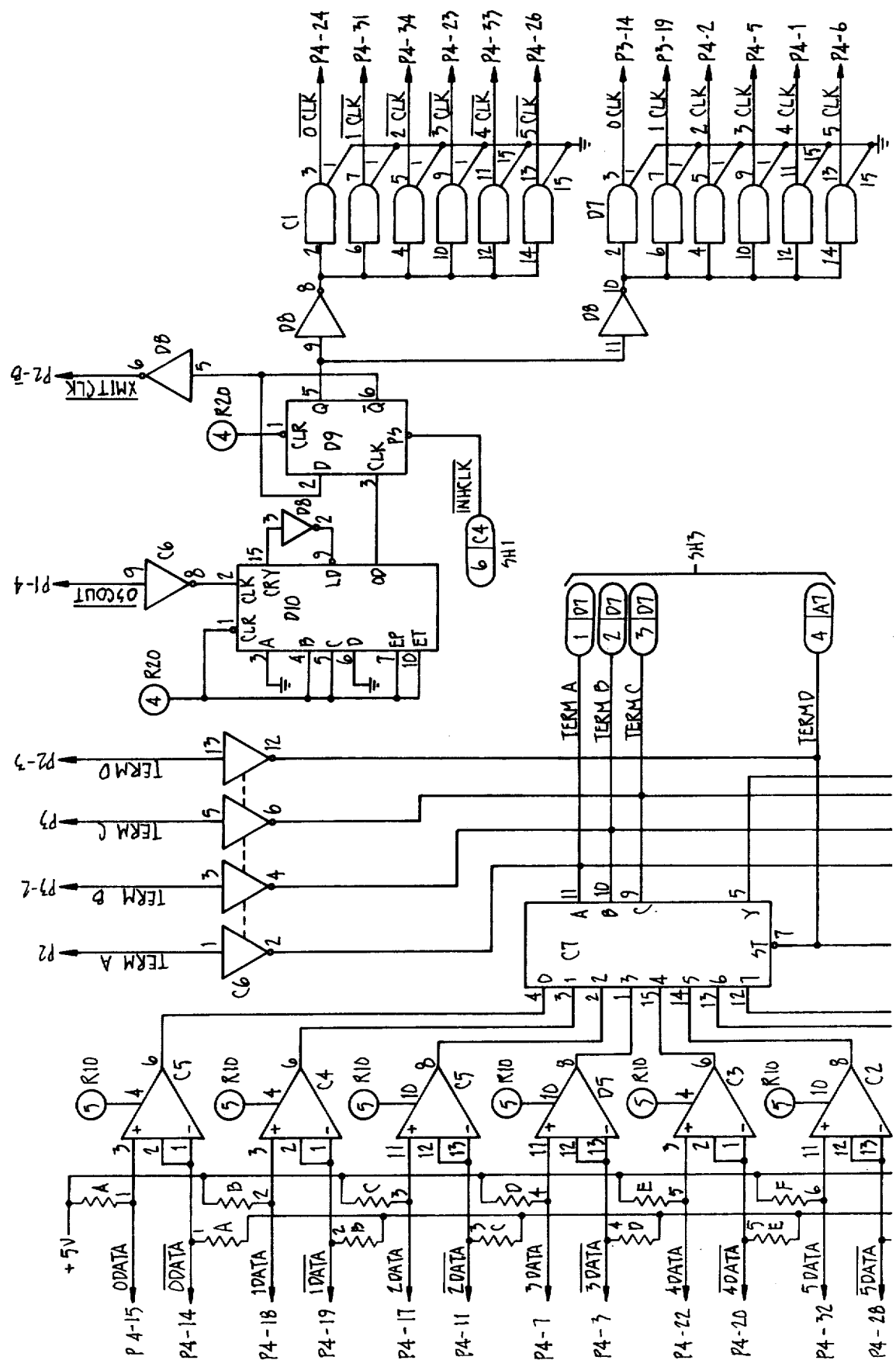
Figure 12B:
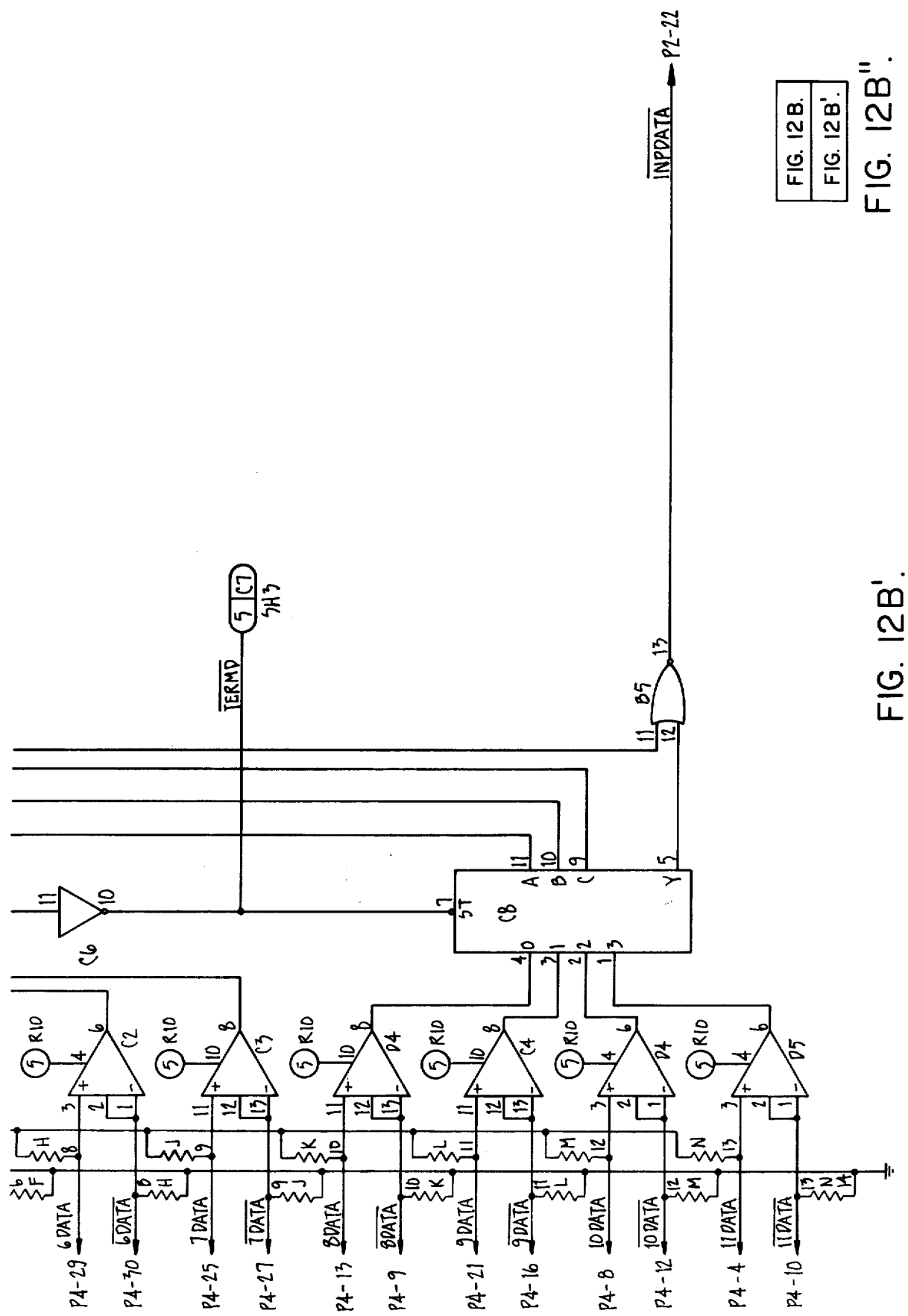
Figure 12C:
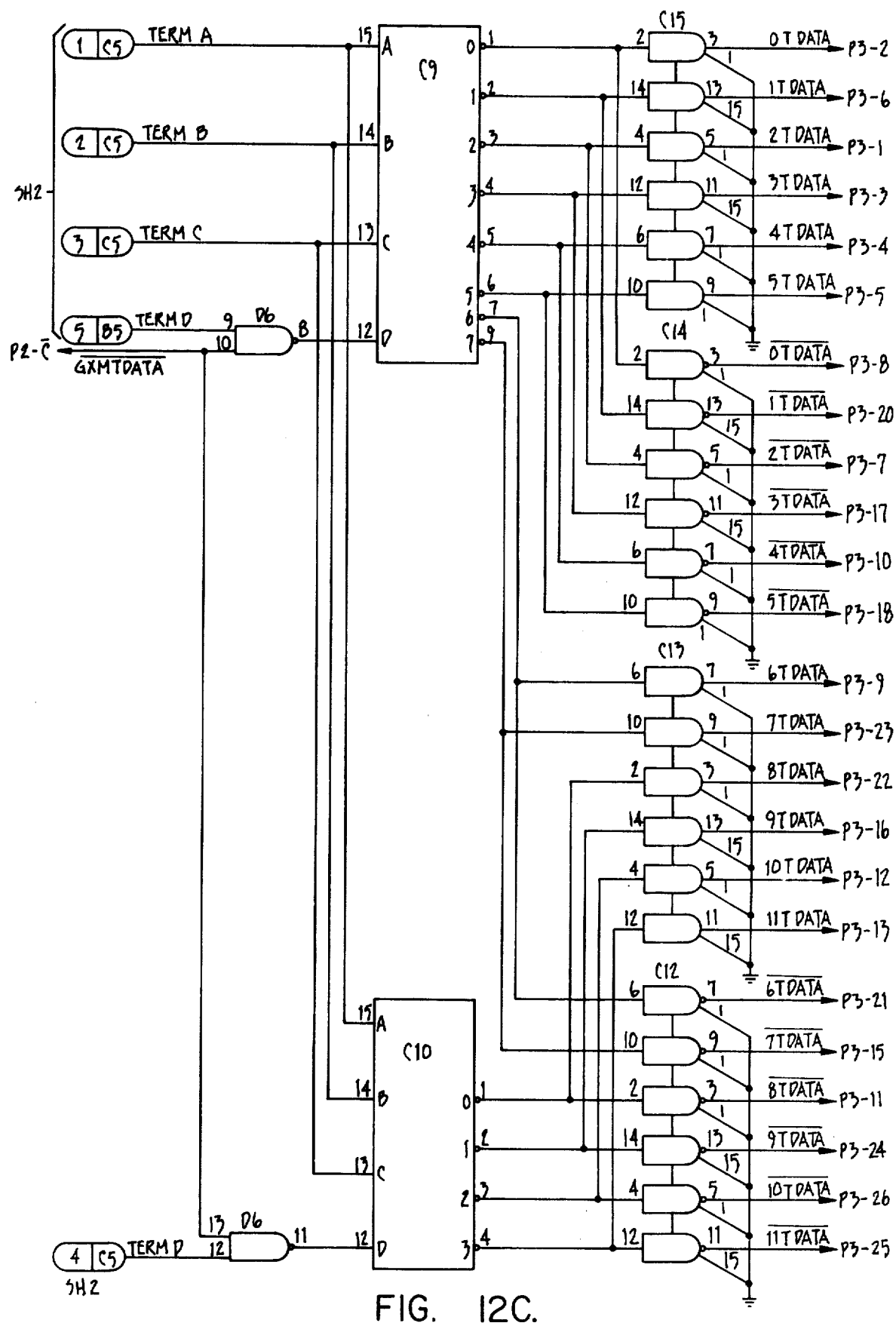

Some of the logic elements described above in reference to the FIGS. 1–9, inclusive, are depicted in greater detail in FIGS. 10–12, inclusive, and have been designated with their appropriate reference numerals. Additionally, the actual wiring reference designations have also been included in the FIGS. 10–12.

The source program written in Intel 8080 macroassembler language describing the sequence of operations carried out by the microprocessor to operate the point of sale system of the invention is attached at the end of this application but not printed as part of the specification for the sake of brevity.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A data processing system comprising a pair of parallel, redundant systems, one of which is active and the other of which is inactive, and each of which includes at least a read/write memory, an input-output device, and a central processing unit, wherein the read/write memories each normally contain both constant data as well as dynamic data, that is, data which changes during the course of operation of the system, the active read/write memory normally containing the most current dynamic data, switch means for selectively choosing which system is to be active and which is to be inactive, and memory validation means, including the central processing unit and the read/write memory of the active system, for determining at each start-up of the active system if the active read/write memory does not contain the most currently valid data and if the inactive read/write memory does contain the most currently valid data and, if they do, for transferring the contents of that memory to the active read/write memory.

2. A data processing system as recited in claim 1 wherein each system further comprises read only memory means for storing certain fixed data as well as program instructions for the central processing unit of that system, each read/write memory contains a generation number (G) counter, and the active read/write memory contains a temporary, validation number (V) counter for use by the central processing unit of the active system during memory validation, and wherein the memory validation means includes (A) constant data verification means under program control for serially comparing certain constant data from each of the read/write memories with corresponding validation data from the active system read only memory and for setting the validation counter to:

(a) V=0 if neither read/write memory contains constant data which corresponds to the validation data of the read only memory, (b) V=1 if only the active read/write memory contains constant data which corresponds to the validation data of the read only memory, (c) V=2 if only the inactive read/write memory contains constant data which corresponds to the validation data of the read only memory, and (d) V=3 if both read/write memories contain constant data which corresponds to the validation data of the read only memory, (B) activation means under program control for reading the final status of the validation number counter and (a) if V=0, for writing the validation data into the active system read/write memory and for starting up the active system, (b) if V=1, for starting up the active system, (c) if V=2, for writing the dynamic data from the inactive read/write memory into the active read/write memory, for incrementing the generation number (G) of the generation number counter of the active memory by 1, and for starting up the active system, (d) if V=3, for comparing the generation numbers in the counters of the active and inactive read/write memories and (i) if they are equal, for incrementing the generation number counter of the active read/write memory by 1 and starting up the system, (ii) if they are not equal, for comparing the sum of 1 plus the generation number count in the active read/write memory with the generation count in the inactive read/write memory and (j) for starting up the active system if they are not equal and (jj) for writing the dynamic data contents and the generation number count of the inactive read/write memory into the active read/write memory, for incrementing the newly copied generation counter of the active read/write memory by 1, and for starting up the active system.

3. A data processing system as recited in claim 2 wherein each system includes separate sets of addresses, data and control buses interconnected to the elements of each system and a read across control circuit and further comprising intermodule bus means for interconnecting the read across control circuits of the active and inactive systems, the read across control circuits, under the selective control of the central processing unit of the active system, serving to interconnect the address, data and control buses of the active system with the corresponding buses of the inactive system.

4. A data processing system as recited in claim 3 wherein each read across control includes means for selectively inhibiting the read/write memory of its corresponding system from being accessed by the corresponding central processing unit of the same system.

5. An improved arrangement for point of sale systems, of the type having a plurality of key station terminals for entering and receiving sales data, a read/write memory for storing the sales data, a read only memory for storing instructions and constant data, and a central processing unit for processing the data from the key station terminals, for entering and extracting such data from the read/write memory, and for displaying an output at selected key station terminals, wherein the improvement comprises having a pair of such systems, one of which is active and one of which is inactive, which share a single set of key station terminals, switch means for selecting which of such systems is to be the active system and which is to be the inactive system, the read/write memories each normally containing both constant data as well as process data, that is, data which changes during the course of operation of the system, the active read/write memory normally containing the most current process data, memory validation means, including the central processing unit and read/write memory of the active system for determining just prior to each start-up of the active system if the active read/write memory does not contain the most currently valid data and if the inactive read/write memory contains the most currently valid process data and, if they do, for transferring the process data contents of that memory to the active read/write memory and for writing a signal into the active read/write memory representative of the fact that the active read/write memory now contains the most current and valid process data.

6. A point of sale system as recited in claim 5 wherein each read/write memory includes a generation number counter and wherein the memory validation means, upon start-up of the active system, increments the generation number counter of the active read/write memory by one whenever either the process data and generation number count of the inactive read/write memory is caused to be transferred to the active read/write memory or whenever the counts in the generation number counters of the read/write memories are equal.

7. A point of sale system as recited in claim 6 wherein the memory validation means includes means for serially comparing certain constant data from each of the read/write memories with corresponding constant data from the active read only memory to determine the validity of the contents of each of the read/write memories.

* * * * *